(12) United States Patent
Pang et al.

(10) Patent No.: US 7,835,280 B2
(45) Date of Patent: Nov. 16, 2010

(54) METHODS AND SYSTEMS FOR MANAGING VARIABLE DELAYS IN PACKET TRANSMISSION

(75) Inventors: Jon Laurent Pang, Huntington Beach, CA (US); Mohammad Usman, Mission Viejo, CA (US); Shoab Ahmad Khan, Rawalpindi (PK); Muhammad Mohsin Rahmatullah, Islamabad (PK)

(73) Assignee: Quartics, Inc., Irvine, CA (US)

( * ) Notice: Subject to any disclaimer, the term of this patent is extended or adjusted under 35 U.S.C. 154(b) by 122 days.

(21) Appl. No.: 12/350,682

(22) Filed: Jan. 8, 2009

(65) Prior Publication Data
US 2009/0316580 A1      Dec. 24, 2009

Related U.S. Application Data

(63) Continuation of application No. 10/084,559, filed on Feb. 25, 2002, now abandoned, which is a continuation-in-part of application No. 10/004,753, filed on Dec. 3, 2001, now abandoned.

(51) Int. Cl.
*G08C 15/00*  (2006.01)

(52) U.S. Cl. .................... 370/230.1; 370/238; 370/503; 370/516

(58) Field of Classification Search ................. 370/229, 370/230.1, 232, 234, 235, 235.1, 236, 237, 370/238, 238.1, 282, 395.21, 286, 395.4, 370/412, 395.71, 413, 414, 417, 418, 428, 370/429, 503, 516, 517
See application file for complete search history.

(56) References Cited

U.S. PATENT DOCUMENTS

| | | | |
|---|---|---|---|
| 4,914,692 A | 4/1990 | Hartwell et al. | |
| 5,142,677 A | 8/1992 | Ehlig et al. | |
| 5,189,500 A | 2/1993 | Kusunoki | |
| 5,200,564 A | 4/1993 | Usami et al. | |
| 5,341,507 A | 8/1994 | Terada et al. | |
| 5,363,404 A | 11/1994 | Kotzin et al. | |
| 5,492,857 A | 2/1996 | Reedy et al. | |

(Continued)

OTHER PUBLICATIONS

M.Weifi, F. Engel and G.P. Fettweis. A New Scalable DSP Architecture for System on Chip (SOC) Domains. In IEEE International Conference on Acoustics, Speech and Signal Processing (ICASSP), 1999.

(Continued)

*Primary Examiner*—Pankaj Kumar
*Assistant Examiner*—Mark A Mais
(74) *Attorney, Agent, or Firm*—PatentMetrix

(57) ABSTRACT

An improved method and system for the determination of jitter buffers enables the generation of buffers having sizes and delays such that, as designed, the buffers capture a substantial majority of packets while not being resource intensive. The present methods and systems provide for improved jitter buffer management by deriving playout buffer adjustments from a plurality of variances, centered around a distribution peak, or mean average delay. The playout buffer monitor uses the buffer adjustments, in size and delay, to select, store and playout packets at their adjusted playout time. The present invention may be employed in a media gateway that enables data communications among heterogenous networks and may be specifically deployed to manage jitter experienced in the course of receiving packetized data and processing the data for further transmission through a packet-based or circuit-switched network.

14 Claims, 32 Drawing Sheets

U.S. PATENT DOCUMENTS

| | | | |
|---|---|---|---|
| 5,594,784 | A | 1/1997 | Velius |
| 5,663,570 | A | 9/1997 | Reedy et al. |
| 5,724,356 | A | 3/1998 | Parameswaran Nair et al. |
| 5,848,290 | A | 12/1998 | Yoshida et al. |
| 5,860,019 | A | 1/1999 | Yumoto |
| 5,861,336 | A | 1/1999 | Reedy et al. |
| 5,872,991 | A | 2/1999 | Okamoto et al. |
| 5,883,396 | A | 3/1999 | Reedy et al. |
| 5,915,123 | A | 6/1999 | Mirsky et al. |
| 5,923,761 | A | 7/1999 | Lodenius |
| 5,941,958 | A | 8/1999 | Hwangbo |
| 5,956,517 | A | 9/1999 | Okamoto et al. |
| 5,956,518 | A | 9/1999 | Dehon et al. |
| 5,991,308 | A | 11/1999 | Fuhrmann et al. |
| 5,999,525 | A | 12/1999 | Krishnaswamy et al. |
| 6,047,372 | A | 4/2000 | Thayer et al. |
| 6,057,555 | A | 5/2000 | Reedy et al. |
| 6,067,595 | A | 5/2000 | Lindenstruth |
| 6,075,788 | A | 6/2000 | Vogel |
| 6,108,760 | A | 8/2000 | Mirsky et al. |
| 6,122,719 | A | 9/2000 | Mirsky et al. |
| 6,134,578 | A | 10/2000 | Ehlig et al. |
| 6,154,446 | A | 11/2000 | Kadambi et al. |
| 6,226,266 | B1 | 5/2001 | Galand et al. |
| 6,226,735 | B1 | 5/2001 | Mirsky |
| 6,269,435 | B1 | 7/2001 | Dally et al. |
| 6,304,551 | B1 * | 10/2001 | Ramamurthy et al. ........ 370/232 |
| 6,331,977 | B1 | 12/2001 | Spadema et al. |
| 6,349,098 | B1 | 2/2002 | McWilliams |
| 6,483,043 | B1 | 11/2002 | Kline |
| 6,519,259 | B1 | 2/2003 | Baker et al. |
| 6,522,688 | B1 | 2/2003 | Dowling |
| 6,573,905 | B1 | 6/2003 | MacInnis et al. |
| 6,574,217 | B1 | 6/2003 | Lewis et al. |
| 6,580,727 | B1 | 6/2003 | Yim et al. |
| 6,580,793 | B1 | 6/2003 | Dunn et al. |
| 6,597,689 | B1 | 7/2003 | Chiu et al. |
| 6,628,658 | B1 | 9/2003 | Mariggis |
| 6,631,130 | B1 | 10/2003 | Roy et al. |
| 6,631,135 | B1 | 10/2003 | Wojcik |
| 6,636,515 | B1 | 10/2003 | Roy et al. |
| 6,640,239 | B1 | 10/2003 | Gidwani |
| 6,649,428 | B2 | 11/2003 | Kai |
| 6,650,649 | B1 | 11/2003 | Muhammad et al. |
| 6,661,422 | B1 | 12/2003 | Valmiki et al. |
| 6,669,782 | B1 | 12/2003 | Thakur |
| 6,697,345 | B1 | 2/2004 | Corrigan et al. |
| 6,707,821 | B1 | 3/2004 | Shaffer et al. |
| 6,728,209 | B2 | 4/2004 | Pate et al. |
| 6,737,743 | B2 | 5/2004 | Urakawa |
| 6,738,358 | B2 | 5/2004 | Bist et al. |
| 6,747,977 | B1 | 6/2004 | Smith et al. |
| 6,751,224 | B1 | 6/2004 | Parruck et al. |
| 6,751,233 | B1 | 6/2004 | Hann |
| 6,751,723 | B1 | 6/2004 | Kundu et al. |
| 6,754,804 | B1 | 6/2004 | Hudepohl et al. |
| 6,763,018 | B1 | 7/2004 | Puthiyandyil et al. |
| 6,768,774 | B1 | 7/2004 | MacInnis et al. |
| 6,795,396 | B1 | 9/2004 | Parchak et al. |
| 6,798,420 | B1 | 9/2004 | Xie |
| 6,806,915 | B2 | 10/2004 | Koo |
| 6,807,167 | B1 | 10/2004 | Chakrabarti et al. |
| 6,810,039 | B1 | 10/2004 | Parruck et al. |
| 6,813,673 | B2 | 11/2004 | Kotlowski et al. |
| 6,816,750 | B1 | 11/2004 | Klaas |
| 6,826,187 | B1 | 11/2004 | Hey et al. |
| 6,839,352 | B1 | 1/2005 | Vogel |
| 6,853,385 | B1 | 2/2005 | MacInnis et al. |
| 6,892,324 | B1 | 5/2005 | French et al. |
| 6,928,080 | B2 | 8/2005 | Chen |
| 6,934,937 | B1 | 8/2005 | Johnson et al. |
| 6,952,238 | B2 | 10/2005 | Koo |
| 6,959,376 | B1 | 10/2005 | Boike et al. |
| 7,031,341 | B2 | 4/2006 | Yu |
| 7,051,246 | B2 | 5/2006 | Benesty |
| 7,100,026 | B2 | 8/2006 | Dally et al. |
| 7,110,358 | B1 | 9/2006 | Clinton et al. |
| 7,215,672 | B2 | 5/2007 | Reshef et al. |
| 7,218,901 | B1 | 5/2007 | Mobley et al. |
| 2001/0027392 | A1 | 10/2001 | Wiese |
| 2001/0028658 | A1 | 10/2001 | Sakurai et al. |
| 2001/0043603 | A1 | 11/2001 | Yu |
| 2002/0008256 | A1 | 1/2002 | Liu |
| 2002/0009089 | A1 | 1/2002 | McWilliams |
| 2002/0031132 | A1 | 3/2002 | McWilliams |
| 2002/0031141 | A1 | 3/2002 | McWilliams |
| 2002/0034162 | A1 | 3/2002 | Brinkerhoff et al. |
| 2002/0059426 | A1 | 5/2002 | Brinkerhoff et al. |
| 2002/0101982 | A1 | 8/2002 | Elabd |
| 2002/0112097 | A1 | 8/2002 | Milovanovic et al. |
| 2002/0126649 | A1 | 9/2002 | Sakurai et al. |
| 2002/0131421 | A1 | 9/2002 | Reshef et al. |
| 2002/0136620 | A1 | 9/2002 | Anjanaiah et al. |
| 2002/0171769 | A1 | 11/2002 | Koo |
| 2003/0002538 | A1 | 1/2003 | Chen |
| 2003/0004697 | A1 | 1/2003 | Ferris |
| 2003/0021339 | A1 | 1/2003 | Koo |
| 2003/0046457 | A1 | 3/2003 | Anjanaiah et al. |
| 2003/0053484 | A1 | 3/2003 | Sorenson et al. |
| 2003/0053493 | A1 | 3/2003 | Graham Mobley et al. |
| 2003/0058885 | A1 | 3/2003 | Sorenson et al. |
| 2003/0076839 | A1 | 4/2003 | Li et al. |
| 2004/0109468 | A1 | 6/2004 | Anjanaiah |
| 2004/0202173 | A1 | 10/2004 | Yoon |
| 2007/0150700 | A1 | 6/2007 | Dally et al. |
| 2007/0239967 | A1 | 10/2007 | Dally et al. |

OTHER PUBLICATIONS

Lyonnard et al., Automatic Generation of Application-Specific Architectures for Heterogenous Multiprocessor System-on-Chip, Jun. 2001, ACM Press, pp. 518-523, Annual ACM IEEE Design Automation Conference.

Cuviello et al., Fault Modeling and Simulation for Cross in System on Chip Interconnects, Computer-Aided Design, 1999. Digest of Technical Papers. 1999 IEEE/ACM International Conference, Nov. 7-11, 1999, pp. 297-303.

Papchristou et al., Microprocessor based testing for core-based system on chip, 1999. ACM Press, Annual ACM IEEE Design Automation Conference, Proceedings of the 36th ACM/IEEE conference on Design Automation, pp. 586-591, ISBN: 1-58133-109-7.

Picone et al., Enhancing the Performance of Speech Recognition with Echo Cancellation, Apr. 11-14, 1988, Acoustics, Speech, and Signal Processing, 1988. ICASSP-88, pp. 529-532, vol. 1.

Wang et al., Hardware/Software Instruction Set Configurability for System-on-Chip Processors, Jun. 2001, ACM Press, Annual ACM IEEE Design Automation Conference, pp. 184-188, ISBN: 1-58113-297-2.

Lahiri et al, Fast Performance Analysis of Bus-Based System-On-Chip Communication Architectures, Nov. 7-11, 1999, pp. 566-572, Computer-Aided Design, 1999. Digest of Technical Papers. 1999 IEEE/ACM International Conference.

Juarez et al., A VLSI Architecture for MPEG-4 Stream Processing and Communication, Packet Video 2000, IEEE.

Juarez et al, A System-on-a-Chip for Multimedia Stream Processing and Communication, EUSIPCO 2000, International Society for Magnetic Resonance in Medicine.

* cited by examiner

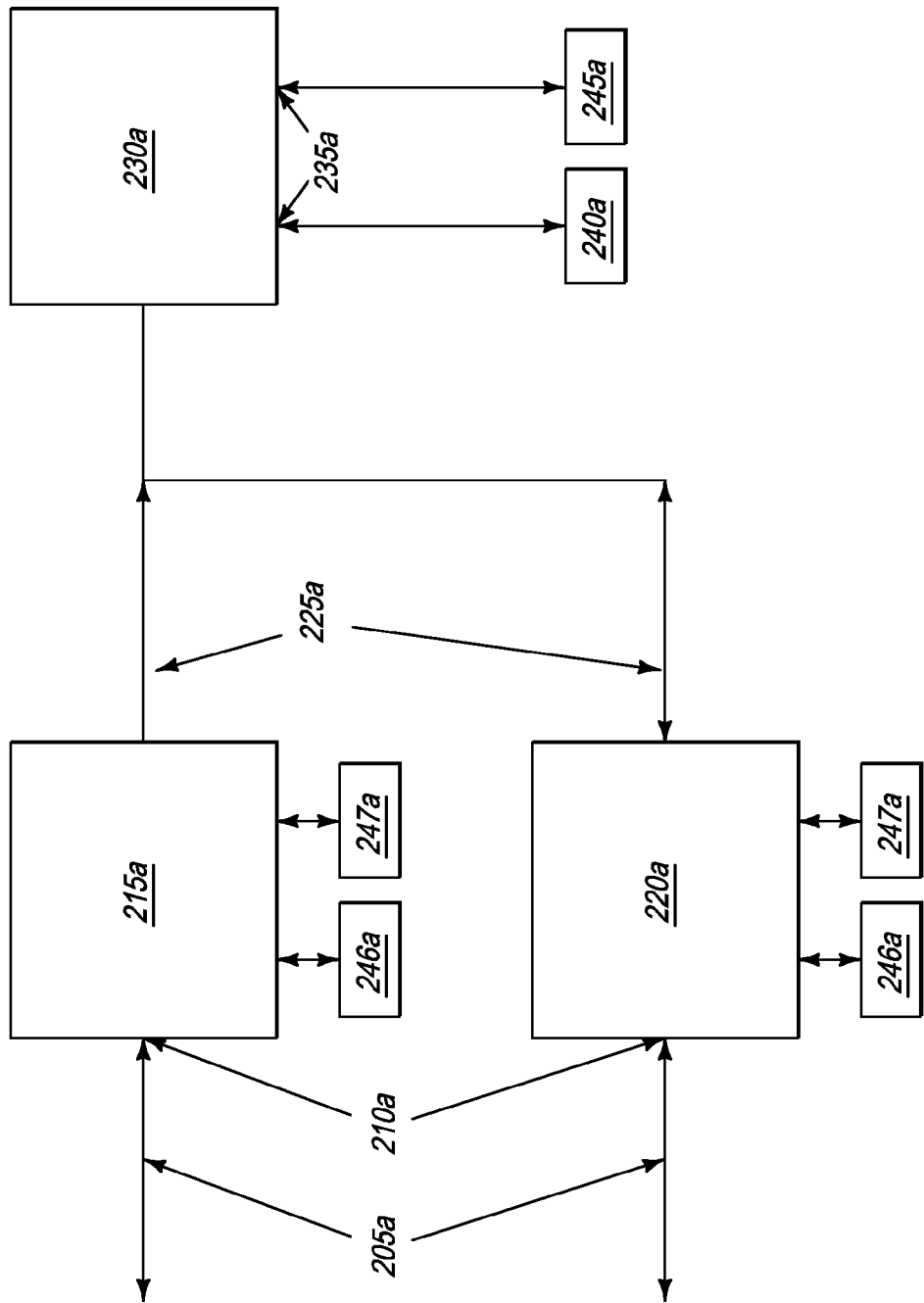

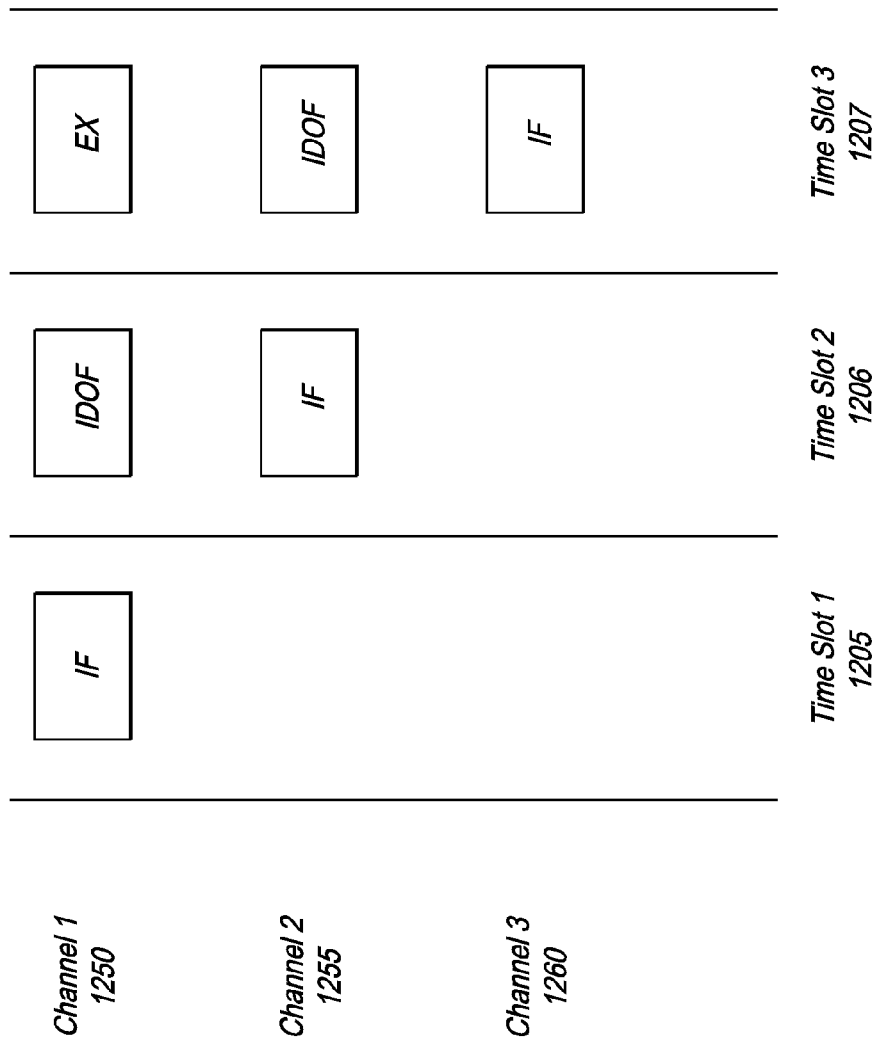

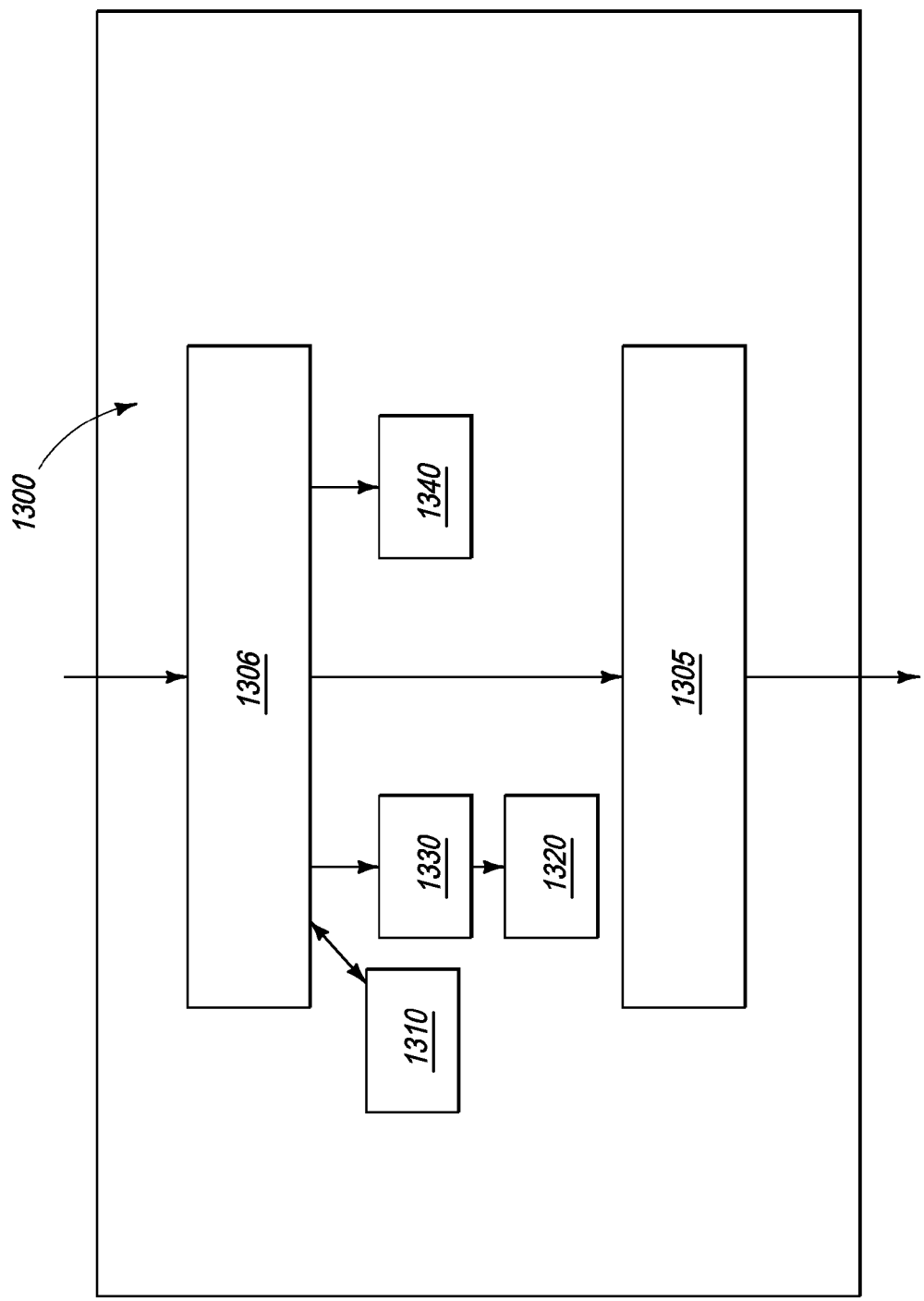

METHODS AND SYSTEMS FOR MANAGING VARIABLE DELAYS IN PACKET TRANSMISSION

RELATED APPLICATION DATA

This is a continuation of U.S. patent application Ser. No. 10/084,559, filed on Feb. 25, 2002 now abandoned, which is a continuation-in-part of patent application Ser. No. 10/004,753, for DISTRIBUTED PROCESSING ARCHITECTURE WITH SCALABLE PROCESSING LAYERS, filed Dec. 3, 2001 now abandoned.

FIELD OF THE INVENTION

The present invention relates generally to a method and system for the communication of digital signals, and more particularly to a method and system for managing delays in packet transmission, e.g. managing jitter, using a buffering procedure, and to a media gateway deploying the jitter management methods and systems.

BACKGROUND OF THE INVENTION

Media communication devices comprise hardware and software systems that utilize interdependent processes to enable the processing and transmission of analog and digital signals substantially seamlessly across and between circuit switched and packet switched networks. As an example, a voice over packet gateway enables the transmission of human voice from a conventional public switched network to a packet switched network, possibly traveling simultaneously over a single packet network line with both fax information and modem data, and back again. Benefits of unifying communication of different media across different networks include cost savings and the delivery of new and/or improved communication services such as web-enabled call centers for improved customer support and more efficient personal productivity tools.

Such media over packet communication devices (e.g., Media Gateways) require substantial processing power with sophisticated software controls and applications to enable the effective transmission of data from circuit switched to packet switched networks and back again. One form of media transmission, referred to as voice-over-IP (VoIP), is the transport of voice traffic through the use of the Internet protocol. VoIP requires notably less average bandwidth than a traditional circuit-switched connection for several reasons. First, by detecting when voice activity is present, VoIP can choose to send little or no data when a speaker on one end of a conversation is silent, whereas a conventional, circuit-switched telephone connection continues to transmit during periods of silence. Second, the digital audio bit stream utilized by VoIP may be significantly compressed before transmission using a codec (compression/decompression) scheme. Using current technology, a telephone conversation that would require two 64 kbps (one each way) channels over a circuit-switched network may utilize a data rate of roughly 8 kbps with VoIP.

In the transmission of digital data between a source and a destination apparatus, frequency distortion known as jitter may be introduced. Jitter is the variable delay experienced in the course of packet transmission, resulting in varied packet arrival times, and is caused by networks providing different waiting times for different packets or cells. It may also be caused by lack of synchronization, which results from mechanical or electrical changes. Given the real time nature of a live connection, jitter buffer management policies have a large effect on the overall data quality. If the data is in the form of a voice, actual sound losses range from a syllable to a word, depending on how much data is in a given packet.

To rectify the problem of jitter, a receiver may include a buffer to store packets for an amount of time sufficient to allow sequenced, regular playout of the packets. However, an efficient technique is needed to determine the receiver buffer playout length and timing in real time data communications such as VoIP. If the buffer delay or length is too short, "slower" packets will not arrive before their designated playout time and playout quality suffers. If the buffer delay is very long, it conspicuously disrupts interactive communications. Accurate knowledge of actual packet delays is necessary to determine optimal packet buffer delay for real-time communications.

One approach to devising an appropriate buffer is to construct and maintain a distribution of the number of packets received by a system over time, namely a histogram. A buffer may then be constructed by equating the buffer length to the entire length of the histogram and equating the buffer initiation point to the time when the first packet is received, e.g., the minimum delay.

Referring to FIG. 1a, a graph 100a depicts a histogram 101a of a number of packets received relative to time. The x-axis 102a represents the delay experienced by packets and the y-axis 103a represents the number of packet samples received. The vertical bars 104a show the number of packets received in a defined span of time. A curve 105a connects the central point of tops of the bars 104a of the histogram 101a. The curve 105a depicts the distribution of the arrival time of packets. This curve is called the packet delay distribution (PDD) curve. Typically, in telecommunications applications, PDD curves are often skewed earlier in time due to less delay experienced by most of the packets and, therefore, are often not symmetrical around the peak. One of ordinary skill in the art would be familiar with methods of creating histograms.

Despite existing jitter buffering methods, an improved method and system for playing out packets from media gateways by adaptively adjusting the buffer size delay is needed. More specifically, hardware and software systems and methods are needed that can adaptively determine the buffer size and the buffer initiation point while not being substantially resource intensive.

SUMMARY OF THE INVENTION

The present invention provides improved methods and systems for the determination of jitter buffers. The present invention enables the generation of buffers having sizes and delays such that, as designed, the buffers capture a substantial majority of packets while not being resource intensive.

In a first embodiment, a packet delay histogram is estimated using any one of several delay estimation techniques. The histogram represents the distribution of the number of packets received by a system over a defined time. With the distribution in delay determined, a playout delay evaluator calculates a plurality of variances, centered around a distribution peak, or mean average delay, and applies those variances to determine the buffer size and delay. The playout buffer monitor uses this calculated buffer size and delay to select, store and playout packets at their adjusted playout time.

The present invention may be employed in a media gateway that enables data communications among heterogeneous networks. Media gateways provide media processing functions, data packet encapsulation, and maintain a quality of service level, among other functions. When a gateway operates as a receiver of voice data traffic, it buffers voice packets and outputs a continuous digital or analog stream. The present invention may be deployed to manage jitter experienced in the course of receiving packetized data and processing the data for further transmission through a packet-based or circuit-switched network.

BRIEF DESCRIPTION OF THE DRAWINGS

These and other features and advantages of the present invention will be appreciated, as they become better understood by reference to the following Detailed Description when considered in connection with the accompanying drawings, wherein:

FIG. 2a is a block diagram of a first embodiment of a hardware system architecture for a media gateway;

FIG. 12 is a time-based schematic of the pipeline processing conducted by the first preferred processing unit;

FIG. 13 is a block diagram representation of a second preferred processing unit;

DETAILED DESCRIPTION OF THE INVENTION

Figure 1A:
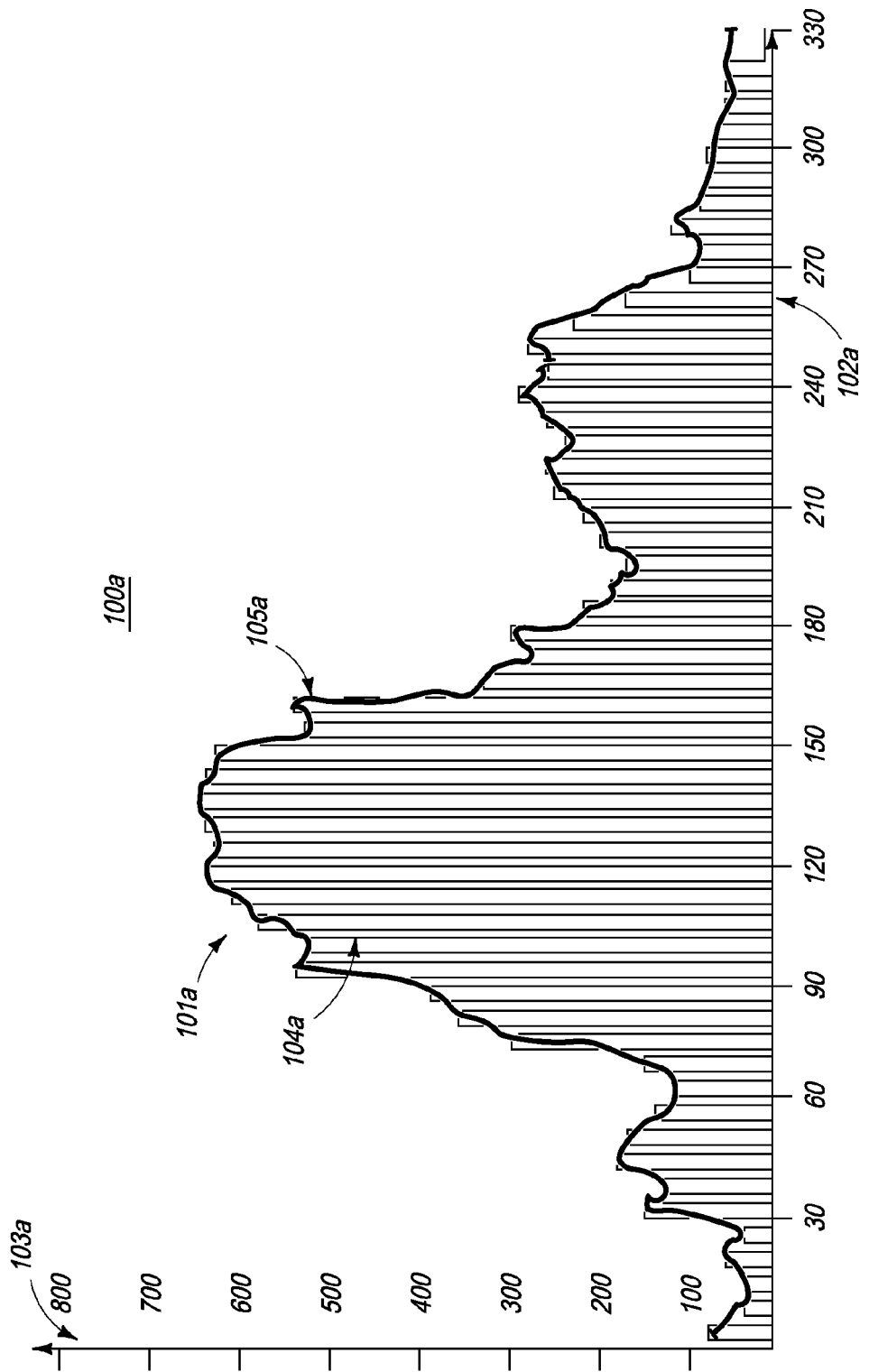
FIG. 1a is a histogram depicting packets received by a system over time.

The present invention provides a method and system for jitter management using an adaptive buffer estimation procedure. One use of the present invention is as a novel media gateway, designed to enable the communication of media across circuit switched and packet switched networks, and encompasses novel hardware and software methods and systems. The present invention will presently be described with reference to the aforementioned drawings. Headers will be used for purposes of clarity and are not meant to limit or otherwise restrict the disclosures made herein. It will further be appreciated, by those skilled in the art, that use of the term "media" is meant to broadly encompass substantially all types of data that could be sent across a packet switched or circuit switched network, including, but not limited to, voice, video, data, and fax traffic. Where arrows are utilized in the drawings, it would be appreciated by one of ordinary skill in the art that the arrows represent the interconnection of elements and/or components via buses or any other type of communication channel.

In one jitter management approach, a clock is derived from a digital data signal and the data signal is stored in a buffer. The derived clock is input to an input counter, which counts a predetermined number of degrees out of phase with an output counter. For instance, the input counter may be initialized 180 degrees out of phase with the output counter. When the input counter is at a maximum counter value, such as 31 in the case where the input counter contains 5 flip-flops, the output counter value is adjusted in accordance with the information processed from a look-up table, preferably a read-only table. This table outputs a coefficient to a numerically controlled oscillator (NCO). The NCO includes a low frequency portion that adds the coefficient successively to itself and outputs a carry out (CO) signal. A high frequency clock, around 100 MHz, is fed to the high frequency portion of the NCO, which preferably divides down the high frequency clock to a clock frequency that is centered at the desired output frequency. The high frequency portion preferably includes an edge detect circuit that receives the CO signal and adjusts the frequency of the output clock to produce a compensation clock. The compensation clock adjusts the output counter, which causes the output buffer to delay a packet of data for a pre-determined amount of time, thereby outputting a digital signal that is substantially free of jitter.

Figure 1B:
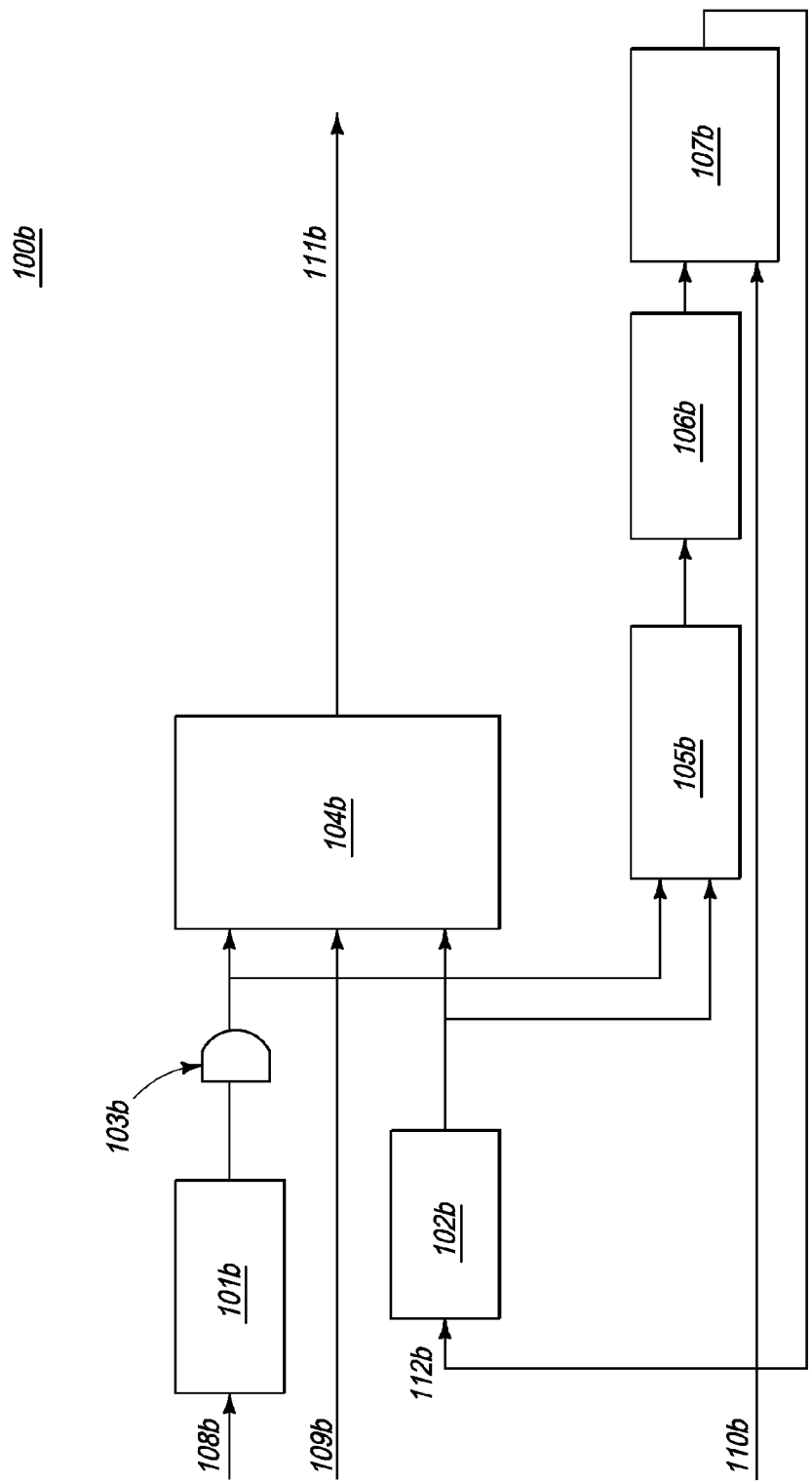
FIG. 1b is a block diagram of a system that employs a first-in, first-out (FIFO) buffer and a numerically controlled oscillator (NCO) for jitter correction.

Referring to FIG. 1b, a block diagram of a system 100b that employs a FIFO buffer 104b and a numerically controlled oscillator (NCO) 107b for jitter correction is provided. It includes an input counter 101b, an output counter 102b, an AND gate 103b, a buffer 104b, a phase detection latch 105b, a read only memory (ROM) 106b, an input data line 109b, an output line 111b producing jitter free data, a numerically controlled oscillator (NCO) 107b, and a high frequency clock 110b in communication with the NCO 107b. Input counter 101b is coupled to an input clock signal line 108b.

Variation in packet delay is not a static process. As such, algorithmic approaches are required to estimate packet delay statistics with time-based estimates such as packet mean arrival time and variances from mean arrival time. Dynamic play-out delay adaptation algorithms rely for their adaptive adjustments on the statistics obtained from the timestamp and variable delay histories of the packets received. Such information, such as timing and stream (continuous data packets after a break) number information, may be gathered from streams of data, and future network delay values are predicted by constructing a measured packet-delay distribution curve. The system maintains a delay histogram, each storing the relative frequency with which a particular delay value is expected to occur among the arriving packets. The histogram is then used to approximate the distribution in the form of a curve.

Figure 1C:
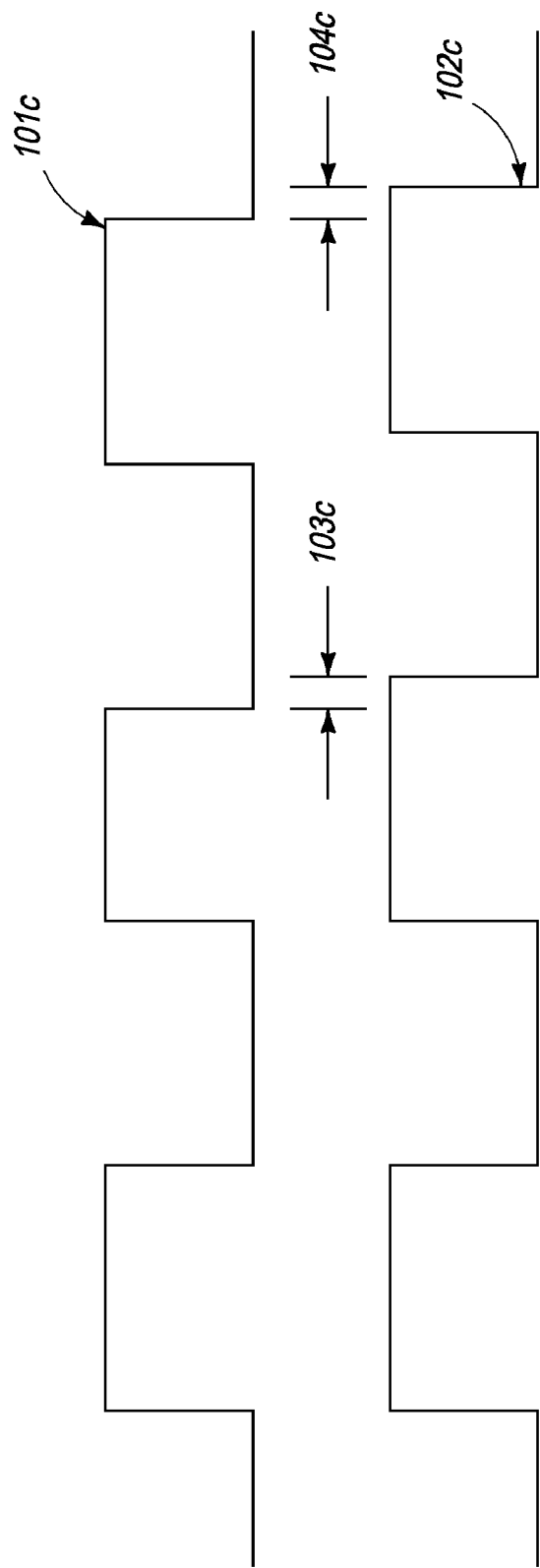
FIG. 1c is a schematic waveform representation of jitter.

Referring to FIG. 1c, jitter originates and propagates over a network in a digital signal. Waveform 101c is the ideal communication signal and waveform 102c is the signal with jitter. An unexpected delay 103c arises in the signal that may be due to queuing of packets at connecting terminals. The delay 103c escalates as the signal traverses through the network, resulting in delay 104c. That variation in delay, calculated as the difference between 103c and 104c, is jitter and can increase, decrease, or otherwise modify over time, causing continual variations in the delay time.

Figure 1D:
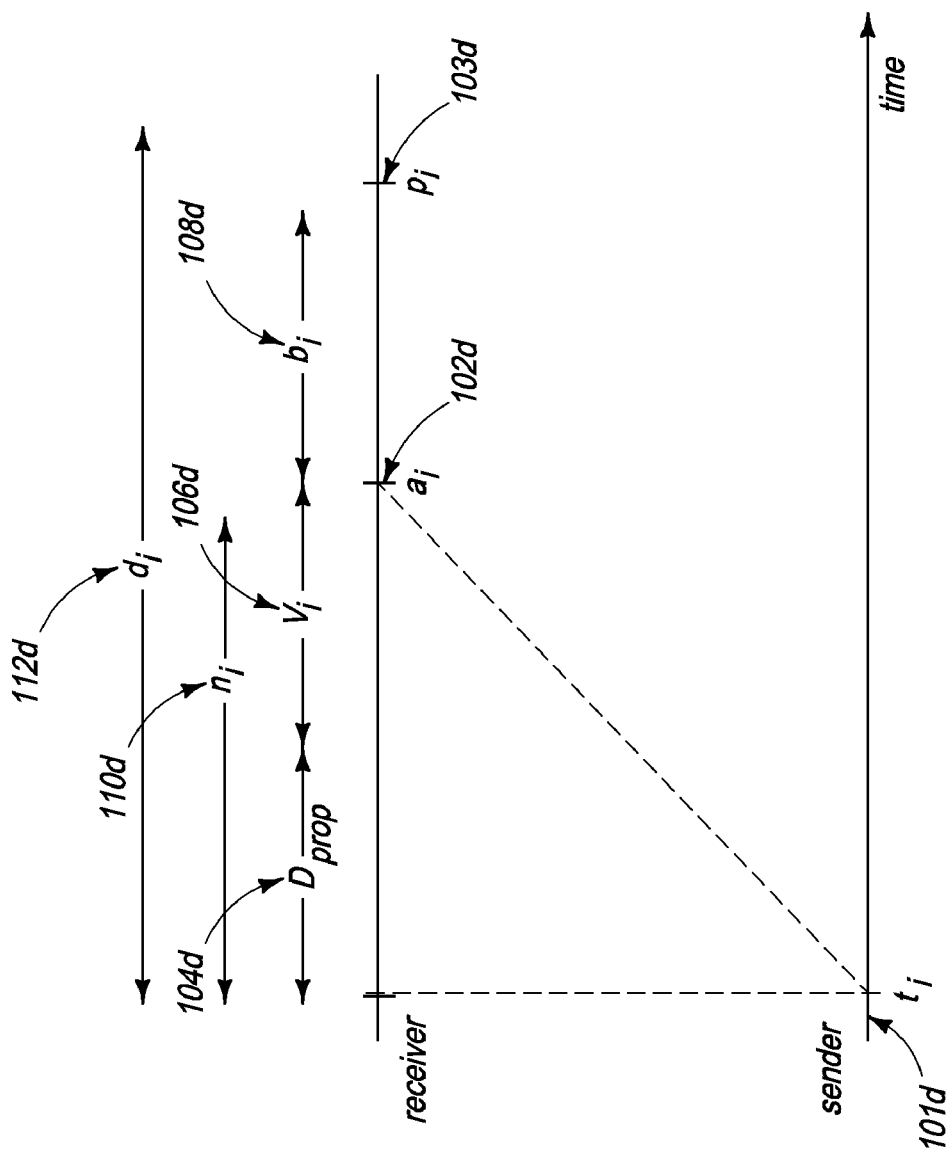
FIG. 1d is a diagram illustrating timings associated with the sending and receiving a packet.

FIG. 1d depicts the various timings associated with the sending and receiving of packet i having data. The packet i is generated by the sending host at time 101d represented by $t_i$. The packet i is received at the receiving host at time 102d represented by $a_1$. The packet i is played out at the receiving host at time 103d represented by $p_i$. $D_{prop}$ 104d is the fixed propagation delay from the sender to the receiver, which is assumed to be constant, and set to be the minimum of the delay experienced by any packet. This delay 104d is revised each time a packet is received whose propagation delay is lesser than $D_{prop}$ 104d and set equal to the propagation delay of that packet. The variable delay, $v_i$, 106d experienced by packet i as it is sent from the source to the destination host can be calculated as $v_i = a_i - D_{prop}$. The amount of time, $b_i$, 108d that packet i spends in the buffer at the receiver awaiting its scheduled playout time can be calculated as $b_i = p_i - a_i$. The amount of time, $d_i$, 112d from when the ith packet is generated by the source until it is played out at the destination host can be calculated as $d_i = p_i - t_i$, and shall be referred to as the playout delay of packet i. The delay, $n_i$, 110d introduced by the network can be calculated as $n_i = a_i - t_i$.

To construct a histogram for determining the buffer size and delay, packet delays need to be determined. A plurality of methods may be used to calculate delay. In one approach, the jitter buffer system incorporates a method that uses a linear recursive filter and is characterized by the weighting factor alpha. The delay estimate is computed as:

$$d_i = \alpha * d_{i-1} + (1-\alpha) * n_i$$

And the variation is computed as:

$$v_i = \alpha v_{i-1} + (1-\alpha)|d_i - n_1|$$

where $\alpha$ is a weighting factor, $d_i$ is the amount of time from when the ith packet is generated by the source until it is played out at the destination host, $n_i$ is the total delay introduced by the network, and $v_i$ is the variable delay experienced by packet i as it is sent from the source to the destination host.

A second approach adapts more quickly to the short burst of packets incurring long delays by using a weighting mechanism which incorporates two values into the weighting factor, one indicative of increasing trends in the delay and one indicative of decreasing trends.

if $(n_i > d_i)$ then $$d_i = \beta * d_i + (1-\beta) * n_i$$

else $$d_i = \alpha * d_i + (1-\alpha) * n_i$$

A third approach calculates the delay estimate as:

$$d_i = \min_{j \in Si}\{n_j\}$$

where $S_i$ is the set of all packets received during the talk spurt prior to the one initiated by packet i.

A fourth approach adapts to sudden, large increases in the end-to-end network delay followed by a series of packets arriving almost simultaneously, referred to herein as spikes. The detection of the beginning of a spike is done by checking the delay between consecutive packets at the receiver so that the delay is large enough for it to constitute a spike. For example:

if (abs($n_i - n_{i-1}$)>spike_threshold) mode=IMPULSE;

A variable var is employed with an exponentially decaying value that adjusts to the slope of spike. When this variable has a small enough value, indicating that there is no longer a significant slope, the algorithm reverts back to normal mode.

```
1.  n_i = Receiver_timestamp – Sender_timestamp;
2.  if (mode = NORMAL) {
        if (abs(n_i – n_{i-1}) > abs(v) * 2 + 800){
            var = 0; /* Detected beginning of spike */
            mode = IMPULSE;
        }
    else {
        var = var/2 + abs((2n_i – n_{i-1} – n_{i-2})/8;
        if (var ≧ 63){
            mode = NORMAL; /* End of spike */
            n_{i-2} = n_{i-1};
            return;
        }
    }
3.  if(mode = NORMAL)
        d_i = 0.125 * n_i + 0.875 * d_{i-1};
    else
        d_i = d_{i-1} + n_i – n_{i-1};
```

```
v_i = 0.125 * abs(n_i - d_i) + 0.875 * v_{i-1};
4.   n_{i-2} = n_{i-1};
     n_{i-1} = n_i;
     return;
```

By calculating the packet delays as against the number of packets received, a packet delay histogram may be constructed. The packet delay histogram may be used to determine the required buffer size and delay by, for example, equating the buffer length to the length of the histogram and the buffer delay to the minimum delay experienced by the received packets, represented by the first data points on the histogram.

Relying on an entire histogram for estimating the buffer size is resource intensive, however. It is preferred, rather, to use only the most important parts of the histogram for constructing the buffer, more specifically to limit the buffer to times when a majority of packets arrive. Therefore, once the histogram is estimated using a particular packet delay calculation method, it is preferred to choose a portion of the histogram to enable the efficient determination of a buffer size and delay.

One approach is to calculate the variance of the histogram, specifically the standard deviation around when the peak number of packets arrive, and add that variance to a minimum delay experienced by the system. For example, if the variance is 60 ms and the minimum delay is 30 ms, then the buffer begins storing packets at 30 ms point and continues storing packets for 60 ms. To better correspond to experimental conditions, the variance used to determine the buffer parameters can be a calculated variance derived by multiplying the variance of the histogram by a multiplier (k).

Another approach is to define the selected histogram portion as the variance around the peak of the histogram. The histogram peak may be calculated by computing the mean, or the average delay of the histogram. In calculating the peak, it is preferred to first eliminate a portion of the histogram tail to avoid having the trailing portion of the histogram excessively skew the calculation. The average is then calculated and associated with the peak. Using the peak, the variance of the histogram may be calculated. Once the peak and variance of the histogram is calculated, the buffer size of the histogram is obtained.

Preferably, the variance used to determine the buffer parameters is a calculated variance derived by multiplying the variance of the histogram by a multiplier (k). For example, to capture packets around the peak, the buffer size should preferably encompass a period=k*variance where k=2, thereby capturing packets within the variance period before the peak and within the variance period after the peak. The buffer initiation point, or minimum delay, is defined as minimum delay=mean−(k/2)*variance. For example, where the variance is 80 ms and the mean is 150 ms, the buffer begins accepting packets at 70 ms and continues accepting for another 160 ms, or up to 230 ms.

Figure 1E:
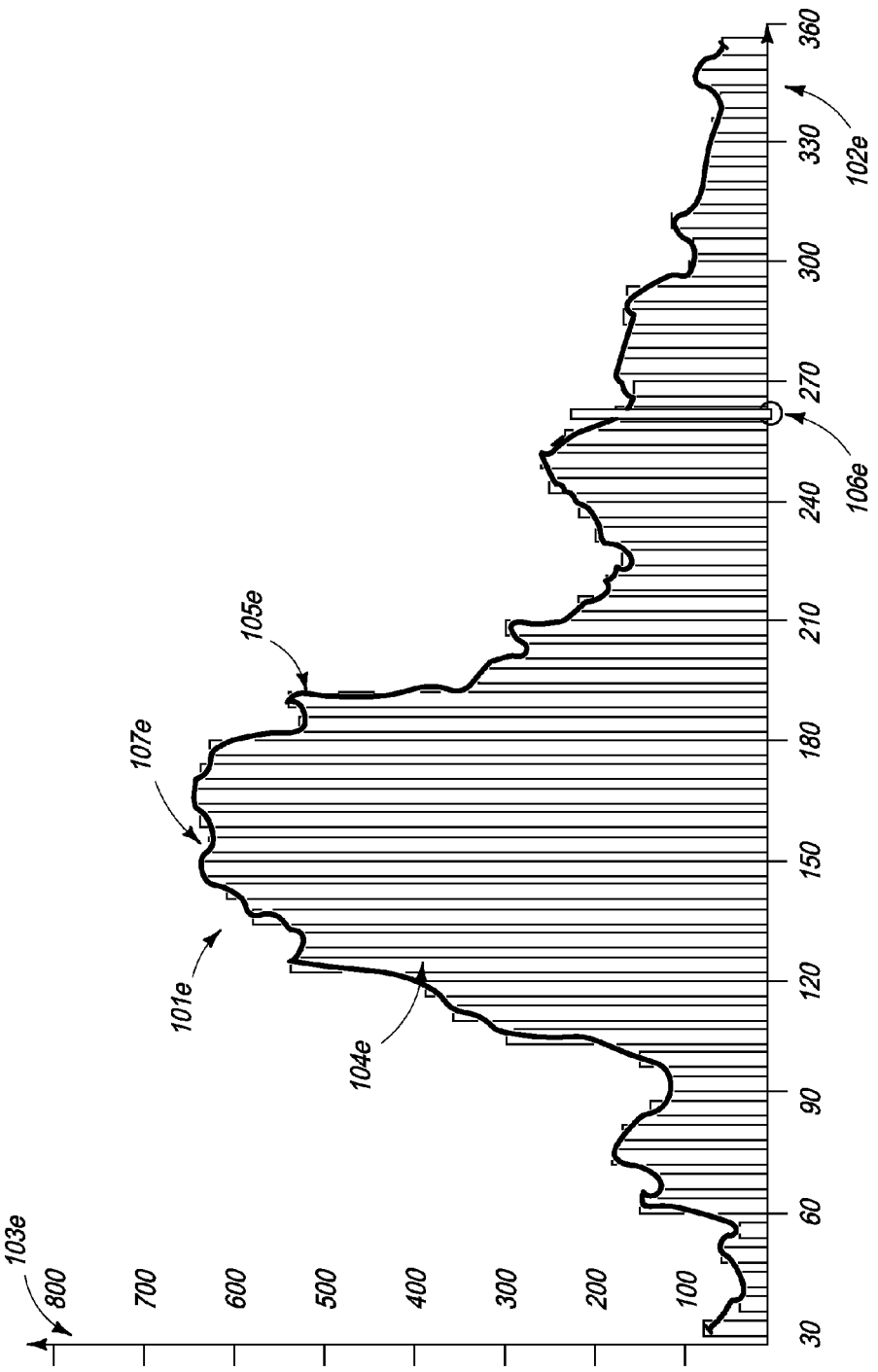
FIG. 1e depicts a histogram calculation employed in one approach of designing a buffer.

Referring to FIG. 1e, the graph represents histogram 101e of a packet stream, specifically a depiction of the number of packets received at different points in time by the system. The x-axis 102e represents the delay experienced by packets and the y-axis 103e represents the number of packet samples received. The vertical bars 104e show the number of packets received in a defined span of time. A curve 105e connects the central point of tops of the bars 104e of the histogram 101e. The curve 105e depicts the distribution of the arrival time of packets.

To avoid skewing the peak, or mean delay, calculation, the tail is eliminated at a defined point 106e, which in this example is 270 ms on the x-axis 102e. Therefore, the histogram area to the right of point 106e is discarded. The mean of the curve 107e may be calculated by using the formula:

$$M = \frac{\sum x_i}{N}$$

where M is the mean, $x_i$ represents the amount of delay experienced by packets arriving in a particular window of time i, and N is the total number of samples. Then the variance, Var, is calculated by using the formula:

$$\text{Var} = \frac{\sum (x_i - M)^2}{N} \text{ or } \text{Var} = \frac{\sum |x_i - M|}{N}$$

As shown in FIG. 1e, the mean is 150 ms and the variance is 90 ms.

With the mean delay and variance having been calculated, the buffer size may be defined as k*Var, where k can be any number, but is preferably in the range of 2 to 8 and more preferably either 2, 4 or 8, and the buffer begins accepting packets at the point defined by Initiation Point=M−(k/2)*Var In the present example the initiation point equals 60 ms, k=2, and buffer size equals 180 ms. Thus, the buffer accepts packets from 60 ms to 240 ms.

Figure 1F:
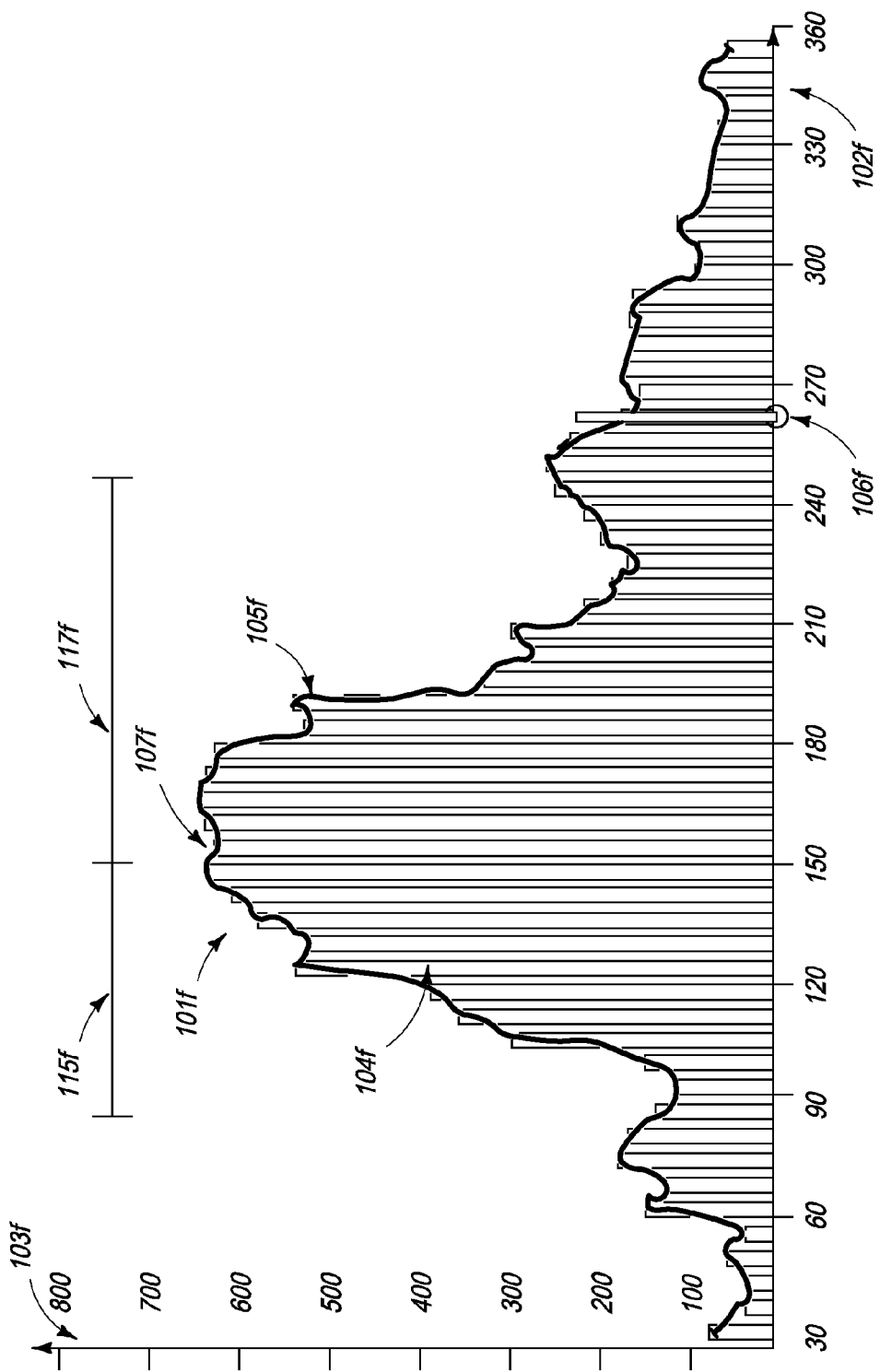
FIG. 1f depicts a histogram calculation employed in a preferred embodiment of the present invention.

Referring to FIG. 1f, the graph represents histogram 101f of a packet stream received by a system. The x-axis 102f represents the delay experienced by packets and the y-axis 103f represents the number of packet samples received. The vertical bars 104f show the number of packets received in a defined span of time. A curve 105f connects the central point of tops of the bars 104f of the histogram 101f. The curve 105f depicts the distribution of the arrival time of packets.

As previously discussed, to avoid skewing the peak, or mean delay, calculation, the tail is eliminated at a defined point 106f, which in this example is 270 ms on the x-axis 102f. Therefore, the histogram area to the right of point 106f is discarded. The mean of the curve 107f may be calculated by using the formula $$M = \frac{\sum x_1}{N}$$

where M is the mean, $x_1$ represents the amount of delay experienced by packets arriving in a particular window of time i, and N is the total number of samples.

Rather than determine a single variance for the histogram and utilize that single variance to calculate the buffer size and delay, the preferred embodiment of the invention utilizes at least two separately calculated variances to better estimate the buffer size and delay based upon the estimated histogram. Preferably, to calculate the plurality of variances, the histogram is conceptually divided into two portions, a portion encompassing the packets arriving after the mean delay and a portion encompassing packets that arrived prior to the mean delay. Where i packets have been received and the mean delay is associated with packet m, then the two histogram portions are defined by $D_0$ to $D_{m-1}$ and the second defined by $D_{m+1}$ to $D_i$, or the final packet. The variance of $D_0$ to $D_{m-1}$, $Var_1$, may be calculated using the formula:

$$Var_1 = \frac{\sum (x_j - M)^2}{(N_{0\ to\ m-1})} \text{ or } Var = \frac{\sum |x_j - M|}{(N_{0\ to\ m-1})}$$

where j extends from 0 to m−1 and the total number of samples includes those samples from 0 to m−1. Similarly, the variance of $D_{m+1}$ to $D_i$, $Var_2$, may be calculated using the formula:

$$Var_2 = \frac{\sum (x_j - M)^2}{(N_{m+1\ to\ 1})} \text{ or } Var = \frac{\sum |x_j - M|}{(N_{m+1\ to\ i})}$$

where j extends from m+1 to i and the total number of samples includes those sample from m+1 to i. Although the two separately calculated variances are calculated using one sample set of packets arriving before the mean delay and one sample set of packets arriving after the mean delay, one would appreciate that the sample set of packets can be calculated using sample sets that overlap or that, when taken together, comprise a subset of packets received.

Typically, the two variances are not equal because the histogram is asymmetrical. As shown in FIG. 1f, $Var_1$ 115f is less than $Var_2$ 117f, reflective of the asymmetrical nature of the histogram and better approximating the actual distribution of packets received. This approach therefore represents an improved approach to ascertaining the size and placement of the buffer more accurately while optimizing computational resources.

Optionally, $Var_1$ can be calculated from $Var_2$, or vice versa, using pre-defined equations. As an example, $Var_1$ could be a multiple or factor of $Var_2$, i.e., $Var_1 * C = Var_2$, where C is a constant that is determined experimentally. Alternatively, $Var_1$ could be a fixed value depending on whether $Var_2$ exceeds or does not exceed certain threshold value.

After the peak and variances are calculated, the buffer size and timing can be determined. The buffer starts accepting packets at delay d, which is determined by subtracting $Var_1$ 115f from the mean 107f.

$d = M - Var_1$ and continues accepting for a period (T) which is the sum of the two variances.

$T = Var_1 + Var_2$

For example, where the $Var_1$ is 60 ms, $Var_2$ is 105 ms and the mean is 150 ms, the buffer starts accepting packets at 90 ms and continues accepting for period T of 165 ms, or up to 255 ms. The variances used to determine the buffer parameters can also be calculated variances derived by multiplying $Var_1$ and/or $Var_2$ by a multiplier (k) where the multiplier any number, but preferably in the range of 2-7, and more preferably around 2, 4 or 8.

Figure 1G:
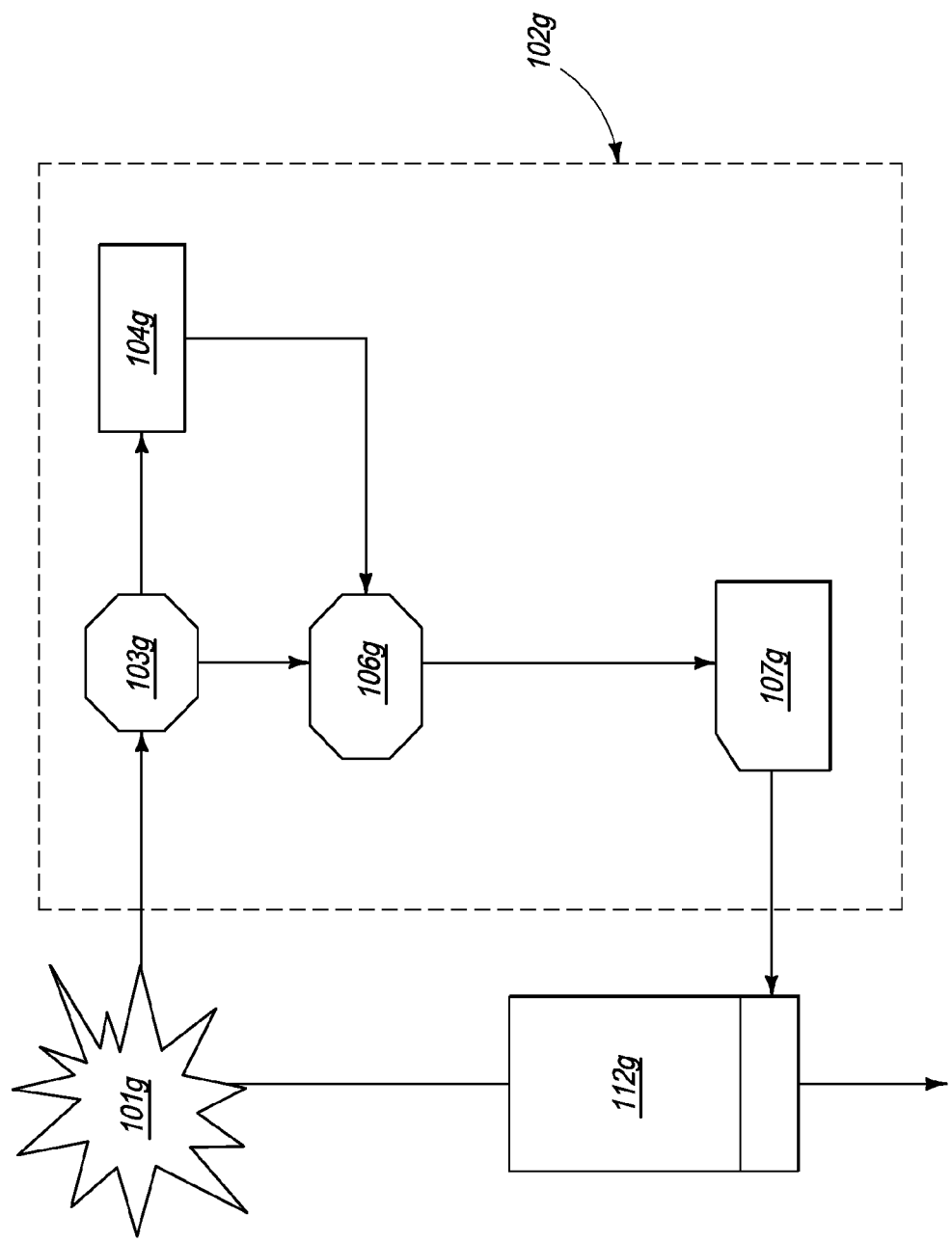
FIG. 1g is an embodiment of the adaptive playout-buffering process of the present invention.

FIG. 1g depicts a block diagram of an adaptive process used for jitter correction using the above-described buffering method. The system comprises a sender 101g and a receiver 102g, which is comprised of a subtractor 103g, a delay evaluator 104g, a playout delay evaluator 106g, and a playout buffer monitor 107g. After being properly delayed, the packet is then sent to playout unit 112g.

Packet i is sent from the sender 101g with a timestamp $t_i$ and reaches the receiver at time $a_i$. Using the timestamp, the subtractor 103g subtracts $a_i$ from $t_i$ to produce the delay $n_i$ for the packet i. The delay evaluator 104g analyzes this value and performs one of the aforementioned delay evaluation techniques to generate the distribution of delays that comprise a packet delay histogram. The estimated packet delay histogram is communicated by the delay evaluator 104g to the playout delay evaluator 106g which, based upon a portion of the communicated histogram, determines the size and delay of the buffer employed by the playout buffer monitor 107g. The receiver 102g, in accordance with the adjusted playout time, outputs packets to the playout unit 112g for the final playout of the packet.

In an embodiment, upon determining mean delay and variance(s), delay smoothing is applied to the actual playout of packets by a delay smoother. While mean delay and variance are used to determine a calculated playout time, the use of delay smoothing further controls changes in playout time to specifically improve voice quality. Increases in playout time are increased to larger steps while decreases in playout time are limited to smaller steps. If the calculated playout time calls for an increase in buffer delay, buffer delay is increased by an amount greater than requested. If the calculated playout time calls for a decrease in buffer delay, buffer delay is decreased by an amount less than requested.

Figure 1H:
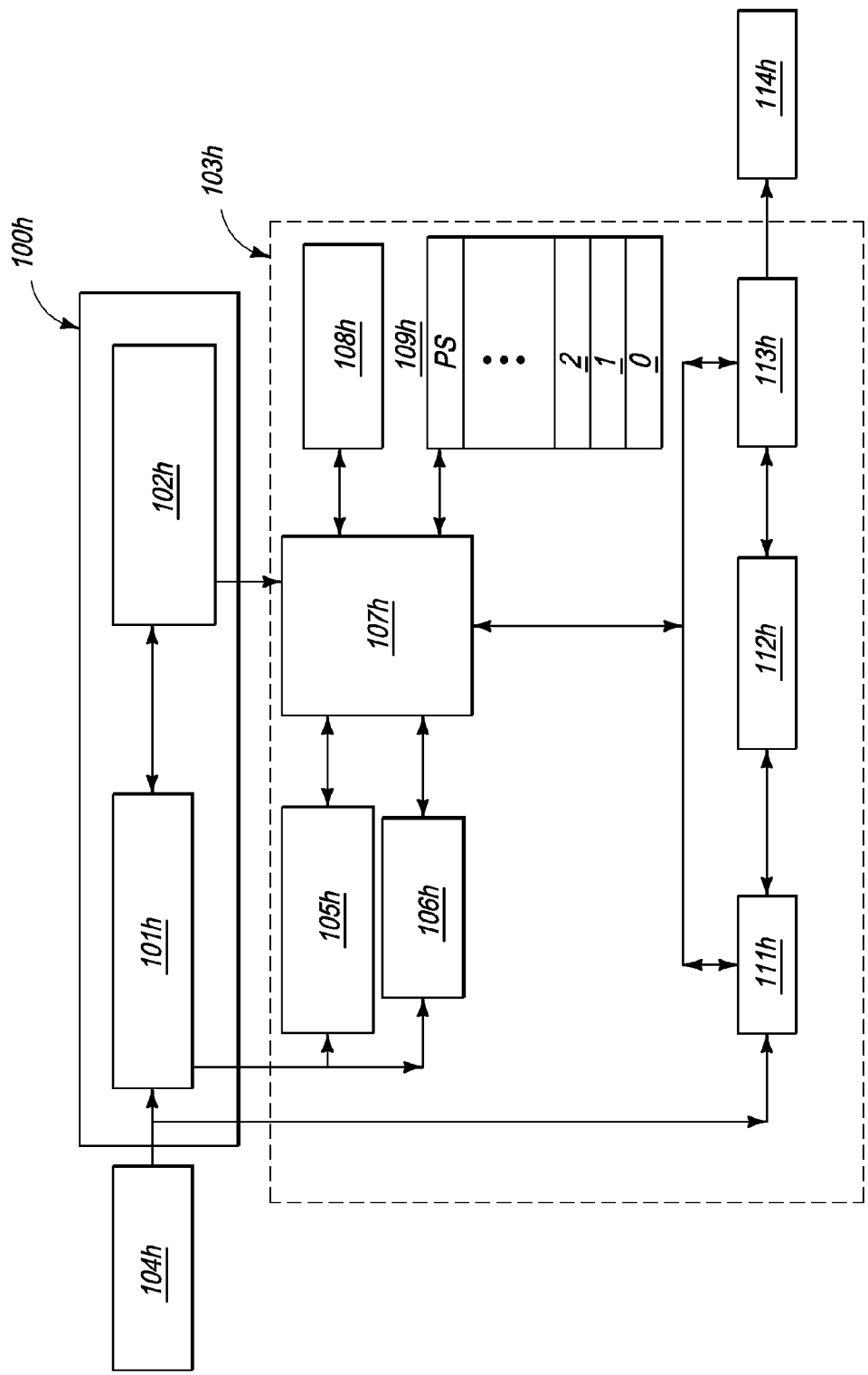
FIG. 1h is an arrangement of a playout delay evaluator and buffer monitor used in the present invention.

Referring to FIG. 1h, the playout delay evaluator 100h and playout buffer monitor 103h are shown in communication with an output device 114h and data input 104h. The playout delay evaluator 100h preferably comprises a control circuit 101h and packet delay distribution system 102h for the calculation of buffer size and delay characteristics. The playout buffer monitor 103h preferably comprises a packet data storage memory 112h, buffer control circuit 107h, delay timer 108h, pointer list 109h, and input and output controllers 111h and 113h respectively. It also contains stream parameter block 105h and drift control block 106h. The calculation of the mean delay and variances used to determine the buffer size and delay characteristics may be performed by the delay evaluator or by the playout delay evaluator 100h, based upon data received from the delay evaluator.

Together with the packet delay distribution system, the control circuit 101h manages the calculation, and communication of, a set of buffer configuration parameters for each data stream and allocates buffer resources for each stream. Control circuit 101h calculates the buffer size requirements for the stream using the packet size S (p), in bytes, and the packet rate T(r), e.g. one packet every 10 milliseconds. Dividing the buffer delay, BD, by the packet rate T(r) yields the number of packets PS that the buffer needs to accommodate i.e., the number of packet slots in the buffer 103h.

$PS = BD/T(r)$

The buffer size, S (B), is then the product of packet size S (p) and the number of packet slots PS.

$S(B) = PS * S(p)$

Control circuit 101h allocates a block of memory 112h having S (B) bytes and a pointer list 109h having PS slots for buffering each stream. Control circuit 110h also initializes buffer control circuits 107h for the stream. As shown in FIG. 1h, an input controller 111h and an output controller 113h are allocated to the buffer 103h. Input and output controllers 111h and 113h transfer data between the data input 104h or output device 113*h*, respectively, and the buffer memory 112*h*. Buffer control 107*h* contains all the logic circuits necessary to oversee operation of buffer 103*h* and provide updated information to control circuit 101*h*.

Buffer control 107*h* maintains a packet pointer for each data packet stored in buffer 103*h*. Each packet pointer contains the starting address of its respective packet contained in memory 112*h*. The pointers are stored by buffer control 107*h* in pointer list 109*h*, which has a fixed number of slots, equal to PS, for storing packet pointers. Buffer control 107*h* manipulates pointer list 109*h* as a shift register with PS slots, numbered 0 through PS−1. Slot 0 contains the pointer for the packet, which is to be output next. The contents of each slot is shifted into the next adjacent slot towards the output slot 0, at the packet rate, namely, every T(r) seconds. The buffer delay of a packet is determined by the position of its pointer in the pointer list 109*h*. A packet whose pointer is in the $3^{rd}$ slot will experience a buffer delay of 3*T(r) seconds.

As each packet is received by buffer circuit 103*h*, the proper location of storing the packet in the buffer memory 112*h* is determined by buffer control circuit 107*h*, which passes a packet pointer, i.e., a starting address for the location in the memory where the packet data will be stored, to input circuit 111*h*. Input circuit 111*h* stores the packet data in memory starting at the pointer address as the data is received from network 104*h*.

The starting address is also stored as a packet pointer in the pointer list 109*h* at a slot location determined by the buffer control circuit 107*h*. The pointers may be placed in the pointer list at slot locations determined by the packet sequence. Thus, if packet i+2 is received after the first packet i, it is placed 2 slots higher in the list than the present location of the pointer for packet i, provided that packet i−2 is not earlier in the sequence than the packet last output by output circuit 113*h*. The use of packet sequence information to select slot locations helps out of order packets to be re-ordered without moving packet data.

Control circuit 101*h* checks the sequence number of each packet being received against the sequence number of the packet last output by output circuit 113*h*. If the sequence number of the incoming packet is lower than the packet last output by the buffer, the packet being received is discarded because it has arrived to late to be output in sequence. Buffer control 107*h* maintains a last-played register to keep track of the last packet output for this purpose.

In response to a signal from timer 108*h*, buffer control 107*h* sends the pointer contents of the output slot 0 in the pointer list 108*h* to output control 113*h*, which then moves the packet data, stored at the respective memory location to the output device 114*h*. With each signal from timer 108*h*, buffer control 107*h* also shifts each pointer down one slot in the pointer list as described above. Normally, timer 108*h* is set to generate a signal at the packet rate, i.e., every T[r] seconds, to ensure that the playout rate for packets is same as the packet rate.

The packet delay distribution system 102*h* provides information to the control circuit 101*h* and buffer control 107*h* concerning the delay experienced by packets in the network. Also control circuit 101*h* may provide the feedback to reflect changing network operating characteristics. Control circuit 101*h* may also update the buffer characteristics, i.e., buffer size and pointer list in response to changing packet delay distribution.

If the rate of incoming packets is faster than the rate at which they are output by the output device 114*h*, buffer overflow will result. Drift control 106*h* maintains stream synchronization in the presence of such clock drifts by discarding a packet periodically to prevent buffer overflow. If the receiver clock is faster than the transmitter, drift control circuit 106*h* causes a packet to be repeated periodically or outputs a blank or dummy packet so that the output device 114*h* always has a packet to process.

The jitter management method and system will be further described in the context of an implementation within an exemplary application.

Exemplary Application

The present invention can be used to enable the operation of a novel media gateway. The hardware system architecture of the said novel gateway is comprised of a plurality of distributed processing layer processors, referred to as Media Engines, that are in communication with a data bus and interconnected with a Host Processor or a Packet Engine which, in turn, is in communication with interfaces to networks, preferably an asynchronous transfer mode (ATM) physical device or gigabit media independent interface (GMII) physical device.

Referring to FIG. 2*a*, a first embodiment of the top-level hardware system architecture is shown. A data bus 205*a* is connected to interfaces 210*a* existent on a first novel Media Engine Type I 215*a* and on a second novel Media Engine Type I 220*a*. The first novel Media Engine Type I 215*a* and second novel Media Engine Type I 220*a* are connected through a second set of communication buses 225*a* to a novel Packet Engine 230*a* which, in turn, is connected through interfaces 235*a* to outputs 240*a*, 245*a*. Preferably, each of the Media Engines Type I 215*a*, 220*a* is in communication with a SRAM 246*a* and SDRAM 247*a*.

It is preferred that the data bus 205*a* be a time-division multiplex (TDM) bus. A TDM bus is a pathway for the transmission of a number of separate voice, fax, modem, video, and/or other data signals simultaneously over a single communication medium. The separate signals are transmitted by interleaving a portion of each signal with each other, thereby enabling one communications channel to handle multiple separate transmissions and avoiding having to dedicate a separate communication channel to each transmission. Existing networks use TDM to transmit data from one communication device to another. It is further preferred that the interfaces 210*a* existent on the first novel Media Engine Type I 215*a* and second novel Media Engine Type I 220*a* comply with H.100, a hardware specification that details the necessary information to implement a CT bus interface at the physical layer for the PCI computer chassis card slot, independent of software specifications. The CT bus defines a single isochronous communications bus across certain PC chassis card slots and allows for the relatively fluid interoperation of components. It is appreciated that interfaces abiding by different hardware specifications could be used to receive signals from the data bus 205*a*.

As described below, each of the two novel Media Engines Type I 215*a*, 220*a* can support a plurality of channels for processing media, such as voice. The specific number of channels supported is dependent upon the features required, such as the extent of echo cancellation, and type of codec supported. For codecs having relatively low processing power requirements, such as G.711, each Media Engine Type I 215*a*, 220*a* can support the processing of around 256 voice channels or more. Each Media Engine Type I 215*a*, 220*a* is in communication with the Packet Engine 230*a* through a communication bus 225*a*, preferably a peripheral component interconnect (PCI) communication bus. A PCI communication bus serves to deliver control information and data transfers between the Media Engine Type I chip 215*a*, 220*a* and the Packet Engine chip 230*a*. Because Media Engine Type I 215a, 220a was designed to support the processing of lower data volumes, relative to Media Engine Type II described below, a single PCI communication bus can effectively support the transfer of both control and data between the designated chips. It is appreciated, however, that where data traffic becomes too great, the PCI communication bus must be supplemented with a second inter-chip communication bus.

The Packet Engine 230a receives processed data from each of the two Media Engines Type I 215a, 220a via the communication bus 225a. While theoretically able to connect to a plurality of Media Engines Type I, it is preferred that, for this embodiment, the Packet Engine 230a be in communication with up to two Media Engines Type I 215a, 220a. As will be further described below, the Packet Engine 230a provides cell and packet encapsulation for data channels, at or around 2016 channels in a preferred embodiment, quality of service functions for traffic management, tagging for differentiated services and multi-protocol label switching, and the ability to bridge cell and packet networks. While it is preferred to use the Packet Engine 230a, it can be replaced with a different host processor, provided that the host processor is capable of performing the above-described functions of the Packet Engine 230a.

The Packet Engine 230a is in communication with an ATM physical device 240a and GMII physical device 245a. The ATM physical device 240a is capable of receiving processed and packetized data, as passed from the Media Engines Type I 215a, 220a through the Packet Engine 230a, and transmitting it through a network operating on an asynchronous transfer mode (an ATM network). As would be appreciated by one of ordinary skill in the art, an ATM network automatically adjusts the network capacity to meet the system needs and can handle voice, modem, fax, video and other data signals. Each ATM data cell, or packet, consists of five octets of header field plus 48 octets for user data. The header contains data that identifies the related cell, a logical address that identifies the routing, header error correction bits, plus bits for priority handling and network management functions. An ATM network is a wideband, low delay, connection-oriented, packet-like switching and multiplexing network that allows for relatively flexible use of the transmission bandwidth. The GMII physical device 245a operates under a standard for the receipt and transmission of a certain amount of data, irrespective of the media types involved.

The embodiment shown in FIG. 2a can deliver voice processing up to Optical Carrier Level 1 (OC-1). OC-1 is designated at 51.840 million bits per second and provides for the direct electrical-to-optical mapping of the synchronous transport signal (STS-1) with frame synchronous scrambling. Higher optical carrier levels are direct multiples of OC-1, namely OC-3 is three times the rate of OC-1. As shown below, other configurations of the present invention could be used to support voice processing at OC-12.

Figure 2B:
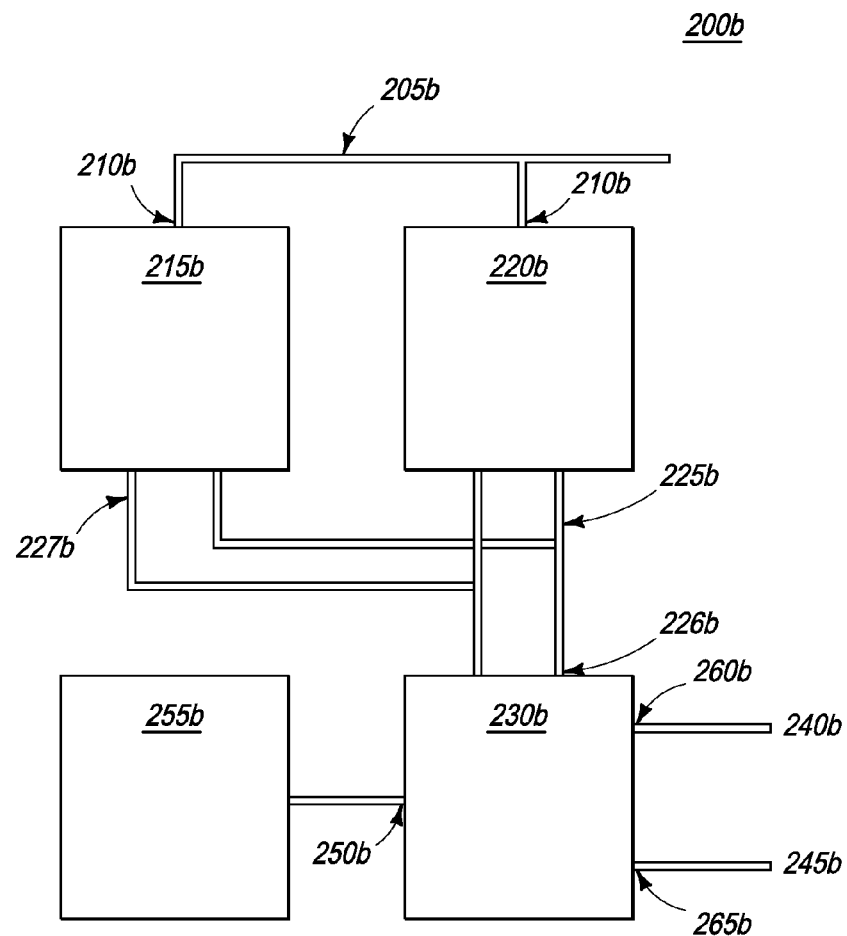
FIG. 2b is a block diagram of a second embodiment of a hardware system architecture for a media gateway.

Referring now to FIG. 2b, an embodiment supporting data rates up to OC-3 is shown, referred to herein as an OC-3 Tile 200b. A data bus 205b is connected to interfaces 210b existent on a first novel Media Engine Type II 215b and on a second novel Media Engine Type II 220b. The first novel Media Engine Type II 215b and second novel Media Engine Type II 220b are connected through a second set of communication buses 225b, 227b to a novel Packet Engine 230b which, in turn, is connected through interfaces 260b, 265b to outputs 240b, 245b and through interface 250b to a Host Processor 255b.

As previously discussed, it is preferred that the data bus 205b be a time-division multiplex (TDM) bus and that the interfaces 210b existent on the first novel Media Engine Type II 215b and second novel Media Engine Type II 220b comply with the H.100 a hardware specification. It is again appreciated that interfaces abiding by different hardware specifications could be used to receive signals from the data bus 205b.

Each of the two novel Media Engines Type II 215b, 220b can support a plurality of channels for processing media, such as voice. The specific number of channels supported is dependent upon the features required, such as the extent of echo cancellation, and type of codec implemented. For codecs having relatively low processing power requirements, such as G.711, and where the extent of echo cancellation required is 128 milliseconds, each Media Engine Type II can support the processing of approximately 2016 channels of voice. With two Media Engines Type II providing the processing power, this configuration is capable of supporting data rates of OC-3. Where the Media Engines Type II 215b, 220b are implementing a codec requiring higher processing power, such as G.729A, the number of supported channels decreases. As an example, the number of supported channels decreases from 2016 per Media Engine Type II when supporting G.711 to approximately 672 to 1024 channels when supporting G.729A. To match OC-3, an additional Media Engine Type II can be connected to the Packet Engine 230b via the common communication buses 225b, 227b.

Each Media Engine Type II 215b, 220b is in communication with the Packet Engine 230b through communication buses 225b, 227b, preferably a peripheral component interconnect (PCI) communication bus 225b and a UTOPIA II/POS II communication bus 227b. As previously mentioned, where data traffic volumes exceed a certain threshold, the PCI communication bus 225b must be supplemented with a second communication bus 227b. Preferably, the second communication bus 227b is a UTOPIA II/POS-II bus and serves as the data path between Media Engines Type II 215b, 220b and the Packet Engine 230b. A POS (Packet over SONET) bus represents a high-speed means for transmitting data through a direct connection, allowing the passing of data in its native format without the addition of any significant level of overhead in the form of signaling and control information. UTOPIA (Universal Test and Operations Interface for ATM) refers to an electrical interface between the transmission convergence and physical medium dependent sublayers of the physical layer and acts as the interface for devices connecting to an ATM network.

Figure 3:
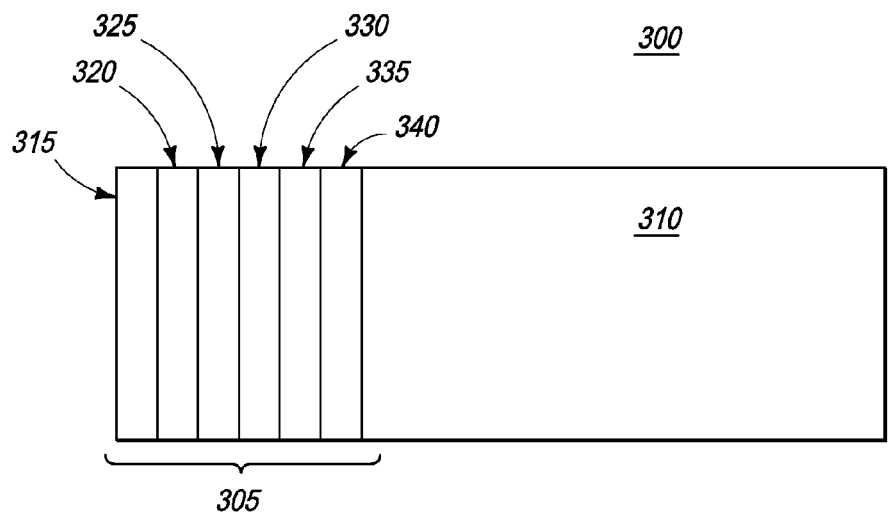
FIG. 3 is a diagram of a packet having a header and user data.

The physical interface is configured to operate in POS-II mode which allows for variable size data frame transfers. Each packet is transferred using POS-II control signals to explicitly define the start and end of a packet. As shown in FIG. 3, each packet 300 contains a header 305 with a plurality of information fields and user data 310. Preferably, each header 305 contains information fields including packet type 315 (e.g., RTP, raw encoded voice, AAL2), packet length 320 (total length of the packet including information fields), and channel identification 325 (identifies the physical channel, namely the TDM slot for which the packet is intended or from which the packet came). When dealing with encoded data transfers between a Media Engine Type II 215b, 220b and Packet Engine 230b, it is further preferred to include coder/decoder type 330, sequence number 335, and voice activity detection decision 340 in the header 305.

The Packet Engine 230b is in communication with the Host Processor 255b through a PCI target interface 250b. The Packet Engine 230b preferably includes a PCI to PCI bridge [not shown] between the PCI interface 226b to the PCI communication bus 225b and the PCI target interface 250b. The PCI to PCI bridge serves as a link for communicating messages between the Host Processor 255*b* and two Media Engines Type II 215*b*, 220*b*.

The novel Packet Engine 230*b* receives processed data from each of the two Media Engines Type II 215*b*, 220*b* via the communication buses 225*b*, 227*b*. While theoretically able to connect to a plurality of Media Engines Type II, it is preferred that the Packet Engine 230*b* be in communication with no more than three Media Engines Type II 215*b*, 220*b* [only two are shown in FIG. 2*b*]. As with the previously described embodiment, Packet Engine 230*b* provides cell and packet encapsulation for data channels, up to 2048 channels when implementing a G.711 codec, quality of service functions for traffic management, tagging for differentiated services and multi-protocol label switching, and the ability to bridge cell and packet networks. The Packet Engine 230*b* is in communication with an ATM physical device 240*b* and GMII physical device 245*b* through a UTOPIA II/POS II compatible interface 260*b* and GMII compatible interface respectively 265*b*. In addition to the GMII interface 265*b* in the physical layer, referred to herein as the PHY GMII interface, the Packet Engine 230*b* also preferably has another GMII interface [not shown] in the MAC layer of the network, referred to herein as the MAC GMII interface. MAC is a media specific access control protocol defining the lower half of the data link layer that defines topology dependent access control protocols for industry standard local area network specifications.

As will be further discussed, the Packet Engine 230*b* is designed to enable ATM-IP internetworking. Telecommunication service providers have built independent networks operating on an ATM or IP protocol basis. Enabling ATM-IP internetworking permits service providers to support the delivery of substantially all digital services across a single networking infrastructure, thereby reducing the complexities introduced by having multiple technologies/protocols operative throughout a service provider's entire network. The Packet Engine 230*b* is therefore designed to enable a common network infrastructure by providing for the internetworking between ATM modes and IP modes.

More specifically, the novel Packet Engine 230*b* supports the internetworking of ATM AALs (ATM Adaptation Layers) to specific IP protocols. Divided into a convergence sublayer and segmentation/reassembly sublayer, AAL accomplishes conversion from the higher layer, native data format and service specifications into the ATM layer. From the data originating source, the process includes segmentation of the original and larger set of data into the size and format of an ATM cell, which comprises 48 octets of data payload and 5 octets of overhead. On the receiving side, the AAL accomplishes reassembly of the data. AAL-1 functions in support of Class A traffic which is connection-oriented Constant Bit Rate (CBR), time-dependent traffic, such as uncompressed, digitized voice and video, and which is stream-oriented and relatively intolerant of delay. AAL-2 functions in support of Class B traffic which is connection-oriented Variable Bit Rate (VBR) isochronous traffic requiring relatively precise timing between source and sink, such as compressed voice and video. AAL-5 functions in support of Class C traffic which is Variable Bit Rate (VBR) delay-tolerant connection-oriented data traffic requiring relatively minimal sequencing or error detection support, such as signaling and control data.

These ATM AALs are internetworked with protocols operative in an IP network, such as RTP, UDP, TCP and IP. Internet Protocol (IP) describes software that tracks the Internet's addresses for different nodes, routes outgoing messages, and recognizes incoming messages while allowing a data packet to traverse multiple networks from source to destination. Realtime Transport Protocol (RTP) is a standard for streaming realtime multimedia over IP in packets and supports transport of real-time data like, such as interactive video and video over packet switched networks. Transmission Control Protocol (TCP) is a transport layer, connection oriented, end-to-end protocol that provides relatively reliable, sequenced, and unduplicated delivery of bytes to a remote or a local user. User Datagram Protocol (UDP) provides for the exchange of datagrams without acknowledgements or guaranteed delivery and is a transport layer, connectionless mode protocol. In the preferred embodiment represented in FIG. 2, it is preferred that ATM AAL-1 be internetworked with RTP, UDP, and IP protocols, AAL-2 be internetworked with UDP and IP protocols, and AAL-5 be internetworked with UDP and IP protocols or TCP and IP protocols.

Figure 4:
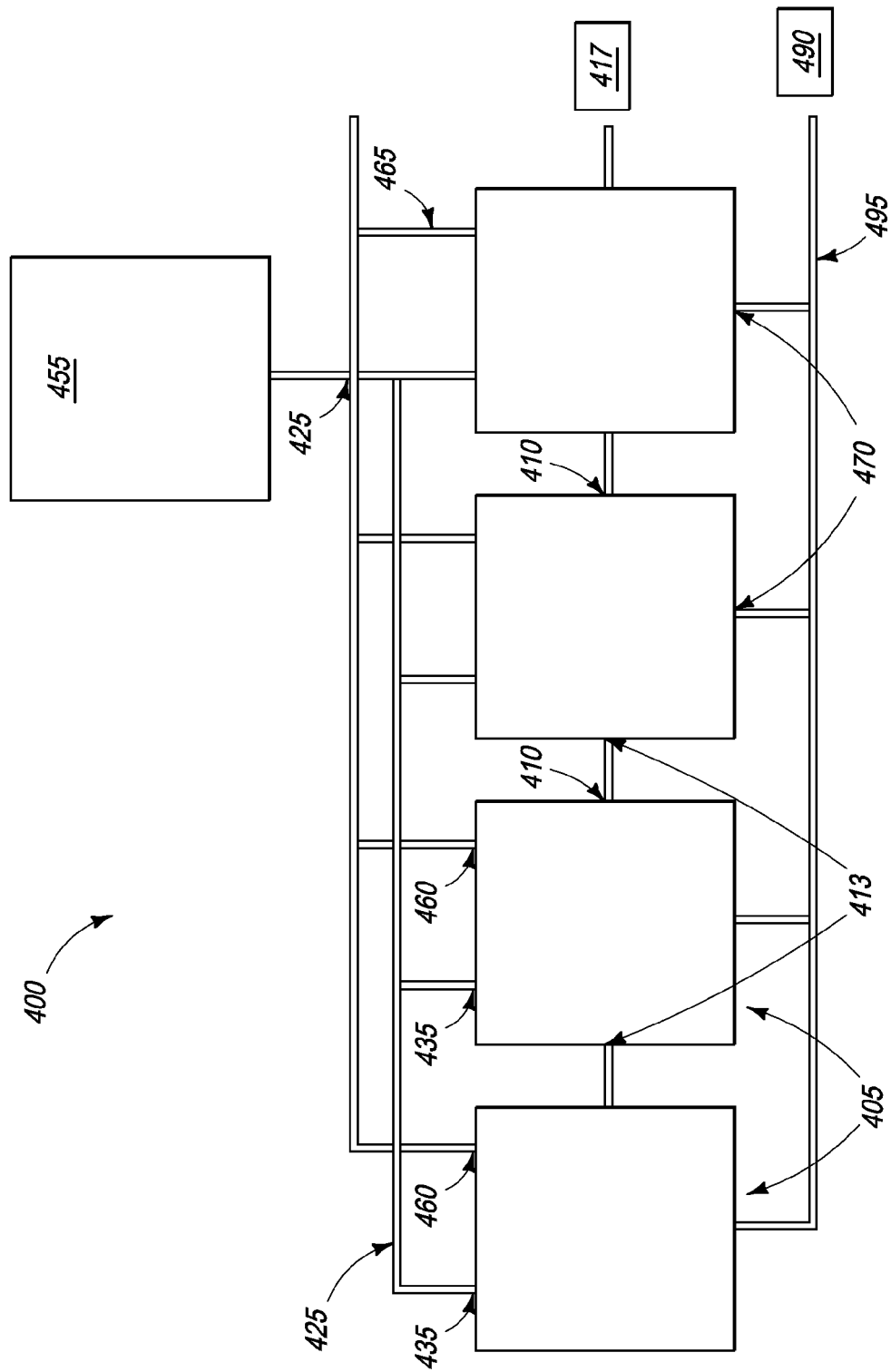
FIG. 4 is a block diagram of a third embodiment of a hardware system architecture for a media gateway.

Multiple OC-3 tiles, as presented in FIG. 2*b*, can be interconnected to form a tile supporting higher data rates. As shown in FIG. 4, four OC-3 tiles 405 can be interconnected, or "daisy chained", together to form an OC-12 tile 400. Daisy chaining is a method of connecting devices in a series such that signals are passed through the chain from one device to the next. By enabling daisy chaining, the present invention provides for currently unavailable levels of scalability in data volume support and hardware implementation. A Host Processor 455 is connected via communication buses 425, preferably PCI communication buses, to the PCI interface 435 on each of the OC-3 tiles 405. Each OC-3 tile 405 has a TDM interface 460 that operates via a TDM communication bus 465 to receive TDM signals via a TDM interface [not shown]. Each OC-3 tile 405 is further in communication with an ATM physical device 490 through a communication bus 495 connected to the OC-3 tile 405 through a UTOPIA II/POS II interface 470. Data received by an OC-3 tile 405 and not processed, because, for example, the data packet is directed toward a specific packet engine address that was not found in that specific OC-3 tile 405, is sent to the next OC-3 tile 405 in the series via the PHY GMII interface 410 and received by the next OC-3 tile via the MAC GMII interface 413. Enabling daisy chaining eliminates the need for an external aggregator to interface the GMII interfaces on each of the OC-3 tiles in order to enable integration. The final OC-3 tile 405 is in communication with a GMII physical device 417 via the PHY GMII interface 410.

Figure 5:
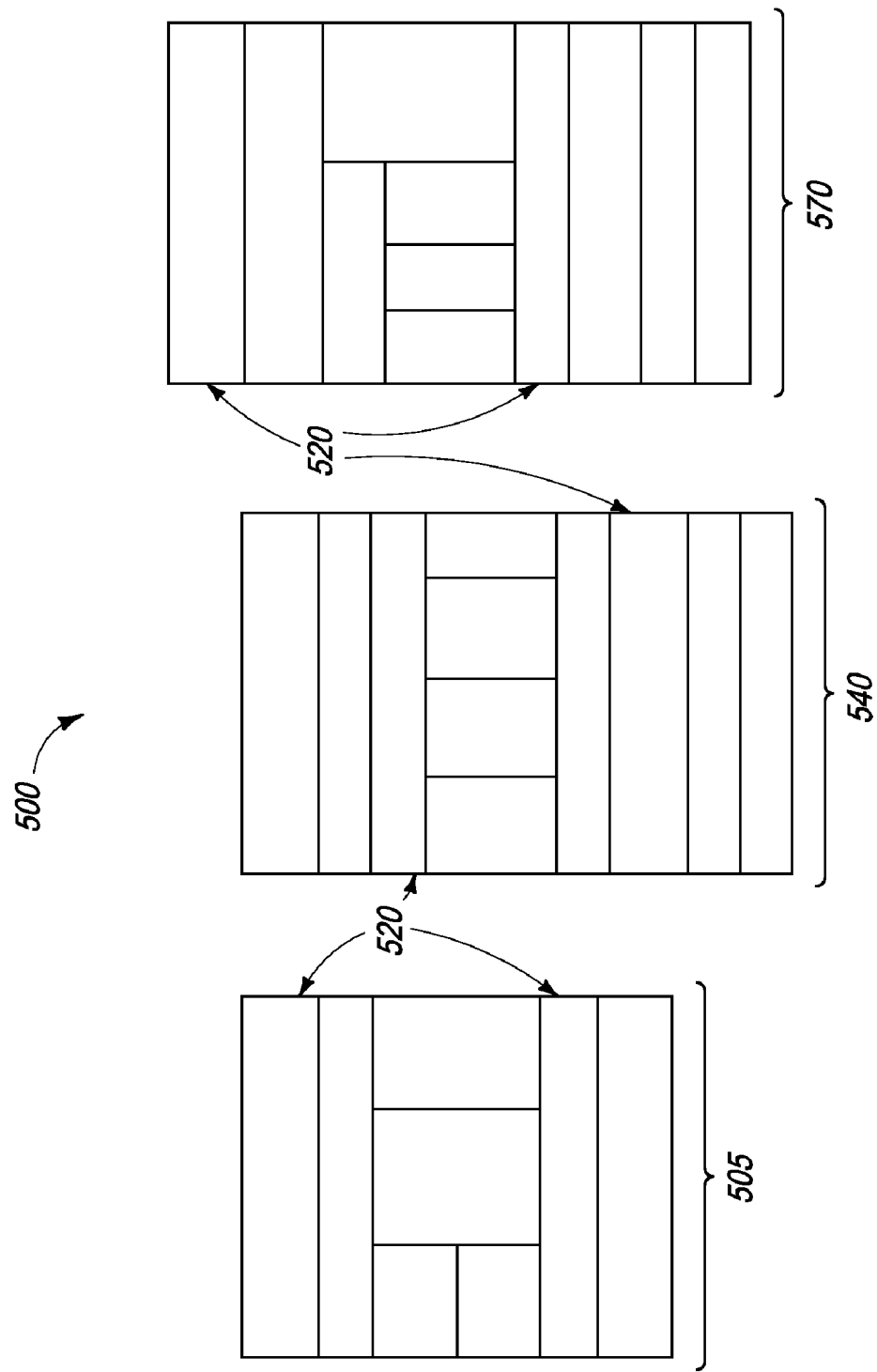
FIG. 5 is a block diagram of one logical division of the software system of the present invention.

Operating on the above-described hardware architecture embodiments is a plurality of novel, integrated software systems designed to enable media processing, signaling, and packet processing. Referring now to FIG. 5, a logical division of the software system 500 is shown. The software system 500 is divided into three subsystems, a Media Processing Subsystem 505, a Packetization Subsystem 540, and a Signaling/Management Subsystem 570. Each subsystem 505, 540, 570 further comprises a series of modules 520 designed to perform different tasks in order to effectuate the processing and transmission of media. It is preferred that the modules 520 be designed in order to encompass a single core task that is substantially non-divisible. For example, exemplary modules include echo cancellation, codec implementation, scheduling, IP-based packetization, and ATM-based packetization, among others. The nature and functionality of the modules 520 deployed in the present invention will be further described below.

Figure 6:
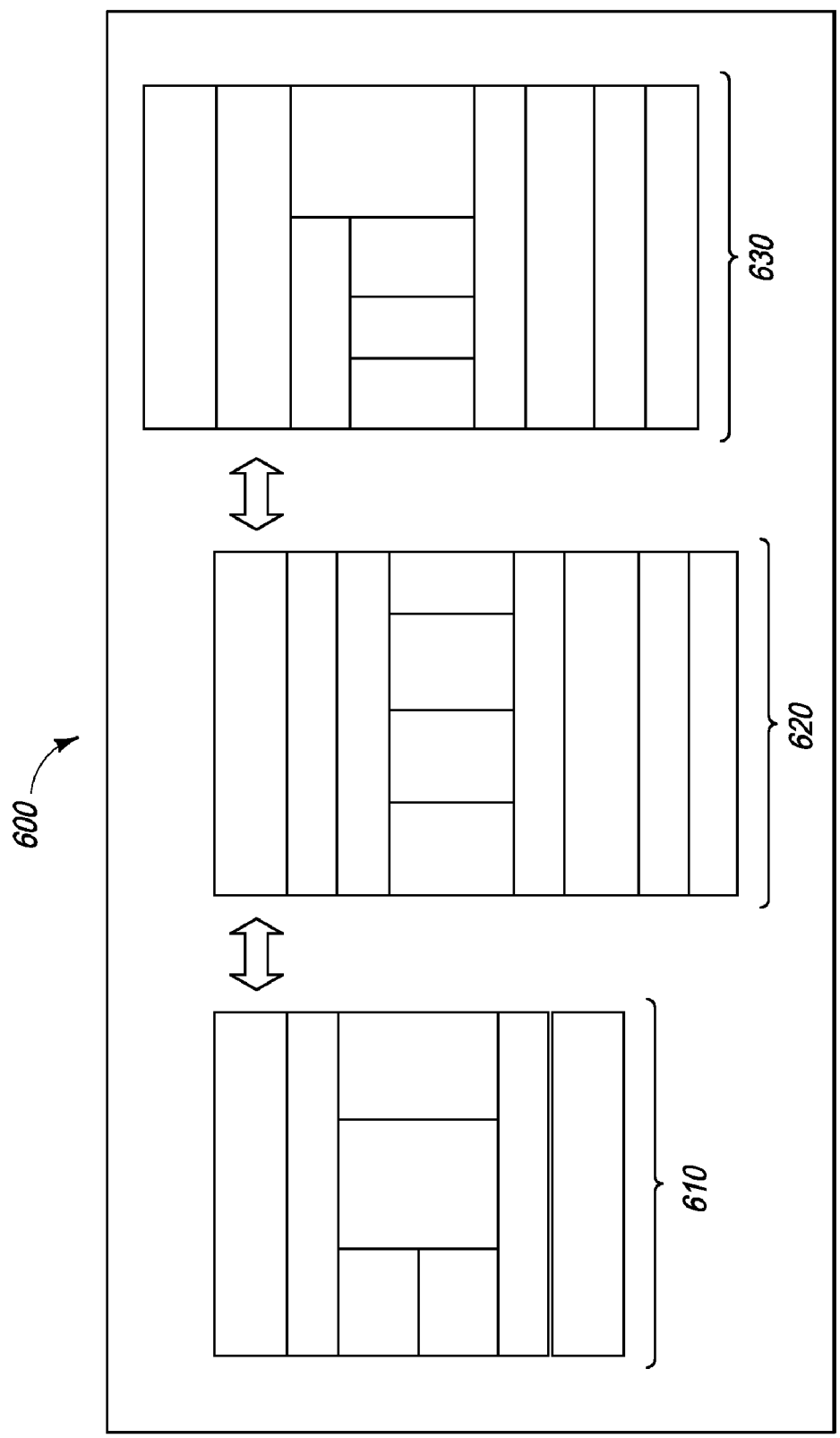
FIG. 6 is a block diagram of a first physical implementation of the software system of FIG. 5.
Figure 7:
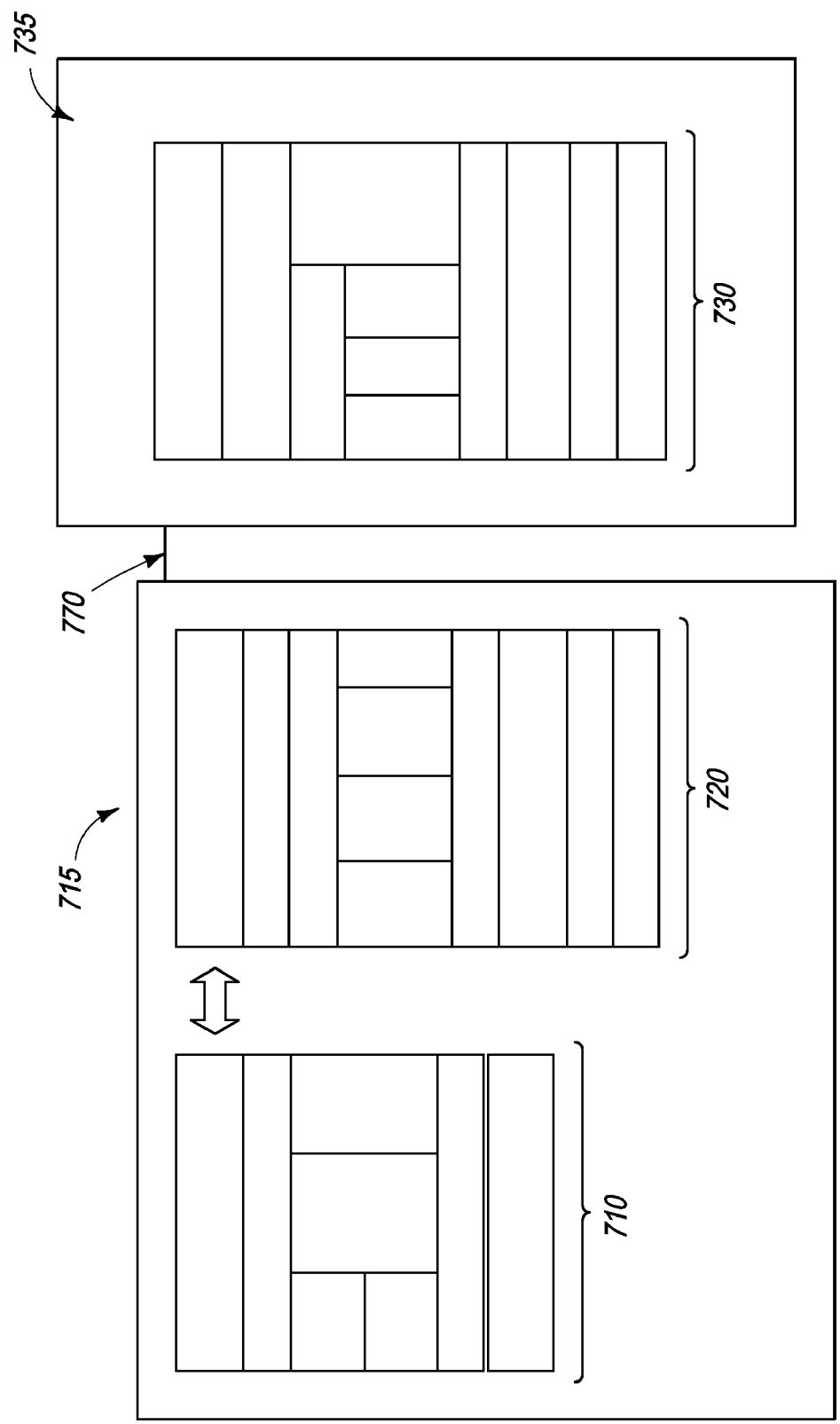
FIG. 7 is a block diagram of a second physical implementation of the software system of FIG. 5.
Figure 8:
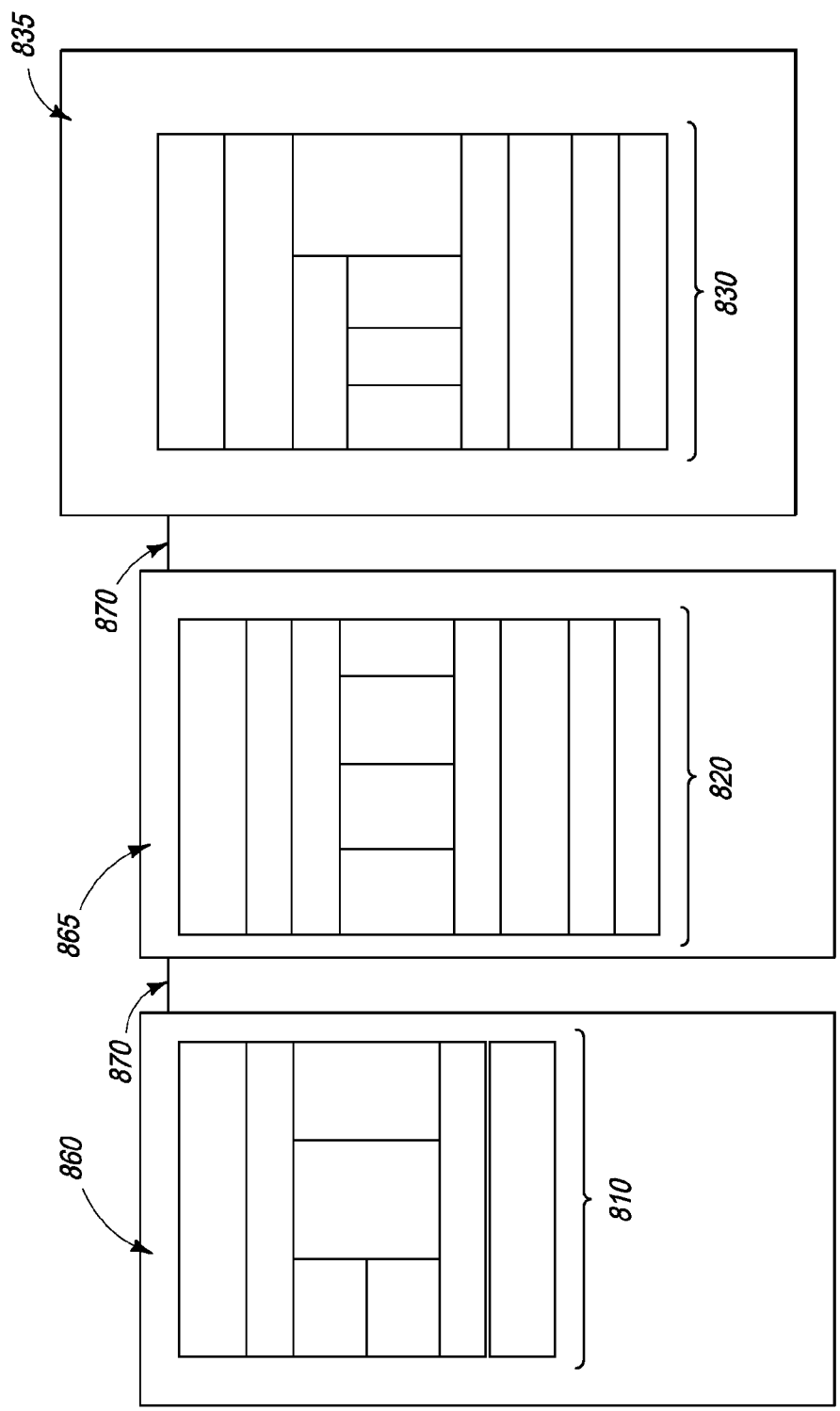
FIG. 8 is a block diagram of a third physical implementation of the software system of FIG. 5.

The logical system of FIG. 5 can be physically deployed in a number of ways, depending on processing needs, due, in part, to the novel software architecture, to be described below. As shown in FIG. 6, one physical embodiment of the software system described in FIG. 5 is to be on a single chip 600, where the media processing block 610, packetization block 620, and management block 630 are all operative on the same chip. If processing needs increase, thereby requiring more chip power be dedicated to media processing, the software system can be physically implemented such that the media processing block 710 and packetization block 720 operate on a DSP 715 that is in communication via a data bus 770 with the management block 730 that operates on a separate host processor 735, as depicted in FIG. 7. Similarly, if processing needs further increase, the media processing block 810 and packetization block 820 can be implemented on separate DSPs 860, 865 and communicate via data buses 870 with each other and with the management block 830 that operates on a separate host processor 835, as depicted in FIG. 8. Within each block, the modules can be physically separated onto different processors to enable for a high degree of system scalability.

In an embodiment, four OC-3 tiles are combined onto a single integrated circuit (IC) card wherein each OC-3 tile is configured to perform media processing and packetization tasks. The IC card has four OC-3 tiles in communication via databuses. As previously described, the OC-3 tiles each have three Media Engine II processors in communication via interchip communication buses with a Packet Engine processor. The Packet Engine processor has a MAC and PHY interface by which communications external to the OC-3 tiles are performed. The PHY interface of the first OC-3 tile is in communication with the MAC interface of the second OC-3 tile. Similarly, the PHY interface of the second OC-3 tile is in communication with the MAC interface of the third OC-3 tile and the PHY interface of the third OC-3 tile is in communication with the MAC interface of the fourth OC-3 tile. The MAC interface of the first OC-3 tile is in communication with the PHY interface of a host processor. Operationally, each Media Engine II processor implements the Media Processing Subsystem of the present invention, shown in FIG. 5 as 505. Each Packet Engine processor implements the Packetization Subsystem of the present invention, shown in FIG. 5 as 540. The host processor implements the Management Subsystem, shown in FIG. 5 as 570.

The primary components of the top-level hardware system architecture will now be described in further detail, including Media Engine Type I, Media Engine Type II, and Packet Engine. Additionally, the software architecture, along with specific features, will be further described in detail.

Media Engines

Both Media Engine I and Media Engine II are types of DPLPs and therefore comprise a layered architecture wherein each layer encodes and decodes up to N channels of voice, fax, modem, or other data depending on the layer configuration. Each layer implements a set of pipelined processing units specially designed through substantially optimal hardware and software partitioning to perform specific media processing functions. The processing units are special-purpose digital signal processors that are each optimized to perform a particular signal processing function or a class of functions. By creating processing units that are capable of performing a well-defined class of functions, such as echo cancellation or codec implementation, and placing them in a pipeline structure, the present invention provides a media processing system and method with substantially greater performance than conventional approaches.

Figure 9:
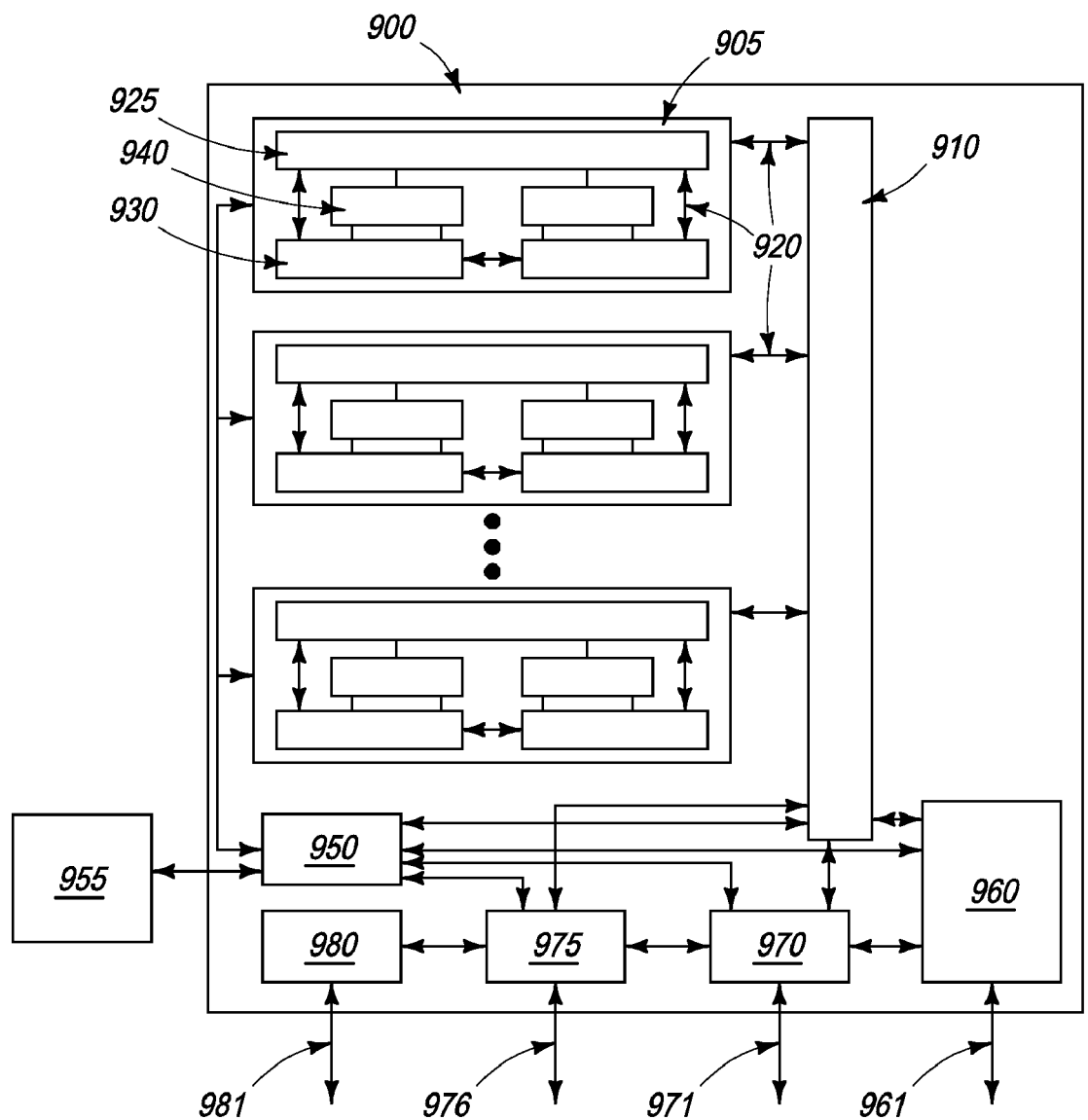
FIG. 9 is a block diagram of a first embodiment of the media engine component of the hardware system of the present invention.

Referring to FIG. 9, a diagram of Media Engine I 900 is shown. Media Engine I 900 comprises a plurality of Media Layers 905 each in communication with a central direct memory access (DMA) controller 910 via communication data buses 920. Using a DMA approach enables the bypassing of a system processing unit to handle the transfer of data between itself and system memory directly. Each Media Layer 905 further comprises an interface to the DMA 925 interconnected with the communication data buses 920. In turn, the DMA interface 925 is in communication with each of a plurality of pipelined processing units (PUs) 930 via communication data buses 920 and a plurality of program and data memories 940, via communication data buses 920, that are situated between the DMA interface 925 and each of the PUs 930. The program and data memories 940 are also in communication with each of the PUs 930 via data buses 920. Preferably, each PU 930 can access at least one program memory and at least one data memory unit 940. Further, it is also preferred to have at least one first-in, first-out (FIFO) task queue [not shown] to receive scheduled tasks and queue them for operation by the PUs 930.

While the layered architecture of the present invention is not limited to a specific number of Media Layers, certain practical limitations may restrict the number of Media Layers that can be stacked into a single Media Engine I. As the number of Media Layers increase, the memory and device input/output bandwidth may increase to such an extent that the memory requirements, pin count, density, and power consumption are adversely affected and become incompatible with application or economic requirements. Those practical limitations, however, do not represent restrictions on the scope and substance of the present invention.

Media Layers 905 are in communication with an interface to the central processing unit 950 (CPU IF) through communication buses 920. The CPU IF 950 transmits and receives control signals and data from an external scheduler 955, the DMA controller 910, a PCI interface (PCI IF) 960, a SRAM interface (SRAM IF) 975, and an interface to an external memory, such as an SDRAM interface (SDRAM IF) 970 through communication buses 920. The PCI IF 960 is preferably used for control signals. The SDRAM IF 970 connects to a synchronized dynamic random access memory module whereby the memory access cycles are synchronized with the CPU clock in order to eliminate wait time associated with memory fetching between random access memory (RAM) and the CPU. In a preferred embodiment, the SDRAM IF 970 that connects the processor with the SDRAM supports 133 MHz synchronous DRAM and asynchronous memory. It supports one bank of SDRAM (64 Mbit/256 Mbit to 256 MB maximum) and 4 asynchronous devices (8/16/32 bit) with a data path of 32 bits and fixed length well as undefined length block transfers and accommodates back-to-back transfers. Eight transactions may be queued for operation. The SDRAM [not shown] contains the states of the PUs 930. One of ordinary skill in the art would appreciate that, although not preferred, other external memory configurations and types could be selected in place of the SDRAM and, therefore, that another type of memory interface could be used in place of the SDRAM IF 970.

The SDRAM IF 970 is further in communication with the PCI IF 960, DMA controller 910, the CPU IF 950, and, preferably, the SRAM interface (SRAM IF) 975 through communication buses 920. The SRAM [not shown] is a static random access memory that is a form of random access memory that retains data without constant refreshing, offering relatively fast memory access. The SRAM IF 975 is also in communication with a TDM interface (TDM IF) 980, the CPU IF 950, the DMA controller 910, and the PCI IF 960 via data buses 920.

In an embodiment, the TDM IF 980 for the trunk side is preferably H.100/H.110 compatible and the TDM bus 981 operates at 8.192 MHz. Enabling the Media Engine I 900 to provide 8 data signals, therefore delivering a capacity up to 512 full duplex channels, the TDM IF 980 has the following preferred features: a H.100/H.110 compatible slave, frame size can be set to 16 or 20 samples and the scheduler can program the TDM IF 980 to store a specific buffer or frame size, programmable staggering points for the maximum number of channels. Preferably, the TDM IF interrupts the scheduler after every N samples of 8,000 Hz clock with the number N being programmable with possible values of 2, 4, 6, and 8. In a voice application, the TDM IF 980 preferably does not transfer the pulse code modulation (PCM) data to memory on a sample-by-sample basis, but rather buffers 16 or 20 samples, depending on the frame size which the encoders and decoders are using, of a channel and then transfers the voice data for that channel to memory.

The PCI IF 960 is also in communication with the DMA controller 910 via communication buses 920. External connections comprise connections between the TDM IF 980 and a TDM bus 981, between the SRAM IF 975 and a SRAM bus 976, between the SDRAM IF 970 and a SDRAM bus 971, preferably operating at 32 bit @ 133 MHz, and between the PCI IF 960 and a PCI 2.1 Bus 961 also preferably operating at 32 bit @ 133 MHz.

External to Media Engine I, the scheduler 955 maps the channels to the Media Layers 905 for processing. When the scheduler 955 is processing a new channel, it assigns the channel to one of the layers, depending upon processing resources available per layer 905. Each layer 905 handles the processing of a plurality of channels such that the processing is performed in parallel and is divided into fixed frames, or portions of data. The scheduler 955 communicates with each Media Layer 905 through the transmission of data, in the form of tasks, to the FIFO task queues wherein each task is a request to the Media Layer 905 to process a plurality of data portions for a particular channel. It is therefore preferred for the scheduler 955 to initiate the processing of data from a channel by putting a task in a task queue, rather than programming each PU 930 individually. More specifically, it is preferred to have the scheduler 955 initiate the processing of data from a channel by putting a task in the task queue of a particular PU 930 and having the Media Layer's 905 pipeline architecture manage the data flow to subsequent PUs 930.

The scheduler 955 should manage the rate by which each of the channels is processed. In an embodiment where the Media Layer 905 is required to accept the processing of data from M channels and each of the channels uses a frame size of T msec, then it is preferred that the scheduler 955 processes one frame of each of the M channels within each T msec interval. Further, in a preferred embodiment, the scheduling is based upon periodic interrupts, in the form of units of samples, from the TDM IF 980. As an example, if the interrupt period is 2 samples then it is preferred that the TDM IF 980 interrupts the scheduler every time it gathers two new samples of all channels. The scheduler preferably maintains a 'tick-count', which is incremented on every interrupt and reset to 0 when time equal to a frame size has passed. The mapping of channels to time slots is preferably not fixed. For example, in voice applications, whenever a call starts on a channel, the scheduler dynamically assigns a layer to a provisioned time slot channel. It is further preferred that the data transfer from a TDM buffer to the memory is aligned with the time slot in which this data is processed, thereby staggering the data transfer for different channels from TDM to memory, and vice-versa, in a manner that is equivalent to the staggering of the processing of different channels. Consequently, it is further preferred that the TDM IF 980 maintains a tick count variable wherein there is some synchronization between the tick counts of TDM and scheduler 955. In the exemplary embodiment described above, the tick count variable is set to zero on every 2 ms or 2.5 ms depending on the buffer size.

Figure 10:
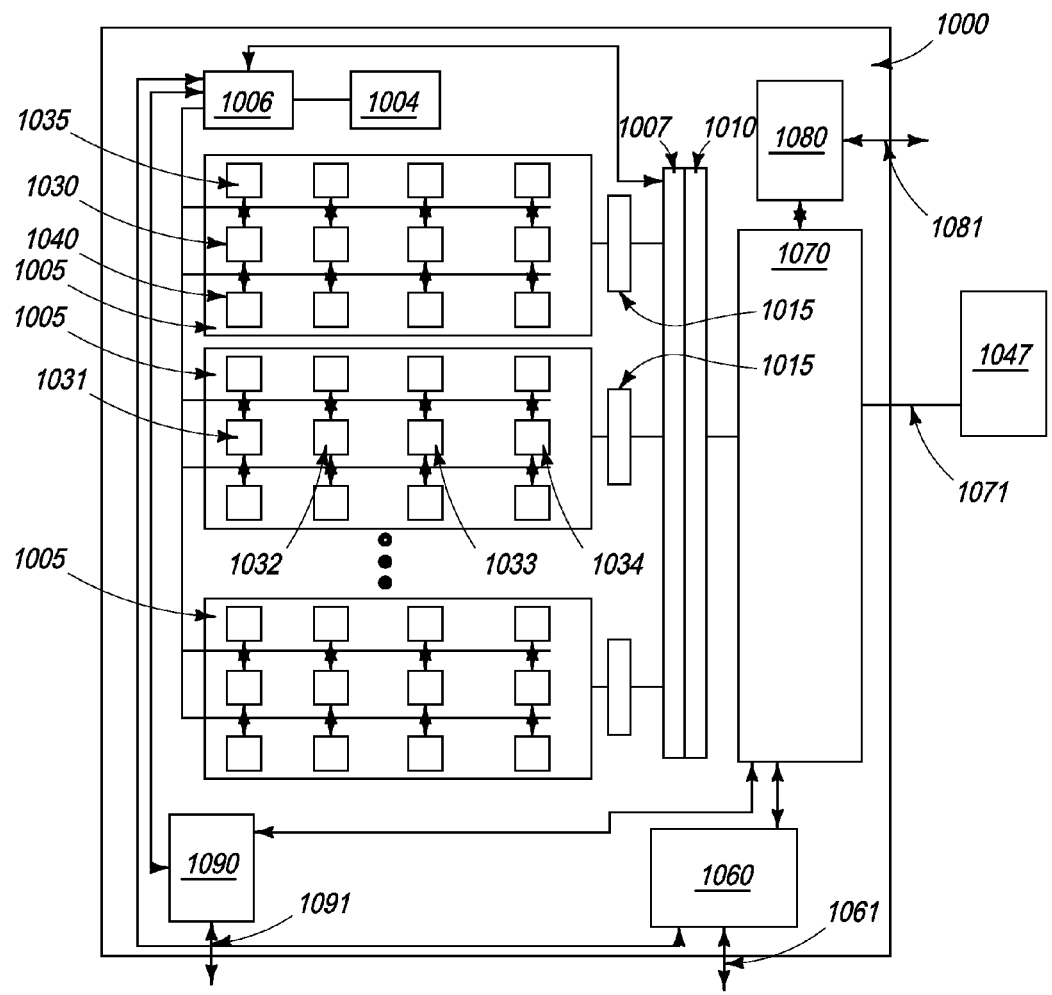
FIG. 10 is a block diagram of a preferred embodiment of the media layer component of the hardware system of the present invention.

Referring to FIG. 10, a block diagram of Media Engine II 1000 is shown. Media Engine II 1000 comprises a plurality of Media Layers 1005 each in communication with processing layer controller 1007, referred to herein as a Media Layer Controller 1007, and central direct memory access (DMA) controller 1010 via communication data buses and an interface 1015. Each Media Layer 1005 is in communication with a CPU interface 1006 which, in turn, is in communication with a CPU 1004. Within each Media Layer 1005, a plurality of pipelined processing units (PUs) 1030 are in communication with a plurality of program memories 1035 and data memories 1040, via communication data buses. Preferably, each PU 1030 can access at least one program memory 1035 and one data memory 1040. Each of the PUs 1030, program memories 1035, and data memories 1040 is in communication with an external memory 1047 via the Media Layer Controller 1007 and DMA 1010. In a preferred embodiment, each Media Layer 1005 comprises four PUs 1030, each of which is in communication with a single program memory 1035 and data memory 1040, wherein the each of the PUs 1031, 1032, 1033, 1034 is in communication with each of the other PUs 1031, 1032, 1033, 1034 in the Media Layer 1005.

Figure 10A:
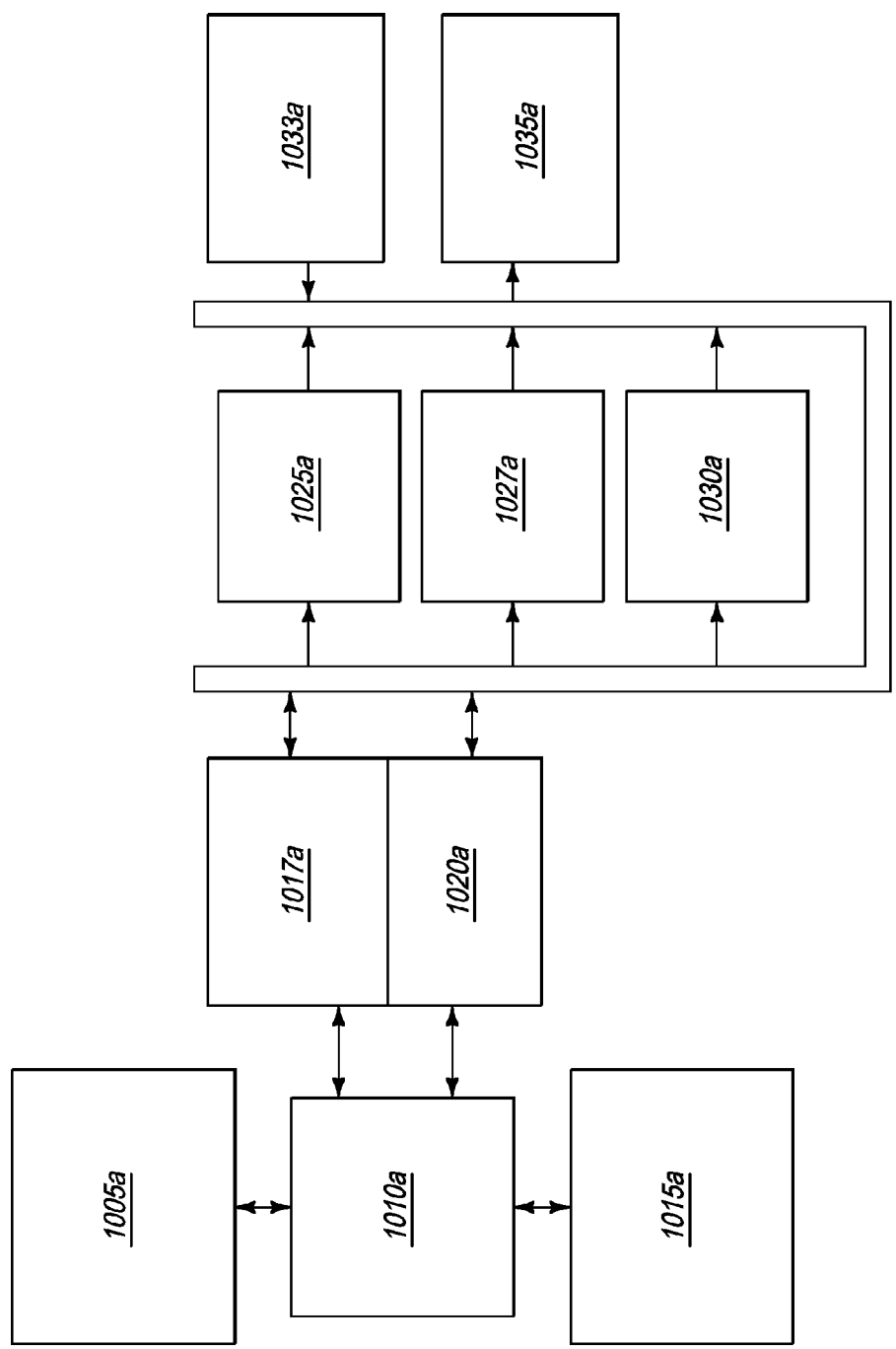
FIG. 10a is a block diagram representation of a preferred architecture for the media layer component of the media engine of FIG. 10.

Shown in FIG. 10a, a preferred embodiment of the architecture of the Media Layer Controller, or MLC, is provided. A program memory 1005a, preferably 512×64, operates in conjunction with a controller 1010a and data memory 1015a to deliver data and instructions to a data register file 1017a, preferably 16×32, and address register file 1020a, preferably 4×12. The data register file 1017a and address register file 1020a are in communication with functional units such as an adder/MAC 1025a, logical unit 1027a, and barrel shifter 1030a and with units such as a request arbitration logic unit 1033a and DMA channel bank 1035a.

Referring back to FIG. 10, the MLC 1007 arbitrates data and program code transfer requests to and from the program memories 1035 and data memories 1040 in a round robin fashion. On the basis of this arbitration the MLC 1007 fills the data pathways that define how units directly access memory, namely the DMA channels [not shown]. The MLC 1007 is capable of performing instruction decoding to route an instruction according to its dataflow and keep track of the request states for all PUs 1030, such as the state of a read-in request, a write-back request and an instruction forwarding. The MLC 1007 is further capable of conducting interface related functions, such as programming DMA channels, starting signal generation, maintaining page states for PUs 1030 in each Media Layer 1005, decoding of scheduler instructions, and managing the movement of data from and into the task queues of each PU 1030. By performing the aforementioned functions, the Media Layer Controller 1007 substantially eliminates the need for associating complex state machines with the PUs 1030 present in each Media Layer 1005.

The DMA controller 1010 is a multi-channel DMA unit for handling the data transfers between the local memory buffer PUs and external memories, such as the SDRAM. Preferably, DMA channels are programmed dynamically. More specifically, PUs 1030 generate independent requests, each having an associated priority level, and send them to the MLC 1007 for reading or writing. Based upon the priority request delivered by a particular PU 1030, the MLC 1007 programs the DMA channel accordingly. Preferably, there is also an arbitration process, such as a single level of round robin arbitration, between the channels within the DMA to access the external memory. The DMA Controller 1010 provides hardware support for round robin request arbitration across the PUs 1030 and Media Layers 1005.

In an exemplary operation, it is preferred to conduct transfers between local PU memories and external memories by utilizing the address of the local memory, address of the external memory, size of the transfer, direction of the transfer, namely whether the DMA channel is transferring data to the local memory from the external memory or vice-versa, and how many transfers are required for each PU. In this preferred embodiment, a DMA channel is generated and receives this information from 2, 32 bit registers residing in the DMA. A third register exchanges control information between the DMA and each PU which contains the current status of the DMA transfer. In a preferred embodiment, arbitration is performed among the following requests: 1 structure read, 4 data read and 4 data write requests from each Media Layer, approximately 90 data requests in total, and 4 program code fetch requests from each Media Layer, approximately 40 program code fetch requests in total. The DMA Controller 1010 is preferably further capable of arbitrating priority for program code fetch requests, conducting link list traversal and DMA channel information generation, and performing DMA channel prefetch and done signal generation.

The MLC 1007 and DMA Controller 1010 are in communication with a CPU IF 1006 through communication buses. The PCI IF 1060 is in communication with an external memory interface (such as a SDRAM IF) 1070 and with the CPU IF 1006 via communication buses. The external memory interface 1070 is further in communication with the MLC 1007 and DMA Controller 1010 and a TDM IF 1080 through communication buses. The SDRAM IF 1070 is in communication with a packet processor interface, such as a UTOPIA II/POS compatible interface (U2/POS IF), 1090 via communication data buses. The U2/POS IF 1090 is also preferably in communication with the CPU IF 1006. Although the preferred embodiments of the PCI IF and SDRAM IF are similar to Media Engine I, it is preferred that the TDM IF 1080 have all 32 serial data signals implemented, thereby supporting at least 2048 full duplex channels. External connections comprise connections between the TDM IF 1080 and a TDM bus 1081, between the external memory 1070 and a memory bus 1071, preferably operating at 64 bit @ 133 MHz, between the PCI IF 1060 and a PCI 2.1 Bus 1061 also preferably operating at 32 bit @ 133 MHz, and between the U2/POS IF 1090 and a UTOPIA II/POS connection 1091 preferably operative at 622 megabits per second. In a preferred embodiment, the TDM IF 1080 for the trunk side is preferably H.100/H.110 compatible and the TDM bus 1081 operates at 8.192 MHz, as previously discussed in relation to the Media Engine I.

For both Media Engine I and Media Engine II, within each media layer, the present invention utilizes a plurality of pipelined PUs specially designed for conducting a defined set of processing tasks. In that regard, the PUs are not general purpose processors and can not be used to conduct any processing task. A survey and analysis of specific processing tasks yielded certain functional unit commonalities that, when combined, yield a specialized PU capable of optimally processing the universe of those specialized processing tasks. The instruction set architecture of each PU yields compact code. Increased code density results in a decrease in required memory and, consequently, a decrease in required area, power, and memory traffic.

The pipeline architecture also improves performance. Pipelining is an implementation technique whereby multiple instructions are overlapped in execution. In a computer pipeline, each step in the pipeline completes a part of an instruction. Like an assembly line, different steps are completing different parts of different instructions in parallel. Each of these steps is called a pipe stage or a data segment. The stages are connected on to the next to form a pipe. Within a processor, instructions enter the pipe at one end, progress through the stages, and exit at the other end. The throughput of an instruction pipeline is determined by how often an instruction exits the pipeline.

More specifically, one type of PU (referred to herein as EC PU) has been specially designed to perform, in a pipeline architecture, a plurality of media processing functions, such as echo cancellation (EC), voice activity detection (VAD), and tone signaling (TS) functions. Echo cancellation removes from a signal echoes that may arise as a result of the reflection and/or retransmission of modified input signals back to the originator of the input signals. Commonly, echoes occur when signals that were emitted from a loudspeaker are then received and retransmitted through a microphone (acoustic echo) or when reflections of a far end signal are generated in the course of transmission along hybrids wires (line echo). Although undesirable, echo is tolerable in a telephone system, provided that the time delay in the echo path is relatively short. However, longer echo delays can be distracting or confusing to a far end speaker. Voice activity detection determines whether a meaningful signal or noise is present at the input. Tone signaling comprises the processing of supervisory, address, and alerting signals over a circuit or network by means of tones. Supervising signals monitor the status of a line or circuit to determine if it is busy, idle, or requesting service. Alerting signals indicate the arrival of an incoming call. Addressing signals comprise routing and destination information.

Figure 11:
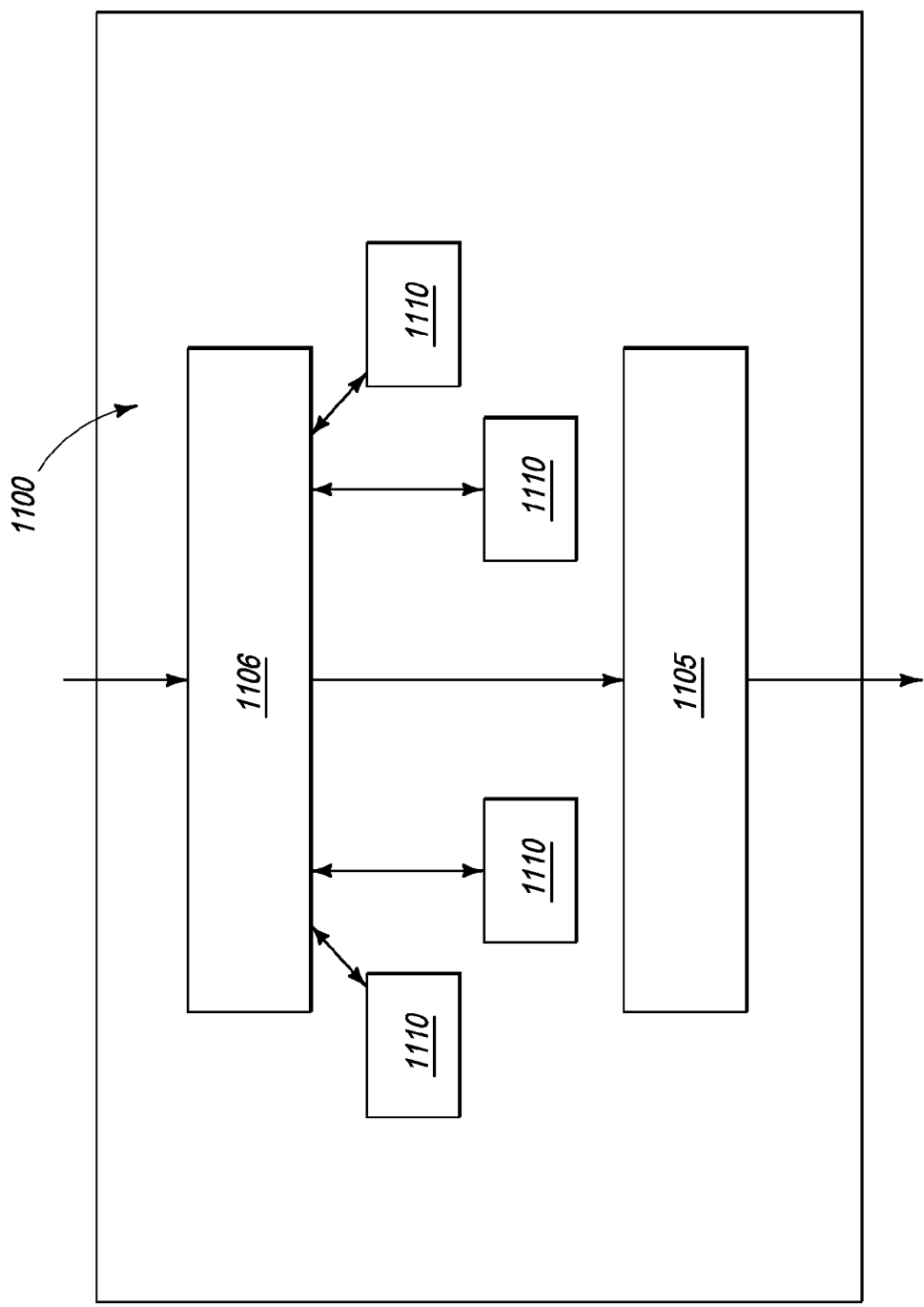
FIG. 11 is a block diagram representation of a first preferred processing unit.

The LEC, VAD, and TS functions can be efficiently executed using a PU having several single-cycle multiply and accumulate (MAC) units operating with an Address Generation Unit and an Instruction Decoder. Each MAC unit includes a compressor, sum and carry registers, an adder, and a saturation and rounding logic unit. In a preferred embodiment, shown in FIG. 11, this PU 1100 comprises a load store architecture with a single Address Generation Unit (AGU) 1105, supporting zero over-head looping and branching with delay slots, and an Instruction Decoder 1106. The plurality of MAC units 1110 operate in parallel on two 16-bit operands and perform the following function:

$$Acc\mathrel{+}=a*b$$

Guard bits are appended with sum and carry registers to facilitate repeated MAC operations. A scale unit prevents accumulator overflow. Each MAC unit 1110 may be programmed to perform round operations automatically. Additionally, it is preferred to have an addition/subtraction unit [not shown] as a conditional sum adder with both the input operands being 20 bit values and the output operand being a 16-bit value.

Operationally, the EC PU performs tasks in a pipeline fashion. A first pipeline stage comprises an instruction fetch wherein instructions are fetched into an instruction register from program memory. A second pipeline stage comprises an instruction decode and operand fetch wherein an instruction is decoded and stored in a decode register. The hardware loop machine is initialized in this cycle. Operands from the data register files are stored in operand registers. The AGU operates during this cycle. The address is placed on data memory address bus. In the case of a store operation, data is also placed on the data memory data bus. For post increment or decrement instructions, the address is incremented or decremented after being placed on the address bus. The result is written back to address register file. The third pipeline stage, the Execute stage, comprises the operation on the fetched operands by the Addition/Subtraction Unit and MAC units. The status register is updated and the computed result or data loaded from memory is stored in the data/address register files. The states and history information required for the EC PU operations are fetched through a multi-channel DMA interface, as previously shown in each Media Layer. The EC PU configures the DMA controller registers directly. The EC PU loads the DMA chain pointer with the memory location of the head of the chain link.

By enabling different data streams to move through the pipelined stages concurrently, the EC PU reduces wait time for processing incoming media, such as voice. Referring to FIG. 12, in time slot 1 1205, an instruction fetch task (IF) is performed for processing data from channel 1 1250. In time slot 2 1206, the IF task is performed for processing data from channel 2 1255 while, concurrently, an instruction decode and operand fetch (IDOF) is performed for processing data from channel 1 1250. In time slot 3 1207, an IF task is performed for processing data from channel 3 1260 while, concurrently, an instruction decode and operand fetch (IDOF) is performed for processing data from channel 2 1255 and an Execute (EX) task is performed for processing data from channel 1 1250. One of ordinary skill in the art would appreciate that, because channels are dynamically generated, the channel numbering may not reflect the actual location and assignment of a task. Channel numbering here is used to simply indicate the concept of pipelining across multiple channels and not to represent actual task locations.

A second type of PU (referred to herein as CODEC PU) has been specially designed to perform, in a pipeline architecture, a plurality of media processing functions, such as encoding and decoding signals in accordance with certain standards and protocols, including standards promoted by the International Telecommunication Union (ITU) such as voice standards, including G.711, G.723.1, G.726, G.728, G.729A/B/E, and data modem standards, including V.17, V.34, and V.90, among others (referred to herein as Codecs), and performing comfort noise generation (CNG) and discontinuous transmission (DTX) functions. The various Codecs are used to encode and decode voice signals with differing degrees of complexity and resulting quality. CNG is the generation of background noise that gives users a sense that the connection is live and not broken. A DTX function is implemented when the frame being received comprises silence, rather than a voice transmission.

The Codecs, CNG, and DTX functions can be efficiently executed using a PU having an Arithmetic and Logic Unit (ALU), MAC unit, Barrel Shifter, and Normalization Unit. In a preferred embodiment, shown in FIG. 13, the CODEC PU 1300 comprises a load store architecture with a single Address Generation Unit (AGU) 1305, supporting zero overhead looping and zero overhead branching with delay slots, and an Instruction Decoder 1306.

In an exemplary embodiment, each MAC unit 1310 includes a compressor, sum and carry registers, an adder, and a saturation and rounding logic unit. The MAC unit 1310 is implemented as a compressor with feedback into the compression tree for accumulation. One preferred embodiment of a MAC 1310 has a latency of approximately 2 cycles with a throughput of 1 cycle. The MAC 1310 operates on two 17-bit operands, signed or unsigned. The intermediate results are kept in sum and carry registers. Guard bits are appended to the sum and carry registers for repeated MAC operations. The saturation logic converts the Sum and Carry results to 32 bit values. The rounding logic rounds a 32 bit to a 16 bit number. Division logic is also implemented in the MAC unit 1310.

In an exemplary embodiment, the ALU 1320 includes a 32 bit adder and a 32 bit logic circuit capable of performing a plurality of operations, including add, add with carry, subtract, subtract with borrow, negate, AND, OR, XOR, and NOT. One of the inputs to the ALU 1320 has an XOR array, which operates on 32-bit operands. Comprising an absolute unit, a logic unit, and an addition/subtraction unit, the ALU's 1320 absolute unit drives this array. Depending on the output of the absolute unit, the input operand is either XORed with one or zero to perform negation on the input operands.

In an exemplary embodiment, the Barrel Shifter 1330 is placed in series with the ALU 1320 and acts as a pre-shifter to operands requiring a shift operation followed by any ALU operations. One type of preferred Barrel Shifter can perform a maximum of 9-bit left or 26-bit right arithmetic shifts on 16-bit or 32-bit operands. The output of the Barrel Shifter is a 32-bit value, which is accessible to both the inputs of the ALU 1320.

In an exemplary embodiment, the Normalization unit 1340 counts the redundant sign bits in the number. It operates on 2's complement 16-bit numbers. Negative numbers are inverted to compute the redundant sign bits. The number to be normalized is fed into the XOR array. The other input comes from the sign bit of the number. Where the media being processed is voice, it is preferred to have an interface to the EC PU. The EC PU uses VAD to determine whether a frame being received comprises silence or speech. The VAD decision is preferably communicated to the CODEC PU so that it may determine whether to implement a Codec or DTX function.

Operationally, the CODEC PU performs tasks in a pipeline fashion. A first pipeline stage comprises an instruction fetch wherein instructions are fetched into an instruction register from program memory. At the same time, the next program counter value is computed and stored in the program counter. In addition, loop and branch decisions are taken in the same cycle. A second pipeline stage comprises an instruction decode and operand fetch wherein an instruction is decoded and stored in a decode register. The instruction decode, register read and branch decisions happen in the instruction decode stage. In the third pipeline stage, the Execute 1 stage, the Barrel Shifter and the MAC compressor tree complete their computation. Addresses to data memory are also applied in this stage. In the fourth pipeline stage, the Execute 2 stage, the ALU, normalization unit, and the MAC adder complete their computation. Register write-back and address registers are updated at the end of the Execute-2 stage. The states and history information required for the CODEC PU operations are fetched through a multi-channel DMA interface, as previously shown in each Media Layer.

Figure 13A:
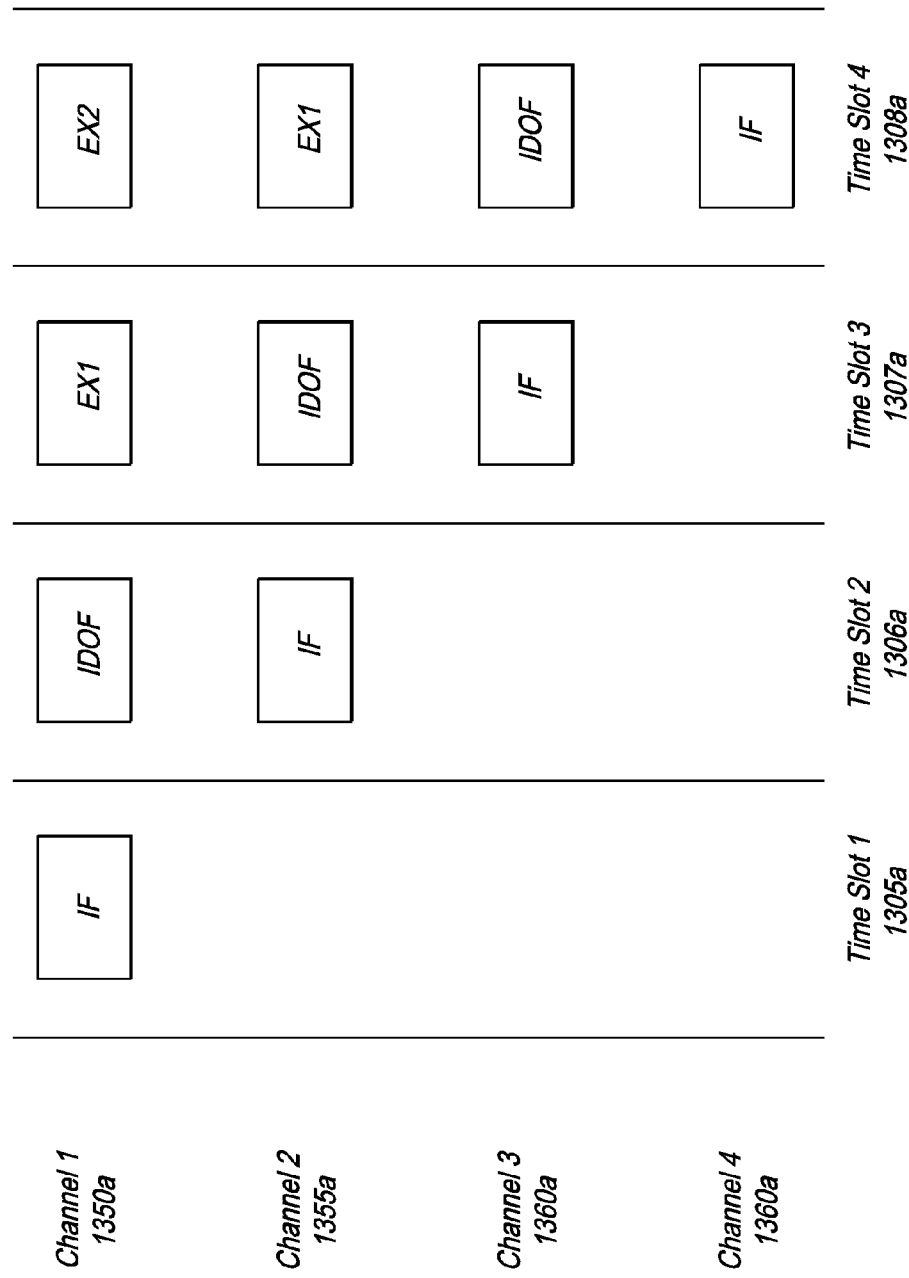
FIG. 13a is a time-based schematic of the pipeline processing conducted by the second preferred processing unit.

By enabling different data streams to move through the pipelined stages concurrently, the CODEC PU reduces wait time for processing incoming media, such as voice. Referring to FIG. 13a, in time slot 1 1305a, an instruction fetch task (IF) is performed for processing data from channel 1 1350a. In time slot 2 1306a, the IF task is performed for processing data from channel 2 1355a while, concurrently, an instruction decode and operand fetch (IDOF) is performed for processing data from channel 1 1350a. In time slot 3 1307a, an IF task is performed for processing data from channel 3 1360a while, concurrently, an instruction decode and operand fetch (IDOF) is performed for processing data from channel 2 1355a and an Execute 1 (EX1) task is performed for processing data from channel 1 1350a. In time slot 4 1308a, an IF task is performed for processing data from channel 4 1370a while, concurrently, an instruction decode and operand fetch (IDOF) is performed for processing data from channel 3 1360a, an Execute 1 (EX1) task is performed for processing data from channel 2 1355a, and an Execute 2 (EX2) task is performed for processing data from channel 1 1350a. One of ordinary skill in the art would appreciate that, because channels are dynamically generated, the channel numbering may not reflect the actual location and assignment of a task. Channel numbering here is used to simply indicate the concept of pipelining across multiple channels and not to represent actual task locations.

Figure 13B:
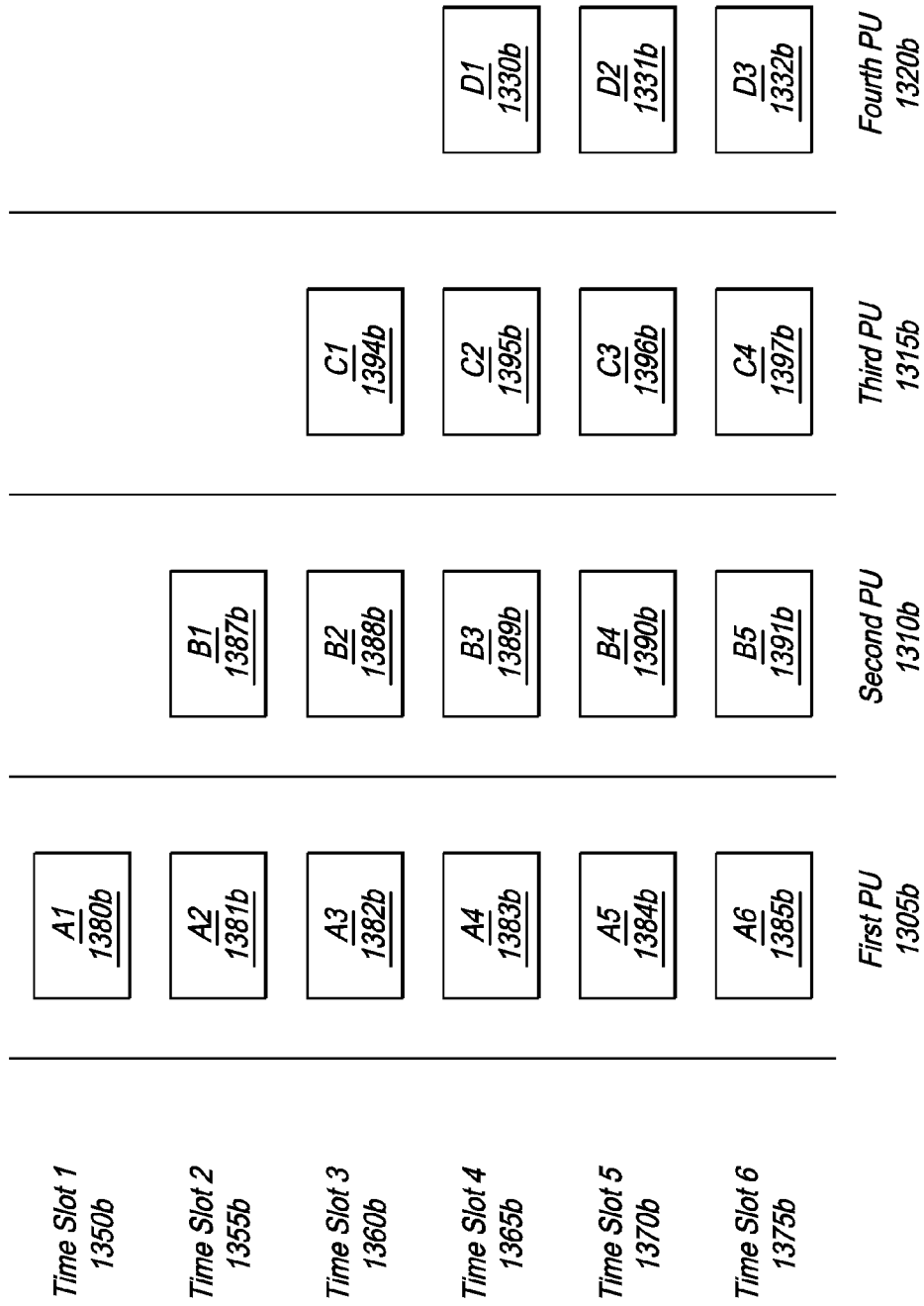
FIG. 13b is a time-based schematic of the pipeline processing conducted by a series of processing units.

The pipeline architecture of the present invention is not limited to instruction processing within PUs, but also exists on a PU to PU architecture level. As shown in FIG. 13b, multiple PUs may operate on a data set N in a pipeline fashion to complete the processing of a plurality of tasks where each task comprises a plurality of steps. A first PU 1305b may be capable of performing echo cancellation functions, labeled task A. A second PU 1310b may be capable of performing tone signaling functions, labeled task B. A third PU 1315b may be capable of performing a first set of encoding functions, labeled task C. A fourth PU 1320b may be capable of performing a second set of encoding functions, labeled task D. In time slot 1 1350b, the first PU 1305b performs task A1 1380b on data set N. In time slot 2 1355b, the first PU 1305b performs task A2 1381b on data set N and the second PU 1310b performs task B1 1387b on data set N. In time slot 3 1360b, the first PU 1305b performs task A3 1382b on data set N, the second PU 1310b performs task B2 1388b on data set N, and the third PU 1315b performs task C1 1394b on data set N. In time slot 4 1365b, the first PU 1305b performs task A4 1383b on data set N, the second PU 1310b performs task B3 1389b on data set N, the third PU 1315b performs task C2 1395b on data set N, and the fourth PU 1320b performs task D1 1330 on data set N. In time slot 5 1370b, the first PU 1305b performs task A5 1384b on data set N, the second PU 1310b performs task B4 1390b on data set N, the third PU 1315b performs task C3 1396b on data set N, and the fourth PU 1320b performs task D2 1331 on data set N. In time slot 6 1375b, the first PU 1305b performs task A5 1385b on data set N, the second PU 1310b performs task B4 2@ 1391b on data set N, the third PU 1315b performs task C3 1397b on data set N, and the fourth PU 1320b performs task D2 1332 on data set N. One of ordinary skill in the art would appreciate how the pipeline processing would further progress.

In this exemplary embodiment, the combination of specialized PUs with a pipeline architecture enables the processing of greater channels on a single media layer. Where each channel implements a G.711 codec and 128 ms of echo tail cancellation with DTMF detection/generation, voice activity detection (VAD), comfort noise generation (CNG), and call discrimination, the media engine layer operates at 1.95 MHz per channel. The resulting channel power consumption is at or about 6 mW per channel using 0.13 g standard cell technology.

Packet Engine

The Packet Engine of the present invention is a communications processor that, in a preferred embodiment, supports the plurality of interfaces and protocols used in media gateway processing systems between circuit-switched networks, packet-based IP networks, and cell-based ATM networks. The Packet Engine comprises a unique architecture capable of providing a plurality of functions for enabling media processing, including, but not limited to, cell and packet encapsulation, quality of service functions for traffic management and tagging for the delivery of other services and multi-protocol label switching, and the ability to bridge cell and packet networks.

Figure 14:
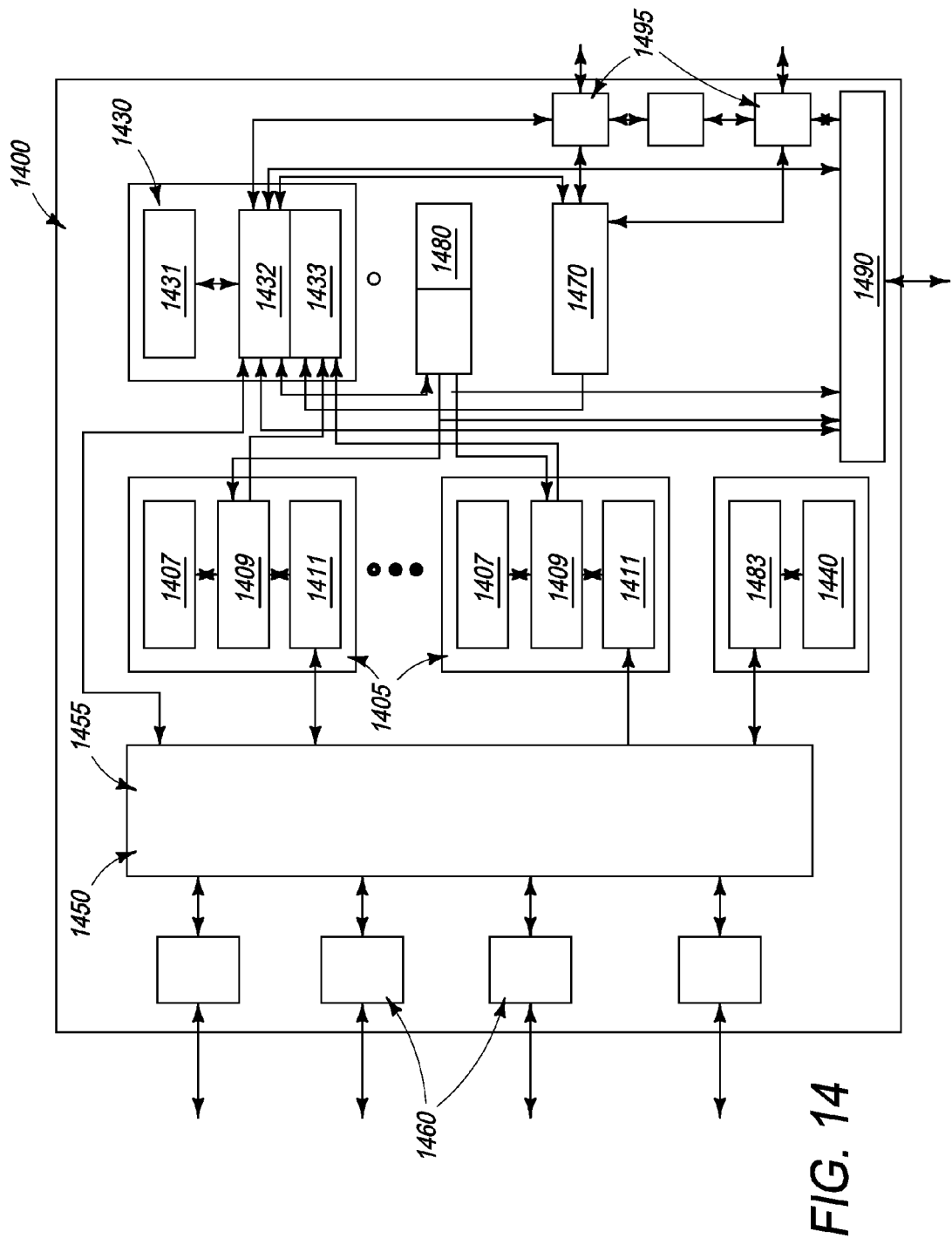
FIG. 14 is a block diagram representation of a preferred embodiment of the packet processor component of the hardware system of the present invention.

Referring now to FIG. 14, an exemplary architecture of the Packet Engine 1400 is provided. In the embodiment depicted, the Packet Engine 1400 is configured to handle data rate up to and around OC-12. It is appreciated by one of ordinary skill in the art that certain modifications can be made to the fundamental architecture to increase the data handling rates beyond OC-12. The Packet Engine 1400 comprises a plurality of processors 1405, a host processor 1430, an ATM engine 1440, in-bound DMA channel 1450, out-bound DMA channel 1455, a plurality of network interfaces 1460, a plurality of registers 1470, memory 1480, an interface to external memory 1490, and a means to receive control and signaling information 1495.

The processors 1405 comprise an internal cache 1407, central processing unit interface 29 1409, and data memory 1411. In a preferred embodiment, the processors 1405 comprise 32-bit reduced instruction set computing (RISC) processors with a 16 Kb instruction cache and a 12 Kb local memory. The central processing unit interface 1409 permits the processor 1405 to communicate with other memories internal to, and external to, the Packet Engine 1400. The processors 1405 are preferably capable of handling both in-bound and out-bound communication traffic. In a preferred implementation, generally half of the processors handle in-bound traffic while the other half handle out-bound traffic. The memory 1411 in the processor 1405 is preferably divided into a plurality of banks such that distinct elements of the Packet Engine 1400 can access the memory 1411 independently and without contention, thereby increasing overall throughput. In a preferred embodiment, the memory is divided into three banks, such that the in-bound DMA channel can write to memory bank one, while the processor is processing data from memory bank two, while the out-bound DMA channel is transferring processed packets from memory bank three.

The ATM engine 1440 comprises two primary subcomponents, referred to herein as the ATMRx Engine and the ATMTx Engine. The ATMRx Engine processes an incoming ATM cell header and transfers the cell for corresponding AAL protocol, namely AAL1, AAL2, AAL5, processing in the internal memory or to another cell manager, if external to the system. The ATMTx Engine processes outgoing ATM cells and requests the outbound DMA channel to transfer data to a particular interface, such as the UTOPIAII/POSII interface. Preferably, it has separate blocks of local memory for data exchange. The ATM engine 1440 operates in combination with data memory 1483 to map an AAL channel, namely AAL2, to a corresponding channel on the TDM bus (where the Packet Engine 1400 is connected to a Media Engine) or to a corresponding IP channel identifier where internetworking between IP and ATM systems is required. The internal memory 1480 utilizes an independent block to maintain a plurality of tables for comparing and/or relating channel identifiers with virtual path identifiers (VPI), virtual channel identifiers (VCI), and compatibility identifiers (CID). A VPI is an eight-bit field in the ATM cell header which indicates the virtual path over which the cell should be routed. A VCI is the address or label of a virtual channel comprised of a unique numerical tag, defined by a 16 bit field in the ATM cell header, that identifies a virtual channel over which a stream of cells is to travel during the course of a session between devices. The plurality of tables are preferably updated by the host processor 1430 and are shared by the ATMRx and ATMTx engines.

The host processor 1430 is preferably a RISC processor with an instruction cache 1431. The host processor 1430 communicates with other hardware blocks through a CPU interface 1432 which is capable of managing communications with Media Engines over a bus, such as a PCI bus, and with a host, such as a signaling host through a PCI-PCI bridge. The host processor 1430 is capable of being interrupted by other processors 1405 through their transmission of interrupts which are handled by an interrupt handler 1433 in the CPU interface. It is further preferred that the host processor 1430 be capable of performing the following functions: 1) boot-up processing, including loading code from a flash memory to an external memory and starting execution, initializing interfaces and internal registers, acting as a PCI host, and appropriately configuring them, and setting up inter-processor communications between a signaling host, the packet engine itself, and media engines, 2) DMA configuration, 3) certain network management functions, 4) handling exceptions, such as the resolution of unknown addresses, fragmented packets, or packets with invalid headers, 4) providing intermediate storage of tables during system shutdown, 5) IP stack implementation, and 6) providing a message-based interface for users external to the packet engine and for communicating with the packet engine through the control and signaling means, among others.

In an embodiment, two DMA channels are provided for data exchange between different memory blocks via data buses. Referring to FIG. 14, the in-bound DMA channel 1450 is utilized to handle incoming traffic to the Packet Engine 1400 data processing elements and the out-bound DMA channel 1455 is utilized to handle outgoing traffic to the plurality of network interfaces 1460. The in-bound DMA channel 1450 handles all of the data coming into the Packet Engine 1400.

Figure 15:
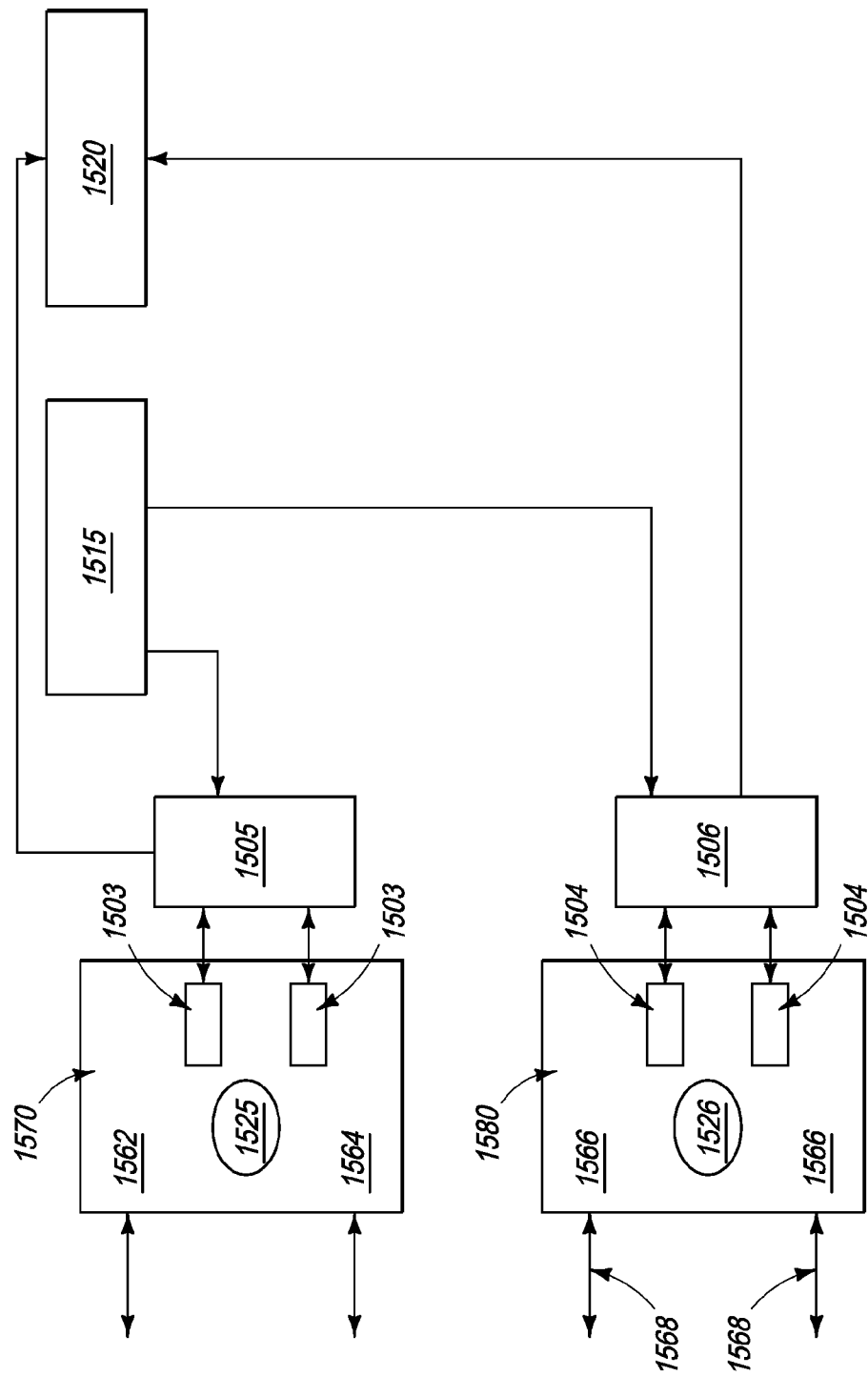
FIG. 15 is a schematic representation of one embodiment of the plurality of network interfaces in the packet processor component of the hardware system of the present invention.

To receive and transmit data to ATM and IP networks, the Packet Engine 1400 has a plurality of network interfaces 1460 that permit the Packet Engine to compatibly communicate over networks. Referring to FIG. 15, in a preferred embodiment, the network interfaces comprise a GMII PHY interface 1562, a GMII MAC interface 1564, and two UTOPIAII/POSII interfaces 1566 in communication with 622 Mbps ATM/SONET connections 1568 to receive and transmit data. For IP-based traffic, the Packet Engine [not shown] supports MAC and emulates PHY layers of the Ethernet interface as specified in IEEE 802.3. The gigabit Ethernet TV MAC 1570 comprises FIFOs 1503 and a control state machine 1525. The transmit and receive FIFOs 1503 are provided for data exchange between the gigabit Ethernet MAC 1570 and bus channel interface 1505. The bus channel interface 1505 is in communication with the outbound DMA channel 1515 and in-bound DMA channel 1520 through bus channel. When IP data is being received from the GMII MAC interface 1564, the MAC 1570 preferably sends a request to the DMA 1520 for data movement. Upon receiving the request, the DMA 1520 preferably checks the task queue [not shown] in the MAC interface 1564 and transfers the queued packets.

In a preferred embodiment, the task queue in the MAC interface is a set of 64 bit registers containing a data structure comprising: length of data, source address, and destination address. Where the DMA 1520 is maintaining the write pointers for the plurality of destinations [not shown], the destination address will not be used. The DMA 1520 will move the data over the bus channel to memories located within the processors and will write the number of tasks at a predefined memory location. After completing writing of all tasks, the DMA 1520 will write the total number of tasks transferred to the memory page. The processor will process the received data and will write a task queue for an outbound channel of the DMA. The outbound DMA channel 1515 will check the number of frames present in the memory locations and, after reading the task queue, will move the data either to a POSII interface of the Media Engine Type I or II or to an external memory location where IP to ATM bridging is being performed.

For ATM only or ATM and IP traffic in combination, the Packet Engine supports two configurable UTOPIAII/POSII interfaces 1566 which provides an interface between the PHY and upper layer for IP/ATM traffic. The UTOPIA II/POS II 1580 comprises FIFOs 1504 and a control state machine 1526. The transmit and receive FIFOs 1504 are provided for data exchange between the UTOPIAII/POSII 1580 and bus channel interface 1506. The bus channel interface 1506 is in communication with the outbound DMA channel 1515 and in-bound DMA channel 1520 through bus channel. The UTOPIA II/POS II interfaces 1566 may be configured in either UTOPIA level II or POS level II modes. When data is received on the UTOPIAII/POSII interface 1566, data will push existing tasks in the task queue forward and request the DMA 1520 to move the data. The DMA 1520 will read the task queue from the UTOPIAII/POSII interface 1566 which contains a data structure comprising: length of data, source address, and type of interface. Depending upon the type of interface, e.g. either POS or UTOPIA, the in-bound DMA channel 1520 will send the data either to the plurality of processors [not shown] or to the ATMRx engine [not shown]. After data is written into the ATMRx memory, it is processed by the ATM engine and passed to the corresponding AAL layer. On the transmit side, data is moved to the internal memory of the ATMTx engine [not shown] by the respective AAL layer. The ATMTx engine inserts the desired ATM header at the beginning of the cell and will request the outbound DMA channel 1515 to move the data to the UTOPIAII/POSII interface 1566 having a task queue with the following data structure: length of data and source address.

Figure 16:
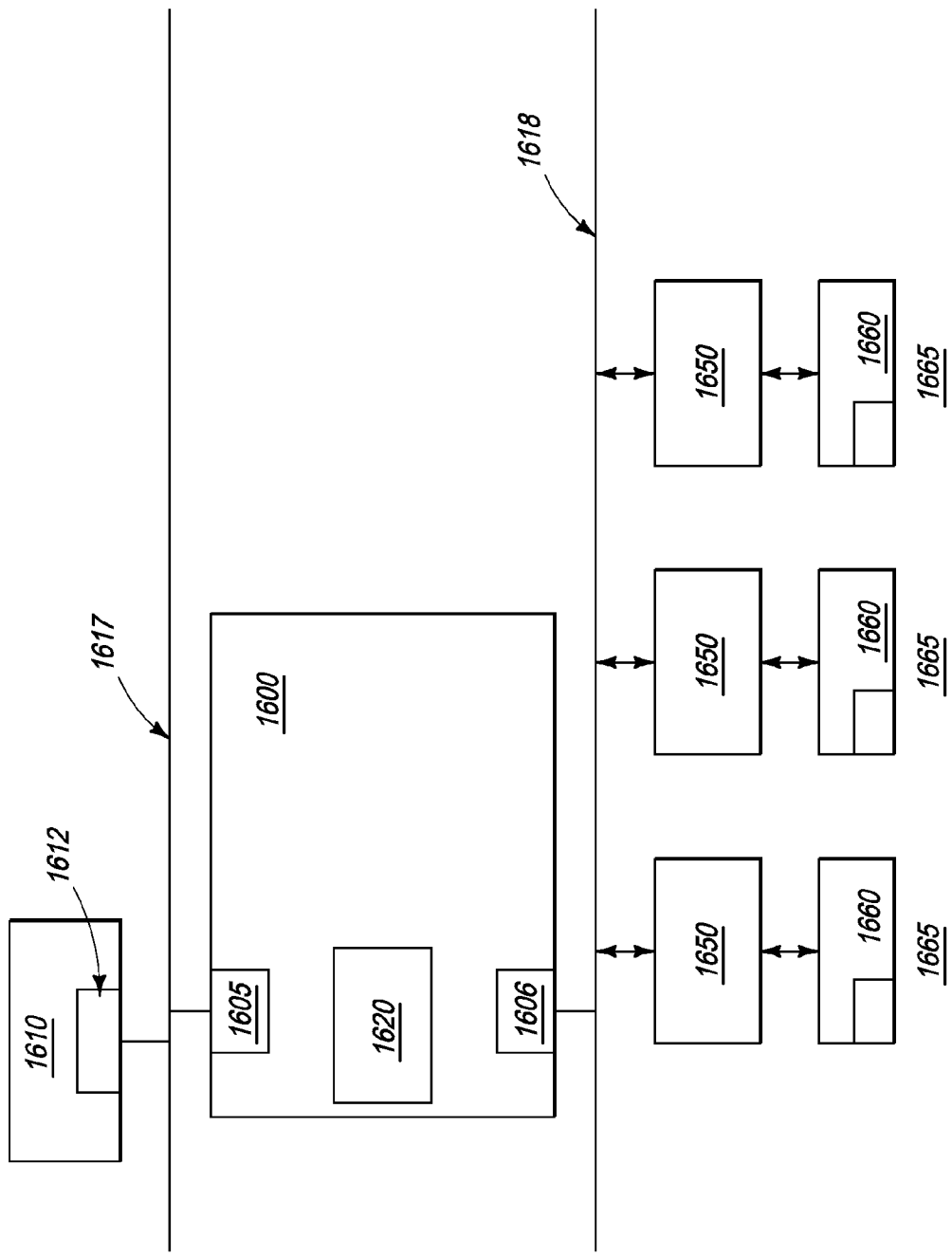
FIG. 16 is a block diagram of a plurality of PCI interfaces used to facilitate control and signaling functions for the packet processor component of the hardware system of the present invention.

Referring to FIG. 16, to facilitate control and signaling functions, the Packet Engine 1600 has a plurality of PCI interfaces 1605, 1606, referred to in FIG. 14 as 1495. In a preferred embodiment, a signaling host 1610, through an initiator 1612, sends messages to be received by the Packet Engine 1600 to a PCI target 1605 via a communication bus 1617. The PCI target further communicates these messages through a PCI to PCI bridge 1620 to a PCI initiator 1606. The PCI initiator 1606 sends messages through a communication bus 1618 to a plurality of Media Engines 1650, each having a memory 1660 with a memory queue 1665.

Software Architecture

As previously discussed, operating on the above-described hardware architecture embodiments is a plurality of novel, integrated software systems designed to enable media processing, signaling, and packet processing. The novel software architecture enables the logical system, presented in FIG. 5, to be physically deployed in a number of ways, depending on processing needs.

Communication between any two modules, or components, in the software system is facilitated by application program interfaces (APIs) that remain substantially constant and consistent irrespective of whether the software components reside on a hardware element or across multiple hardware elements. This permits the mapping of components onto different processing elements, thereby modifying physical interfaces, without the concurrent modification of the individual components.

Figure 17:
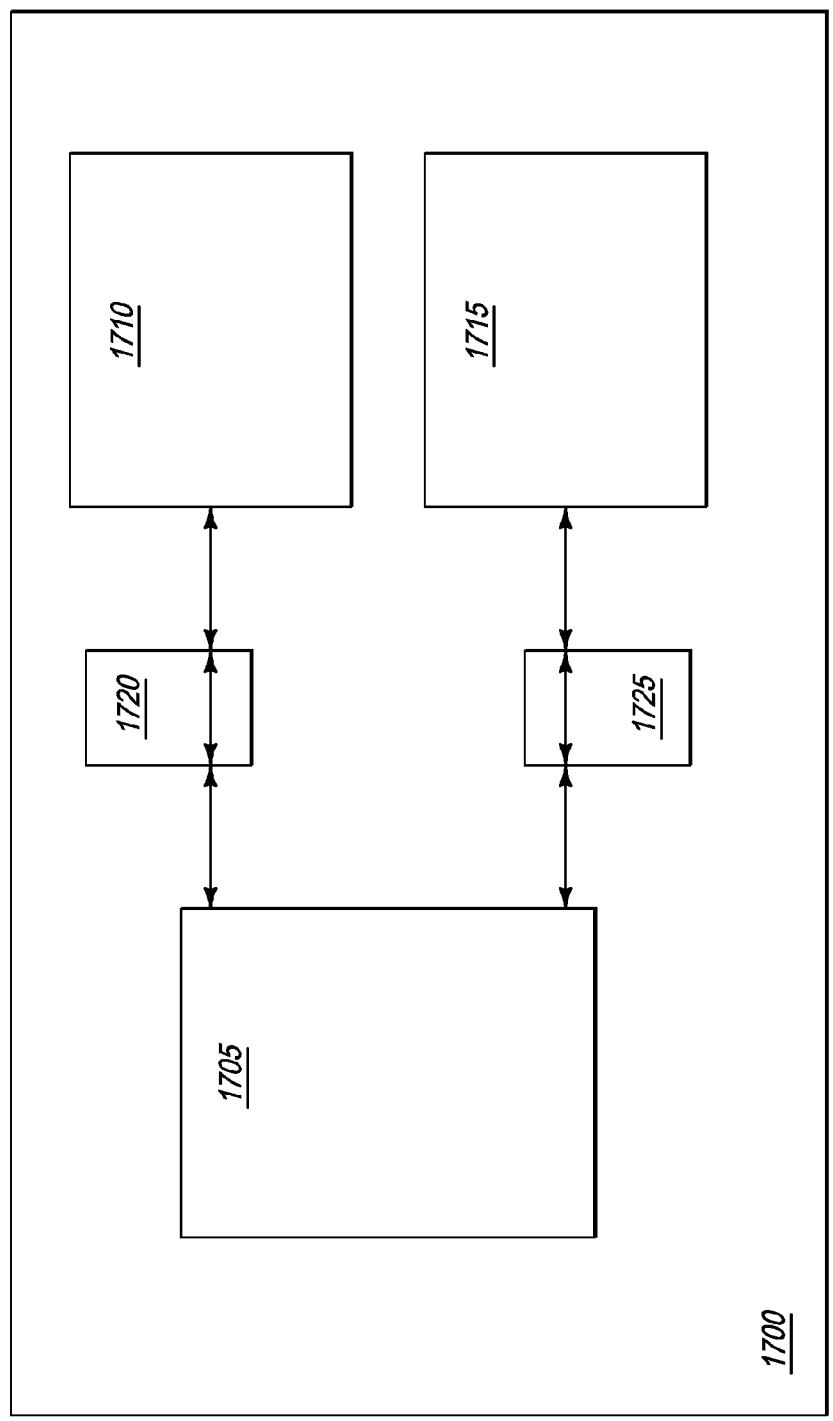
FIG. 17 is a first exemplary flow diagram of data communicated between components of the software system of the present invention.
Figure 17A:
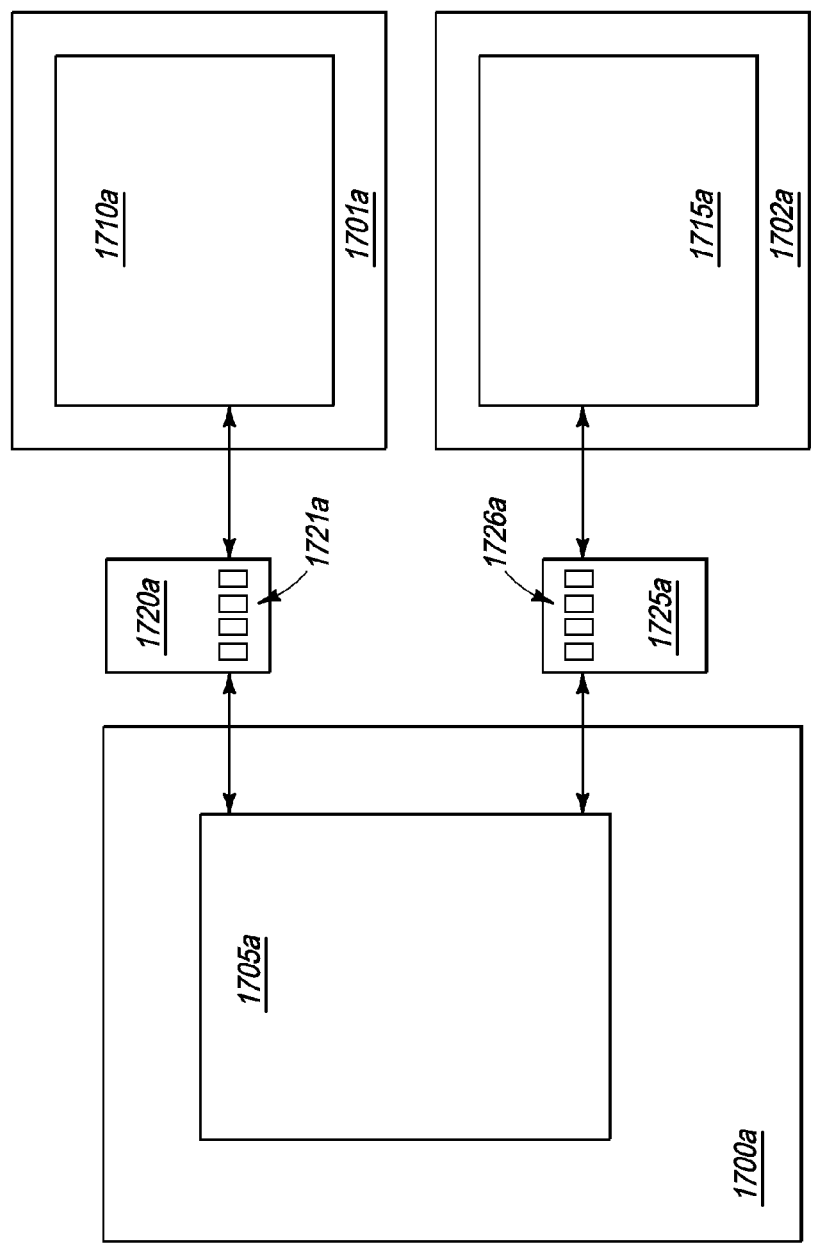
FIG. 17a is a second exemplary flow diagram of data communicated between components of the software system of the present invention.

In an exemplary embodiment, shown in FIG. 17, a first component 1705 operates in conjunction with a second component 1710 and a third component 1715 through a first interface 1720 and second interface 1725, respectively. Because all three components 1705, 1710, 1715 are executing on the same physical processor 1700, the first interface 1720 and second interface 1725 perform interfacing tasks through function mapping conducted via the APIs of each of the three components 1705, 1710, 1715. Referring to FIG. 17*a*, where the first 1705*a*, second 1710*a*, and third 1715*a* components reside on separate hardware elements 1700*a*, 1701*a*, 1702*a* respectively, e.g. separate processors or processing elements, the first interface 1720*a* and second interface 1725*a* implement interfacing tasks through queues 1721*a*, 1726*a* in shared memory. While the interfaces 1720*a*, 1725*a* are no longer limited to function mapping and messaging, the components 1705*a*, 1710*a*, 1715*a* continue to use the same APIs to conduct inter-component communication. The consistent use of a standard API enables the porting of various components to different hardware architectures in a distributed processing environment by relying on modified interfaces or drivers where necessary and without modifications in the components themselves.

Figure 18:
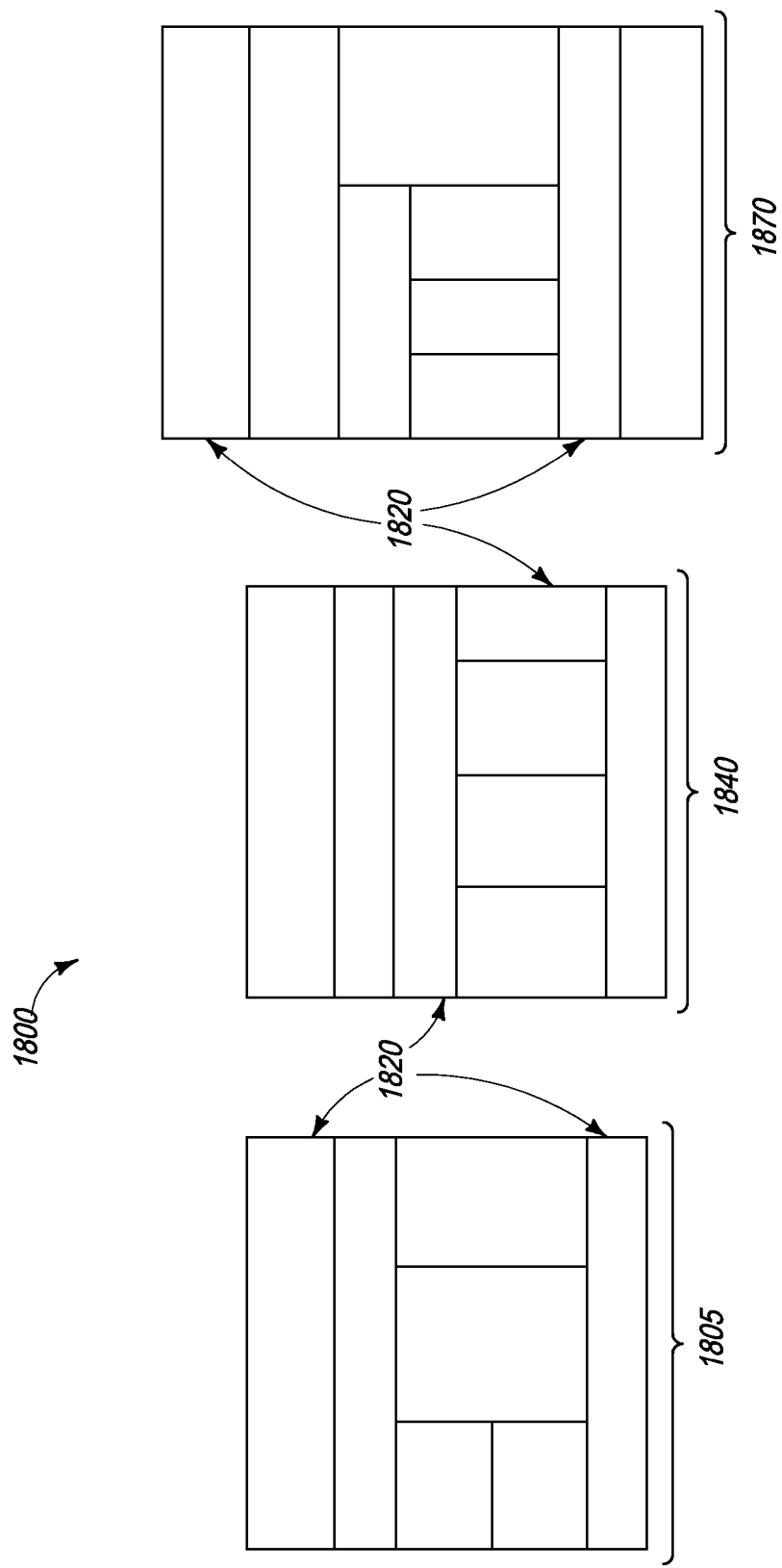
FIG. 18 is a schematic diagram of preferred components comprising the media processing subsystem of the software system of the present invention.

Referring now to FIG. 18, a logical division of the software system 1800 is shown. The software system 1800 is divided into three subsystems, a Media Processing Subsystem 1805, a Packetization Subsystem 1840, and a Signaling/Management Subsystem (hereinafter referred to as the Signaling Subsystem) 1870. The Media Processing Subsystem 1805 sends encoded data to the Packetization Subsystem 1840 for encapsulation and transmission over the network and receives network data from the Packetization Subsystem 1840 to be decoded and played out. The Signaling Subsystem 1870 communicates with the Packetization Subsystem 1840 to get status information such as the number of packets transferred, to monitor the quality of service, control the mode of particular channels, among other functions. The Signaling Subsystem 1870 also communicates with the Packetization Subsystem 1840 to control establishment and destruction of packetization sessions for the origination and termination of calls. Each subsystem 1805, 1840, 1870 further comprises a series of components 1820 designed to perform different tasks in order to effectuate the processing and transmission of media. Each of the components 1820 conducts communications with any other module, subsystem, or system through APIs that remain substantially constant and consistent irrespective of whether the components reside on a hardware element or across multiple hardware elements, as previously discussed.

Figure 19:
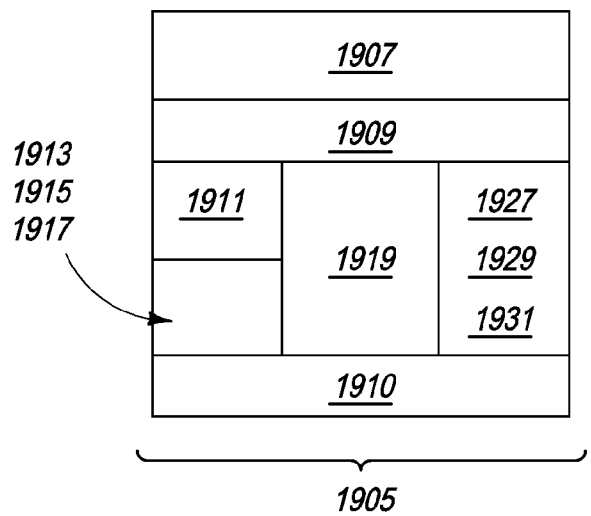
FIG. 19 is a schematic diagram of preferred components comprising the media processing subsystem of the software system of the present invention.

In an exemplary embodiment, shown in FIG. 19, the Media Processing Subsystem 1905 comprises a system API component 1907, media API component 1909, real-time media kernel 1910, and voice processing components, including line echo cancellation component 1911, components dedicated to performing voice activity detection 1913, comfort noise generation 1915, and discontinuous transmission management 1917, a component 1919 dedicated to handling tone signaling functions, such as dual tone (DTMF/MF), call progress, call waiting, and caller identification, and components for media encoding and decoding functions for voice 1927, fax 1929, and other data 1931.

The system API component 1907 should be capable of providing a system wide management and enabling the cohesive interaction of individual components, including establishing communications between external applications and individual components, managing run-time component addition and removal, downloading code from central servers, and accessing the MIBs of components upon request from other components. The media API component 1909 interacts with the real time media kernel 1910 and individual voice processing components. The real time media kernel 1910 allocates media processing resources, monitors resource utilization on each media-processing element, and performs load balancing to substantially maximize density and efficiency.

The voice processing components can be distributed across multiple processing elements. The line echo cancellation component 1911 deploys adaptive filter algorithms to remove from a signal echoes that may arise as a result of the reflection and/or retransmission of modified input signals back to the originator of the input signals. In one preferred embodiment, the line echo cancellation component 1911 has been programmed to implement the following filtration approach: An adaptive finite impulse response (FIR) filter of length N is converged using a convergence process, such as a least means square approach. The adaptive filter generates a filtered output by obtaining individual samples of the far-end signal on a receive path, if convolving the samples with the calculated filter coefficients, and then subtracting, at the appropriate time, the resulting echo estimate from the received signal on the transmit channel. With convergence complete, the filter is then converted to an infinite impulse response (IIR) filter using a generalization of the ARMA-Levinson approach. In the course of operation, data is received from an input source and used to adapt the zeroes of the IIR filter using the LMS approach, keeping the poles fixed. The adaptation process generates a set of converged filter coefficients that are then continually applied to the input signal to create a modified signal used to filter the data. The error between the modified signal and actual signal received is monitored and used to further adapt the zeroes of the IIR filter. If the measured error is greater than a pre-determined threshold, convergence is re-initiated by reverting back to the FIR convergence step.

The voice activity detection component 1913 receives incoming data and determines whether voice or another type of signal, i.e. noise, is present in the received data, based upon an analysis of certain data parameters. The comfort noise generation component 1915 operates to send a Silence Insertion Descriptor (SID) containing information that enables a decoder to generate noise corresponding to the background noise received from the transmission. An overlay of audible but non-obtrusive noise has been found to be valuable in helping users discern whether a connection is live or dead. The SID frame is typically small, i.e. approximately 15 bits under the G.729 B codec specification. Preferably, updated SID frames are sent to the decoder whenever there has been sufficient change in the background noise.

The tone signaling component 1919, including recognition of DTMF/MF, call progress, call waiting, and caller identification, operates to intercept tones meant to signal a particular activity or event, such as the conducting of two-stage dialing (in the case of DTMF tones), the retrieval of voice-mail, and the reception of an incoming call (in the case of call waiting), and communicate the nature of that activity or event in an intelligent manner to a receiving device, thereby avoiding the encoding of that tone signal as another element in a voice stream. In one embodiment, the tone-signaling component 1919 is capable of recognizing a plurality of tones and, therefore, when one tone is received, send a plurality of RTP packets that identify the tone, together with other indicators, such as length of the tone. By carrying the occurrence of an identified tone, the RTP packets convey the event associated with the tone to a receiving unit. In a second embodiment, the tone-signaling component 1919 is capable of generating a dynamic RTP profile wherein the RTP profile carries information detailing the nature of the tone, such as the frequency, volume, and duration. By carrying the nature of the tone, the RTP packets convey the tone to the receiving unit and permit the receiving unit to interpret the tone and, consequently, the event or activity associated with it.

Components for the media encoding and decoding functions for voice 1927, fax 1929, and other data 1931, referred to as codecs, are devised in accordance with International Telecommunications Union (ITU) standard specifications, such as G.711 for the encoding and decoding of voice, fax, and other data. An exemplary codec for voice, data, and fax communications is ITU standard G.711, often referred to as pulse code modulation. G.711 is a waveform codec with a sampling rate of 8,000 Hz. Under uniform quantization, signal levels would typically require at least 12 bits per sample, resulting in a bit rate of 96 kbps. Under non-uniform quantization, as is commonly used, signal levels require approximately 8 bits per sample, leading to a 64 kbps rate. Other voice codecs include ITU standards G.723.1, G.726, and G.729 A/B/E, all of which would be known and appreciated by one of ordinary skill in the art. Other ITU standards supported by the fax media processing component 1929 preferably include T.38 and standards falling within V.xx, such as V.17, V.90, and V.34. Exemplary codecs for fax include ITU standard T.4 and T.30. T.4 addresses the formatting of fax images and their transmission from sender to receiver by specifying how the fax machine scans documents, the coding of scanned lines, the modulation scheme used, and the transmission scheme used. Other codecs include ITU standards T.38.

Figure 20:
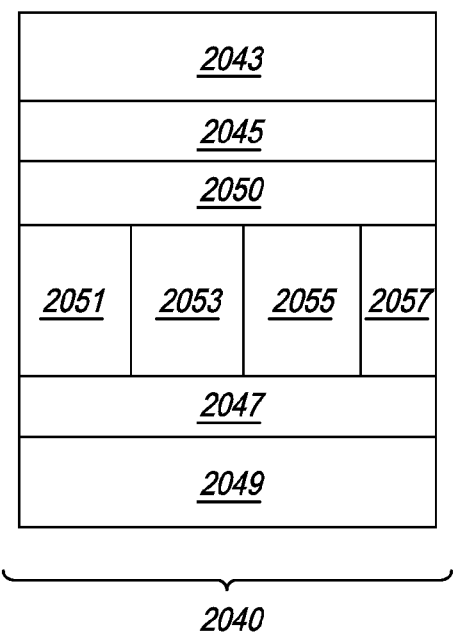
FIG. 20 is a schematic diagram of preferred components comprising the packetization processing subsystem of the software system of the present invention.

Referring to FIG. 20, in an exemplary embodiment, the Packetization Subsystem 2040 comprises a system API component 2043, packetization API component 2045, POSIX API 2047, real-time operating system (RTOS) 2049, components dedicated to performing such quality of service functions as buffering and traffic management 2050, a component for enabling IP communications 2051, a component for enabling ATM communications 2053, a component for resource-reservation protocol (RSVP) 2055, and a component for multi-protocol label switching (MPLS) 2057. The Packetization Subsystem 2040 facilitates the encapsulation of encoded voice/data into packets for transmission over ATM and IP networks, manages certain quality of service elements, including packet delay, packet loss, and jitter management, and implements trafficshaping to control network traffic. The packetization API component 2045 provides external applications facilitated access to the Packetization Subsystem 2040 by communicating with the Media Processing Subsystem [not shown] and Signaling Subsystem [not shown].

The POSIX API 2047 layer isolated the operating system (OS) from the components and provides the components with a consistent OS API, thereby insuring that components above this layer do not have to be modified if the software is ported to another OS platform. The RTOS 2049 acts as the OS facilitating the implementation of software code into hardware instructions.

The IP communications component 2051 supports packetization for TCP/IP, UDP/IP, and RTP/RTCP protocols. The ATM communications component 2053 supports packetization for AAL1, AAL2, and AAL5 protocols. It is preferred that the RTP/UDP/IP stack be implemented on the RISC processors of the Packet Engine. A portion of the ATM stack is also preferably implemented on the RISC processors with more computationally intensive parts of the ATM stack implemented on the ATM engine.

The component for RSVP 2055 specifies resource-reservation techniques for IP networks. The RSVP protocol enables resources to be reserved for a certain session (or a plurality of sessions) prior to any attempt to exchange media between the participants. Two levels of service are generally enabled, including a guaranteed level which emulates the quality achieved in conventional circuit switched networks, and controlled load which is substantially equal to the level of service achieved in a network under best-effort and no-load conditions. In operation, a sending unit issues a PATH message to a receiving unit via a plurality of routers. The PATH message contains a traffic specification (Tspec) that provides details about the data that the sender expects to send, including bandwidth requirement and packet size. Each RSVP-enabled router along the transmission path establishes a path state that includes the previous source address of the PATH message (the prior router). The receiving unit responds with a reservation request (RESV) that includes a flow specification having the Tspec and information regarding the type of reservation service requested, such as controlled-load or guaranteed service. The RESV message travels back, in reverse fashion, to the sending unit along the same router pathway. At each router, the requested resources are allocated, provided such resources are available and the receiver has authority to make the request. The RESV eventually reaches the sending unit with a confirmation that the requisite resources have been reserved.

The component for MPLS 2057 operates to mark traffic at the entrance to a network for the purpose of determining the next router in the path from source to destination. More specifically, the MPLS 2057 component attaches a label containing all of the information a router needs to forward a packet to the packet in front of the IP header. The value of the label is used to look up the next hop in the path and the basis for the forwarding of the packet to the next router. Conventional IP routing operates similarly, except the MPLS process searches for an exact match, not the longest match as in conventional IP routing.

One function that could be provided in either the Media Processing Subsystem or the Packetization Subsystem is jitter buffer management. As previously discussed, an embodiment of the present invention operates by estimating a packet delay histogram that may be used to determine the required buffer size and minimum delay. The preferred method of determining the buffer size and minimum delay comprises the selection of an area of the histogram, the calculation of the mean delay based upon the selected area, the calculation of a plurality of variances based upon the mean delay, and the use of the variances to determine buffer size and minimum delay.

Referring back to FIG. 1*f*, the graph represents histogram 101*f* of a packet stream received by a media gateway, more specifically the Media Processing Subsystem or Packetization Subsystem. The x-axis 102*f* represents the delay experienced by packets and the y-axis 103*f* represents the number of packet samples received. The vertical bars 104*f* show the number of packets received in a defined span of time. A curve 105*f* connects the central point of tops of the bars 104*f* of the histogram 101*f*. The curve 105*f* depicts the distribution of the arrival time of packets.

As previously discussed, to avoid skewing the peak, or mean delay, calculation, the tail is eliminated at a defined point 106*f*, which in this example is 270 ms on the x-axis 102*f*. Therefore, the histogram area to the right of point 106*f* is discarded. The mean of the curve 107*f* may be calculated by using the formula:

$$M = \frac{\sum x_i}{N}$$

where M is the mean, $x_i$ represents the delay experienced by packets arriving in a particular window of time i, and N is the total number of samples.

The preferred embodiment of the invention utilizes at least two separately calculated variances to better estimate the buffer size and delay based upon the estimated histogram. To calculate the plurality of variances, the histogram is conceptually divided into two portions, a portion encompassing the packets arriving after the mean delay and a portion encompassing packets that arrived prior to the mean delay. Where i packets have been received and the mean delay is associated with packet m, then the two histogram portions are defined by $D_0$ to $D_{m-1}$ and the second defined by $D_{m+1}$ to $D_i$, or the final packet. The variance of $D_0$ to $D_{m-1}$, $Var_1$, may be calculated using the formula:

$$Var_1 = \frac{\sum (x_j - M)^2}{(N_{0\ to\ m-1})} \text{ or } Var = \frac{\sum |x_j - M|}{(N_{0\ to\ m-1})}$$

where j extends from 0 to m−1 and the total number of samples includes those samples from 0 to m−1. Similarly, the variance of $D_{m+1}$ to $D_1$, $Var_2$, may be calculated using the formula:

$$Var_2 = \frac{\sum (x_j - M)^2}{(N_{m+1\ to\ i})} \text{ or } Var = \frac{\sum |x_j - M|}{(N_{m+1\ to\ 1})}$$

where j extends from m+1 to i and the total number of samples includes those sample from m+1 to i. Although the two separately calculated variances are calculated using one sample set of packets arriving before the mean delay and one sample set of packets arriving after the mean delay, one would appreciate that the sample set of packets can be calculated using sample sets that overlap or that, when taken together, comprise a subset of packets received.

Typically, the two variances are not equal because the histogram is asymmetrical. As shown in FIG. 1f, $Var_1$ 115f is less than $Var_2$ 117f, reflective of the asymmetrical nature of the histogram and better approximating the actual distribution of packets received. This approach therefore represents an improved approach to ascertaining the size and placement of the buffer more accurately while optimizing computational resources.

Optionally, $Var_1$ can be calculated from $Var_2$, or vice versa, using pre-defined equations. As an example, $Var_1$ could be a multiple or factor of $Var_2$, i.e. $Var_1 * C = Var_2$, where C is a constant that is determined experimentally. Alternatively, $Var_1$ could be a fixed value depending on whether $Var_2$ exceeds or does not exceed certain threshold value.

After the peak and variances are calculated, the buffer size and timing can be determined. The buffer starts accepting packets at delay d, which is determined by subtracting $Var_1$ 115f from the mean 107f.

$$d = M - Var_1$$

and continues accepting for a period (T) which is the sum of the two variances.

$$T = Var_1 + Var_2$$

For example, where the $Var_1$ is 60 ms, $Var_2$ is 105 ms and the mean is 150 ms, the buffer starts accepting packets at 90 ms and continues accepting for period T of 165 ms, or up to 255 ms. The variances used to determine the buffer parameters can also be calculated variances derived by multiplying $Var_1$ and/or $Var_2$ by a multiplier (k) where the multiplier is any number, but preferably in the range of 2-8, and more preferably around 2, 4 or 8. Utilizing this approach, the Media Processing Subsystem or Packetization Subsystem is better able to manage jitter in packets received by the Media Gateway system.

Figure 21:
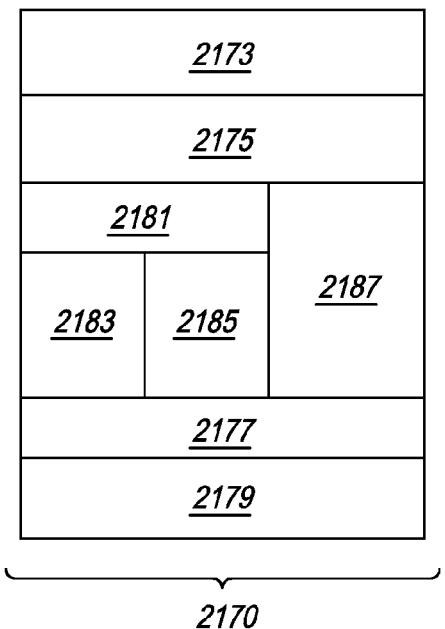
FIG. 21 is a schematic diagram of preferred components comprising the signaling subsystem of the software system of the present invention.

Referring to FIG. 21, in an exemplary embodiment, the Signaling Subsystem 2170 comprises a user application API component 2173, system API component 2175, POSIX API 2177, real-time operating system (RTOS) 2179, a signaling API 2181, components dedicated to performing such signaling functions as signaling stacks for ATM networks 2183 and signaling stacks for IP networks 2185, and a network management component 2187. The signaling API 2181 provides facilitated access to the signaling stacks for ATM networks 2183 and signaling stacks for IP networks 2185. The signaling API 2181 comprises a master gateway and sub-gateways of N number. A single master gateway can have N sub-gateways associated with it. The master gateway performs the demultiplexing of incoming calls arriving from an ATM or IP network and routes the calls to the sub-gateway that has resources available. The sub-gateways maintain the state machines for all active terminations. The sub-gateways can be replicated to handle many terminations. Using this design, the master gateway and sub-gateways can reside on a single processor or across multiple processors, thereby enabling the simultaneous processing of signaling for a large number of terminations and the provision of substantial scalability.

The user application API component 2173 provides a means for external applications to interface with the entire software system, comprising each of the Media Processing Subsystem, Packetization Subsystem, and Signaling Subsystem. The network management component 2187 supports local and remote configuration and network management through the support of simple network management protocol (SNMP). The configuration portion of the network management component 2187 is capable of communicating with any of the other components to conduct configuration and network management tasks and can route remote requests for tasks, such as the addition or removal of specific components.

The signaling stacks for ATM networks 2183 include support for User Network Interface (UNI) for the communication of data using AAL1, AAL2, and AAL5 protocols. User Network Interface comprises specifications for the procedures and protocols between the gateway system, comprising the software system and hardware system, and an ATM network. The signaling stacks for IP networks 2185 include support for a plurality of accepted standards, including media gateway control protocol (MGCP), H.323, session initiation protocol (SIP), H.248, and network-based call signaling (NCS). MGCP specifies a protocol converter, the components of which may be distributed across multiple distinct devices. MGCP enables external control and management of data communications equipment, such as media gateways, operating at the edge of multi-service packet networks. H.323 standards define a set of call control, channel set up, and codec specifications for transmitting real time voice and video over networks that do not necessarily provide a guaranteed level of service, such as packet networks. SIP is an application layer protocol for the establishment, modification, and termination of conferencing and telephony sessions over an IP-based network and has the capability of negotiating features and capabilities of the session at the time the session is established. H.248 provides recommendations underlying the implementation of MGCP.

Figure 22:
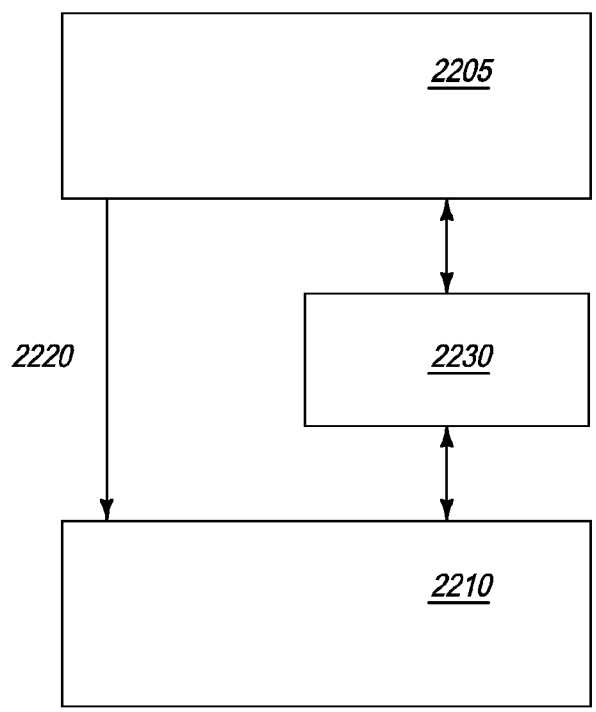
FIG. 22 is a block diagram of a host application operative on a physical DSP.
Figure 23:
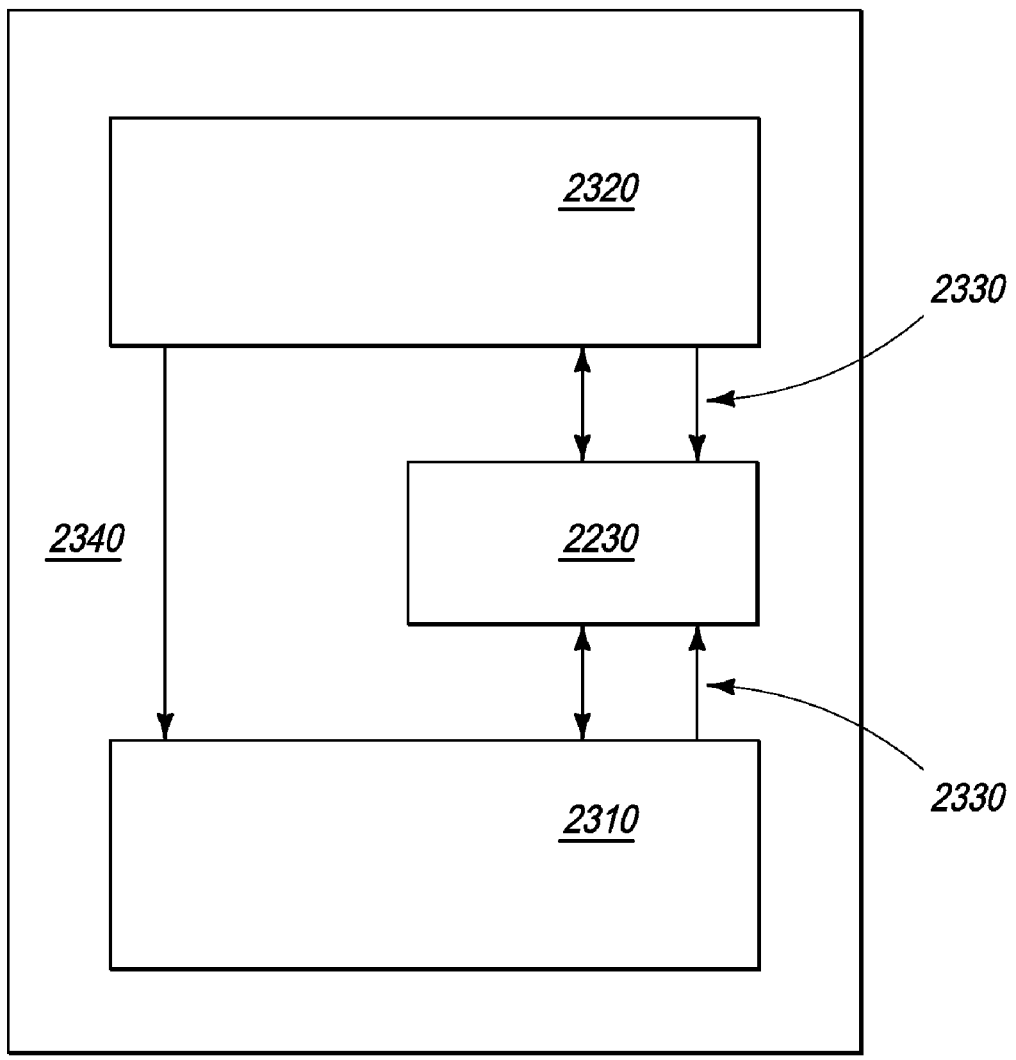
FIG. 23 is a block diagram of a host application operative on a virtual DSP.

To further enable ease of scalability and implementation, the present software method and system does not require specific knowledge of the processing hardware being utilized. Referring to FIG. 22, in a typical embodiment, a host application 2205 interacts with a DSP 2210 via an interrupt capability 2220 and shared memory 2230. As shown in FIG. 23, the same functionality can be achieved by a simulation execution through the operation of a virtual DSP program 2310 as a separate independent thread on the same processor 2315 as the application code 2320. This simulation run is enabled by a task queue mutex 2330 and a condition variable 2340. The task queue mutex 2330 protects the data shared between the virtual DSP program 2310 and a resource manager [not shown]. The condition variable 2340 allows the application to synchronize with the virtual DSP 2310 in a manner similar to the function of the interrupt 2220 in FIG. 22.

The present methods and systems provide for an improved jitter buffer management method and system by basing playout buffer adjustments on computed minimum delays and buffer sizes with reference to a plurality of variances derived from an estimated histogram. While various embodiments of the present invention have been shown and described, it would be apparent to those skilled in the art that many modifications are possible without departing from the inventive concept disclosed herein. For example, it would be apparent that the plurality of variances can be calculated by determining a first variance from an estimated histogram and then deriving subsequent variances through any pre-defined equation incorporating the first variance.

What is claimed is:

1. A receiver for smoothing jitter experienced by data packets in transmission from a transmitter to said receiver, comprising: a counter for determining delays experienced by data packets in transmission from said transmitter to said receiver, a delay estimator adapted to estimate data indicative of an adaptive packet delay histogram, having a mean, wherein said data indicative of the packet delay histogram is a function of the delays experienced by said data packets in transmission from said transmitter to said receiver and the number of data packets received at the receiver; a playout delay evaluator in data communication with the delay estimator and adapted to receive data from said delay estimator, wherein the playout delay evaluator calculates a playout time, and wherein the calculation of said playout time utilizes said mean and a first variance derived from a portion of said data indicative of the packet delay histogram; and a playout buffer monitor adapted to receive said playout time from said playout delay evaluator, buffer the data packets for a delay amount determined by the playout delay evaluator and then output the delayed data packets.

2. The receiver of claim 1, wherein the delay is calculated by subtracting the first variance from the mean delay experienced by data packets in transmission from a transmitter to a receiver.

3. The receiver of claim 2, wherein the first variance is calculated based upon a portion of the data indicative of the packet delay histogram that is less than the mean delay.

4. The receiver of claim 1, wherein the first variance is calculated using a second variance calculated from a portion of the data indicative of the packet delay histogram that differs from the portion of the data indicative of the packet delay histogram used to derive the first variance.

5. The receiver of claim 1, further comprising a delay smoother to control changes in playout time.

6. The receiver of claim 1, wherein the playout time is further controlled by expanding increases in playout time and limiting decreases in playout time.

7. A method, executed at a receiver, for substantially reducing jitter experienced by data packets in transmission from a transmitter to said receiver, comprising the steps of:
measuring delays experienced by data packets in transmission from said transmitter to said receiver, estimating a mean delay using data indicative of a packet delay histogram, wherein said data indicative of said packet delay histogram is a function of the delays experienced by said data packets in transmission from said transmitter to said receiver and the number of data packets received at the receiver; deriving a first variance from a first portion of said data indicative of said histogram; deriving a second variance from a second portion of said data indicative of said histogram, wherein said first portion and second portion are not identical; setting a delay equal to a function of the mean delay and the first variance; setting a buffer size equal to a function of the first and second variance;
and buffering data packets in accordance with said buffer size and delay.

8. The method of claim 7, wherein the delay is equal to the mean delay minus the first variance.

9. The method of claim 7 wherein the buffer size is equal to the sum of the first and second variances.

10. A method, executed at a receiver, for substantially reducing jitter experienced by data packets in transmission from a transmitter to said receiver, comprising the steps of:
measuring delays experienced by data packets in transmission from said transmitter to said receiver, estimating a mean delay using data indicative of a packet delay histogram, wherein said data indicative of said packet delay histogram is a function of the delays experienced by said data packets in transmission from said transmitter to said receiver and the number of data packets received at the receiver; deriving a first variance from a first portion of said data indicative of said histogram; deriving a second variance as a function of the first variance; setting a delay equal to a function of the mean delay and the first variance; setting a buffer size equal to a function of the first and second variance;
and buffering data packets in accordance with said buffer size and minimum delay.

11. The method of claim 10, wherein the second variance is equal to the first variance multiplied by a constant.

12. The method of claim 10, wherein the second variance is equal to a constant minus the first variance.

13. A receiver for smoothing jitter experienced by data packets in transmission from a transmitter to said receiver, comprising: a counter for determining delays experienced by data packets in transmission from said transmitter to said receiver, a delay estimator for estimating data indicative of a packet delay histogram, wherein said data indicative of the packet delay histogram is a function of the delays experienced by said data packets in transmission from said transmitter to said receiver and the number of data packets received at the receiver; and a playout buffer monitor having a buffer size equal to the sum of a first variance and a second variance, wherein the first variance is calculated from a first portion of said data indicative of the packet delay histogram and the second variance is calculated from a second portion of said data indicative of the packet delay histogram, and wherein said playout buffer monitor buffers the data packets for a minimum delay amount determined by the first variance.

14. A receiver for managing jitter experienced by data packets in transmission from a transmitter to said receiver, comprising: a counter for determining delays experienced by data packets in transmission from said transmitter to said receiver, a delay estimator for estimating data indicative of a packet delay histogram and a mean delay, wherein said data indicative of the packet delay histogram is a function of the delays experienced by said data packets in transmission from said transmitter to said receiver and the number of data packets received at the receiver; and a playout delay evaluator in communication with the delay estimator and adapted to determine a plurality of variances based upon a plurality of portions of the data indicative of the packet delay histogram, wherein the calculation of a first variance is used to determine a delay and the calculation of a second variance is used to calculate a buffer size; and a playout buffer monitor having the calculated buffer size wherein the playout buffer monitor buffers the data packets selected by the playout delay evaluator for the delay and then outputs the delayed data packets.

* * * * *